US011163163B2

(12) United States Patent
Connor

(10) Patent No.: US 11,163,163 B2
(45) Date of Patent: Nov. 2, 2021

(54) AUGMENTED REALITY (AR) EYEWEAR WITH AT LEAST ONE QUASI FRESNEL REFLECTOR (QFR)

(71) Applicant: Robert A. Connor, St. Paul, MN (US)

(72) Inventor: Robert A. Connor, St. Paul, MN (US)

(73) Assignee: Holovisions, St. Paul, MN (US)

( * ) Notice: Subject to any disclaimer, the term of this patent is extended or adjusted under 35 U.S.C. 154(b) by 256 days.

(21) Appl. No.: 16/686,170

(22) Filed: Nov. 17, 2019

(65) Prior Publication Data
US 2020/0089004 A1    Mar. 19, 2020

Related U.S. Application Data

(63) Continuation-in-part of application No. 16/175,924, filed on Oct. 31, 2018, now Pat. No. 10,859,834, which is a continuation-in-part of application No. 15/942,498, filed on Mar. 31, 2018, now Pat. No. 10,338,400.

(60) Provisional application No. 62/791,359, filed on Jan. 11, 2019, provisional application No. 62/751,076, filed on Oct. 26, 2018, provisional application No. 62/749,775, filed on Oct. 24, 2018, provisional application No. 62/746,487, filed on Oct. 16, 2018, provisional application No. 62/720,171, filed on Aug. 21, 2018, provisional application No. 62/716,507, filed on Aug. 9, 2018, provisional application No. 62/714,684, filed on Aug. 4, 2018, provisional application No. 62/703,025, filed on Jul. 25, 2018, provisional application No. 62/699,800, filed on Jul. 18, 2018, provisional application No. 62/695,124, filed on Jul. 8, 2018, provisional application No. 62/646,856, filed on Mar. 22, 2018, provisional application No. 62/638,087, filed on Mar. 3, 2018, provisional application No. 62/624,699, filed on Jan.
(Continued)

(51) Int. Cl.
| G02B 27/01 | (2006.01) |
| G02B 5/09 | (2006.01) |
| G06T 19/00 | (2011.01) |

(52) U.S. Cl.
CPC .......... G02B 27/0172 (2013.01); G02B 5/09 (2013.01); G02B 27/0176 (2013.01); G06T 19/006 (2013.01); G02B 2027/0178 (2013.01)

(58) Field of Classification Search
CPC .. G02B 27/0172; G02B 5/09; G02B 27/0176; G06T 19/006; G06T 2027/0178
USPC ....................................................... 359/318
See application file for complete search history.

(56) References Cited

U.S. PATENT DOCUMENTS

| 6,236,511 B1 * | 5/2001 | Brown ..................... G02B 3/08 |
| | | 359/634 |
| 7,656,585 B1 * | 2/2010 | Powell ................. G02B 27/144 |
| | | 359/630 |

(Continued)

*Primary Examiner* — Collin X Beatty

(57) ABSTRACT

This invention is Augmented Reality (AR) eyewear with a Quasi Fresnel Reflector (QFR) which reflects light rays from a lateral Light Emitter Array (LEA) toward a person's eye to create virtual images in the person's field of view. This eyewear can have two Quasi Fresnel Reflectors (QFRs), one for each of the person's eyes. A Quasi Fresnel Reflector (AFR) can have: an array of linear, partially-reflective, partially-transmissive surfaces; an array of nested, arcuate, partially-reflective, partially-transmissive surfaces; and/or a spoke-and-ring array of partially-reflective, partially-transmissive surfaces.

20 Claims, 2 Drawing Sheets

Figure 1:
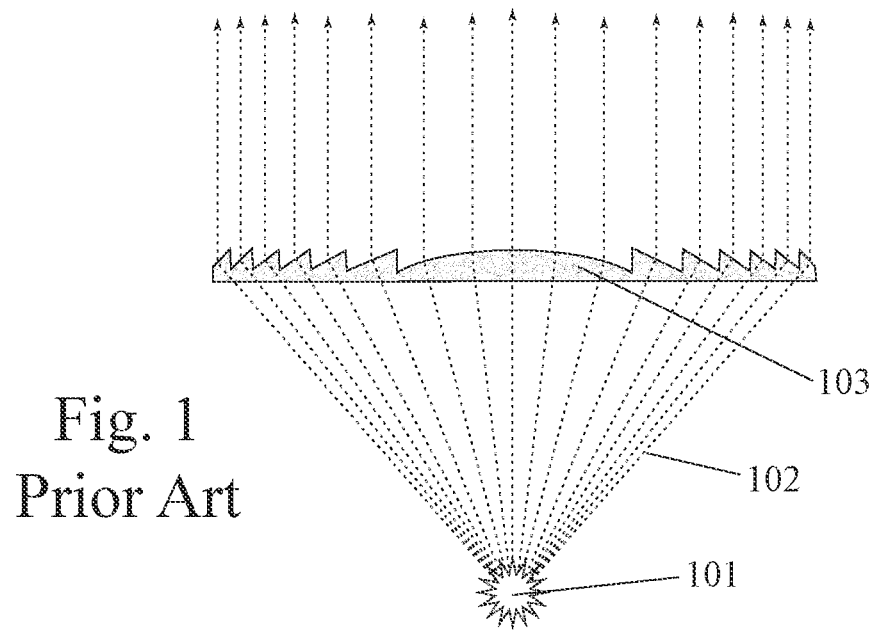

Related U.S. Application Data 31, 2018, provisional application No. 62/572,328, filed on Oct. 13, 2017, provisional application No. 62/563,798, filed on Sep. 27, 2017, provisional application No. 62/561,834, filed on Sep. 22, 2017, provisional application No. 62/528,331, filed on Jul. 3, 2017.

(56) References Cited

U.S. PATENT DOCUMENTS

| | | | | |
|---|---|---|---|---|
| 8,384,999 | B1* | 2/2013 | Crosby | G02B 27/0172 359/631 |
| 8,456,744 | B2* | 6/2013 | Dobschal | G02B 27/0172 359/630 |
| 8,659,840 | B2* | 2/2014 | Masuda | G02B 27/0018 359/742 |
| 9,465,218 | B2* | 10/2016 | Dobschal | G02B 5/09 |
| 9,632,312 | B1* | 4/2017 | Cakmakci | G02B 5/1852 |
| 10,215,698 | B2 | 2/2019 | Han et al. | |
| 10,261,320 | B2* | 4/2019 | Kress | G02B 27/0179 |
| 10,534,181 | B2* | 1/2020 | Wu | G02B 27/145 |
| 11,073,701 | B2* | 7/2021 | Matsumura | G02B 25/04 |
| 2013/0021658 | A1 | 1/2013 | Miao et al. | |
| 2013/0077175 | A1 | 3/2013 | Hotta et al. | |
| 2013/0314759 | A1 | 11/2013 | Miao et al. | |
| 2014/0003762 | A1 | 1/2014 | Macnamara | |
| 2014/0036361 | A1 | 2/2014 | Woodgate et al. | |
| 2014/0211146 | A1* | 7/2014 | Gupta | G02B 5/1861 351/158 |
| 2015/0036223 | A1 | 2/2015 | Dobschal et al. | |
| 2016/0178910 | A1 | 6/2016 | Giudicelli et al. | |
| 2016/0282616 | A1* | 9/2016 | Matsushita | G02B 3/08 |
| 2016/0313557 | A1* | 10/2016 | Schmidt | G02B 3/08 |
| 2017/0139110 | A1 | 5/2017 | Woodgate et al. | |
| 2017/0285347 | A1 | 10/2017 | Cai et al. | |
| 2017/0299869 | A1 | 10/2017 | Urey et al. | |
| 2017/0299870 | A1 | 10/2017 | Urey et al. | |
| 2018/0003962 | A1 | 1/2018 | Urey et al. | |
| 2018/0003981 | A1 | 1/2018 | Urey | |
| 2018/0074248 | A1 | 3/2018 | Shani et al. | |
| 2018/0100959 | A1 | 4/2018 | Vasylyev | |
| 2018/0143427 | A1 | 5/2018 | Griffin et al. | |
| 2018/0231784 | A1 | 8/2018 | Koudsi et al. | |
| 2018/0252917 | A1 | 9/2018 | Takahashi et al. | |
| 2018/0252918 | A1 | 9/2018 | Takahashi et al. | |
| 2018/0284441 | A1 | 10/2018 | Cobb | |
| 2018/0348524 | A1 | 12/2018 | Blum et al. | |
| 2019/0041232 | A1 | 2/2019 | Maruyama et al. | |
| 2019/0090766 | A1 | 3/2019 | Block et al. | |
| 2019/0094537 | A1 | 3/2019 | Choi et al. | |
| 2019/0094550 | A1 | 3/2019 | Takagi et al. | |
| 2019/0107719 | A1 | 4/2019 | Edwin et al. | |
| 2019/0129213 | A1 | 5/2019 | Cho et al. | |
| 2019/0162950 | A1 | 5/2019 | Lapstun | |
| 2019/0187343 | A1* | 6/2019 | Minagawa | G02B 27/0018 |
| 2019/0187472 | A1 | 6/2019 | Choi et al. | |
| 2019/0187541 | A1* | 6/2019 | Yoshida | G02B 5/09 |
| 2019/0227305 | A1 | 7/2019 | Fortin-Desch Nes et al. | |
| 2019/0235252 | A1 | 8/2019 | Freedman et al. | |
| 2019/0235281 | A1 | 8/2019 | Etzkorn et al. | |
| 2019/0265476 | A1 | 8/2019 | Blum et al. | |
| 2019/0265515 | A1 | 8/2019 | Lee et al. | |
| 2019/0278092 | A1 | 9/2019 | Kuo et al. | |
| 2019/0282399 | A1 | 9/2019 | Goetz | |
| 2019/0289284 | A1 | 9/2019 | Smith et al. | |
| 2019/0293938 | A1 | 9/2019 | Le Saux et al. | |
| 2019/0331923 | A1 | 10/2019 | Cai et al. | |
| 2019/0331924 | A1 | 10/2019 | Cai et al. | |
| 2020/0235698 | A1* | 7/2020 | Citron | G02B 5/09 |

* cited by examiner

AUGMENTED REALITY (AR) EYEWEAR WITH AT LEAST ONE QUASI FRESNEL REFLECTOR (QFR)

CROSS-REFERENCE TO RELATED APPLICATIONS

This present application claims the priority benefit of U.S. provisional patent application No. 62/791,359 which was filed on 2019 Jan. 11. This present application also is a continuation in part of U.S. patent application Ser. No. 16/175,924 which was filed on 2018 Oct. 31.

U.S. patent application Ser. No. 16/175,924 claimed the priority benefit of U.S. provisional patent application No. 62/751,076 which was filed on 2018 Oct. 26. U.S. patent application Ser. No. 16/175,924 also claimed the priority benefit of U.S. provisional patent application No. 62/749,775 which was filed on 2018 Oct. 24. U.S. patent application Ser. No. 16/175,924 also claimed the priority benefit of U.S. provisional patent application No. 62/746,487 which was filed on 2018 Oct. 16. U.S. patent application Ser. No. 16/175,924 also claimed the priority benefit of U.S. provisional patent application No. 62/720,171 which was filed on 2018 Aug. 21. U.S. patent application Ser. No. 16/175,924 also claimed the priority benefit of U.S. provisional patent application No. 62/716,507 which was filed on 2018 Aug. 9. U.S. patent application Ser. No. 16/175,924 also claimed the priority benefit of U.S. provisional patent application No. 62/714,684 which was filed on 2018 Aug. 4. U.S. patent application Ser. No. 16/175,924 also claimed the priority benefit of U.S. provisional patent application No. 62/703,025 which was filed on 2018 Jul. 25. U.S. patent application Ser. No. 16/175,924 also claimed the priority benefit of U.S. provisional patent application No. 62/699,800 which was filed on 2018 Jul. 18. U.S. patent application Ser. No. 16/175,924 also claimed the priority benefit of U.S. provisional patent application No. 62/695,124 which was filed on 2018 Jul. 8. U.S. patent application Ser. No. 16/175,924 also was a continuation in part of U.S. patent application Ser. No. 15/942,498 which was filed on 2018 Mar. 31 and issued as U.S. patent Ser. No. 10/338,400 on 2019 Jul. 2. U.S. patent application Ser. No. 16/175,924 also claimed the priority benefit of U.S. provisional patent application No. 62/646,856 which was filed on 2018 Mar. 22. U.S. patent application Ser. No. 16/175,924 also claimed the priority benefit of U.S. provisional patent application No. 62/638,087 which was filed on 2018 Mar. 3. U.S. patent application Ser. No. 16/175,924 also claimed the priority benefit of U.S. provisional patent application No. 62/624,699 which was filed on 2018 Jan. 31.

U.S. patent application Ser. No. 15/942,498 claimed the priority benefit of U.S. provisional patent application No. 62/646,856 which was filed on 2018 Mar. 22. U.S. patent application Ser. No. 15/942,498 also claimed the priority benefit of U.S. provisional patent application No. 62/638,087 which was filed on 2018 Mar. 3. U.S. patent application Ser. No. 15/942,498 also claimed the priority benefit of U.S. provisional patent application No. 62/624,699 which was filed on 2018 Jan. 31. U.S. patent application Ser. No. 15/942,498 also claimed the priority benefit of U.S. provisional patent application No. 62/572,328 which was filed on 2017 Oct. 13. U.S. patent application Ser. No. 15/942,498 also claimed the priority benefit of U.S. provisional patent application No. 62/563,798 which was filed on 2017 Sep. 27. U.S. patent application Ser. No. 15/942,498 also claimed the priority benefit of U.S. provisional patent application No. 62/561,834 which was filed on 2017 Sep. 22. U.S. patent application Ser. No. 15/942,498 also claimed the priority benefit of U.S. provisional patent application No. 62/528,331 which was filed on 2017 Jul. 3.

The entire contents of these related applications are incorporated herein by reference.

FEDERALLY SPONSORED RESEARCH

Not Applicable

SEQUENCE LISTING OR PROGRAM

Not Applicable

BACKGROUND

Field of Invention

This invention relates to optical structures for augmented reality eyewear.

INTRODUCTION

Augmented Reality (AR) eyewear allows a person to simultaneously see their environment and virtual objects displayed in their field of vision. Augmented reality can include simulated interactions between virtual objects and real objects in the person's environment. Augmented reality has numerous potential applications in the fields of commerce and shopping, defense, diet and nutritional improvement, education, engineering, entertainment, exploration, gaming, interior design, maintenance, manufacturing, medicine, movies, navigation and transportation, public safety, socializing, and sports.

There has been considerable progress toward the creation of Augmented Reality (AR) eyewear which allows a person to see their environment and virtual objects displayed in their field of vision. However, challenges remain. There is currently a challenging tradeoff between the quality of virtual images displayed and the size of the eyewear. Some current AR eyewear devices (such as most heads-up displays and bird bath designs) display virtual images with relatively-good image quality and a relatively-large field of view, but are rather large and bulky. Other current AR eyewear devices (such as most waveguide devices) are relatively compact, but generally display virtual images with relatively-poor image quality and a relatively-small field of view. This invention addresses these limitations with a novel design for Augmented Reality (AR) eyewear which enables decent display of virtual objects in a person's field of view with relatively compact eyewear and minimal interference with the person's view of their environment.

Review of the Relevant Art

U.S. patent application 20190107719 (Edwin et al., Apr. 11, 2019, "Augmented Reality Display Comprising Eyepiece Having a Transparent Emissive Display") discloses an augmented reality head-mounted display system with a transparent emissive display. U.S. patent application 20190235252 (Freedman et al., Aug. 1, 2019, "Method and System for Large Field of View Display with Scanning Mirror Having Optical Power") discloses an image display system with light sources which are configured to emit uncollimated light and also an eyepiece waveguide having an input port which receives beams of light at differing angles. U.S. patent application 20140003762 (Macnamara, Jan. 2, 2014, "Multiple Depth Plane Three-Dimensional Display Using a Wave Guide Reflector Array Projector") discloses a two-dimensional array of linear wave guides and 2D planar wave guide assemblies.

U.S. patent application 20190227305 (Fortin-Desch Nes et al., Jul. 25, 2019, "Optical Arrangements Including Fresnel Lens Elements") discloses an optical lens arrangement with a first Fresnel lens element and a second lens element. U.S. patent application 20190090766 (Block et al., Mar. 28, 2019, "Concentric Architecture for Optical Sensing") discloses an electronic device with optical sensing and a concentric architecture. U.S. patent Ser. No. 10/215,698 (Han et al., Feb. 29, 2019, "Multiple Light Paths Architecture and Obscuration Methods for Signal and Perfusion Index Optimization") disclose a photoplethysmographic device with one or more light emitters and one or more light sensors.

U.S. patent application 20190235281 (Etzkorn et al., Aug. 1, 2019, "Eye-Mountable Device to Provide Automatic Accommodation and Method of Making Same") discloses an eye-mountable device with a lens enclosure, liquid crystal material, first and second electrodes, a substrate, and a controller. U.S. patent application 20190265515 (Lee et al., Aug. 29, 2019, "Failsafe Operation of Eye-Mountable Device") discloses an eye-mountable device with an optical lens, an accommodation actuator to provide vision accommodation for the optical lens, and a controller including an accommodation logic to select one of a plurality of vision accommodation states for the device. U.S. patent application 20190282399 (Goetz, Sep. 19, 2019, "Ultrasonic Ophthalmic Device") discloses an ophthalmic device with an ultrasonic transducer, an accommodation actuator, and a controller. U.S. patent application 20130314759 (Miao et al., Nov. 28, 2013, "Compact See-Through Display System") discloses an optical system with a display panel, an image former, a viewing window, a proximal beam splitter, and a distal beam splitter.

U.S. patent applications 20170285347 (Cai et al., Oct. 5, 2017, "Augmented/Virtual Reality Near-Eye Displays with Edge Imaging Lens Comprising A Plurality of Display Devices"), 20190331923 (Cai et al., Oct. 31, 2019, "Augmented/Virtual Reality Near-Eye Displays with Edge Imaging Lens Comprising a Plurality of Display Devices"), and 20190331924 (Cai et al., Oct. 31, 2019, "Augmented/Virtual Reality Near-Eye Displays with Edge Imaging Lens Comprising a Plurality of Display Devices") disclose a lens with a beam-splitting interface which is horizontal along the width of the lens.

U.S. patent application 20190129213 (Cho et al., May 2, 2019, "Display Apparatus") discloses a display apparatus with a liquid crystal panel and a shutter panel. U.S. patent application 20190094537 (Choi et al., Mar. 28, 2019, "Display Device") discloses a display device with a plurality of diffractive optical elements which are each configured to emit light guided through a light guide plate to a user. U.S. patent application 20190187472 (Choi et al., Jun. 20, 2019, "Optical System and Wearable Display Apparatus Having the Same") discloses an optical system with a first waveguide, a transmissive reflective layer on the first waveguide, a second waveguide on the transmissive reflective layer, an in-coupler, and an out-coupler.

U.S. patent application 20170299870 (Urey et al., Oct. 19, 2017, "Apparatus for Generating a Coherent Beam Illumination") discloses an apparatus which generates a coherent illumination beam. U.S. patent application 20180003981 (Urey, Jan. 4, 2018, "Near-to-Eye Display Device with Spatial Light Modulator and Pupil Tracker") discloses a near-to-eye display device with a spatial light modulator, a rotatable reflective optical element, and a pupil-tracking device. U.S. patent application 20180003962 (Urey et al., Jan. 4, 2018, "Near-to-Eye Display Device with Variable Resolution") discloses a near-to-eye display device with a spatial light modulator and a microdisplay. U.S. patent application 20170299869 (Urey et al., Oct. 19, 2017, "Near-to-Eye Display Device") discloses a near-to-eye display device with a spatial light modulator which modulates an illumination wave to create a virtual-scene wave that is steered to an exit pupil plane.

U.S. patent application 20180252917 (Takahashi et al., Sep. 6, 2018, "Display Image Projection Apparatus and Display Image Projection System") discloses a free-curved surface Fresnel mirror inside an HUD unit. U.S. patent application 20180252918 (Takahashi et al., Sep. 6, 2018, "Display Image Projection System") discloses an aspherical mirror or a free-curved surface mirror inside an HUD unit.

U.S. patent application 20130021658 (Miao et al., Jan. 24, 2013, "Compact See-Through Display System") discloses an optical system with a display panel, an image former, a viewing window, a proximal beam splitter, and a distal beam splitter. U.S. patent application 20190265476 (Blum et al., Aug. 29, 2019, "See-Through Near Eye Optical Module") discloses a semi-transparent near eye optical module with a transparent sparsely populated near eye display comprising a plurality of pixels or pixel patches and a sparsely populated micro-lens array. U.S. patent application 20190041232 (Maruyama et al., Feb. 7, 2019, "Vehicular Display Device") discloses a vehicular display device which displays a guide route. U.S. patent application 20180231784 (Koudsi et al., Aug. 16, 2018, "Optical Display System for Augmented Reality and Virtual Reality") discloses optical display systems and methods for providing three-dimensional and two-dimensional convergence corrected images to a user.

U.S. patent application 20150036223 (Dobschal et al., Feb. 5, 2015, "Display Device Comprising Multifunction Glass, Production Method and Optical Element Having a Fresnel Structure") discloses a multifunction optical element with a Fresnel structure for out coupling. U.S. patent application 20160178910 (Giudicelli et al., Jun. 23, 2016, "Optical Projection Device for Display Means Such as Augmented Reality Glasses") discloses augmented reality glasses with a planar optical guide, at least two input optics, and at least two collimation elements. U.S. patent application 20180284441 (Cobb, Oct. 4, 2018, "Wide Field Head Mounted Display") discloses an optical apparatus with a concave spherical mirror that has a center of curvature at the viewer's pupil.

U.S. patent application 20180348524 (Blum et al., Dec. 6, 2018, "Releasably Attachable Augmented Reality System for Eyewear") discloses an Augmented Reality apparatus which uses existing eyewear as an attachment platform. U.S. patent applications 20140036361 (Woodgate et al., Feb. 6, 2014, "Directionally Illuminated Waveguide Arrangement") and 20170139110 (Woodgate et al., May 18, 2017, "Directionally Illuminated Waveguide Arrangement") disclose a light-guiding valve apparatus comprising an optical valve, a two dimensional light source array, and a focusing optic for providing large area collimated illumination from localized light sources.

U.S. patent application 20190094550 (Takagi et al., Mar. 28, 2019, "Virtual Image Display Device") discloses a non-telecentric optical system with an image display unit. U.S. patent application 20180074248 (Shani et al., Mar. 15, 2018, "Slim Waveguide Coupling Apparatus and Method") discloses an illumination structure with a discrete light source near a bottom surface of a waveguide and below a depression in a top surface thereof. U.S. patent application 20180143427 (Griffin et al., May 24, 2018, "Optical System for a Display with an Off Axis Projector") discloses an optical projection system that presents a displayed virtual image at a predetermined distance in front of a viewing position. U.S. patent application 20190289284 (Smith et al., Sep. 19, 2019, "Light Field Capture and Rendering for Head-Mounted Displays") discloses systems and methods for capturing and rendering light fields for head-mounted displays. U.S. patent application 20180100959 (Vasylyev, Apr. 12, 2018, "Illumination System Using Edge-Lit Waveguide and Microstructured Surfaces") discloses an apparatus for distributing light from a planar waveguide through an array of elongated surface relief features formed in a major surface of the waveguide.

U.S. patent application 20190293938 (Le Saux et al., Sep. 26, 2019, "Method for Providing a Display Unit for an Electronic Information Device") discloses a display device with an optical element having a nonzero optical power. U.S. patent application 20190162950 (Lapstun, May 30, 2019, "Head-Mounted Light Field Display") by the genius from down under discloses a head-mounted light field display device with at least one multiplexed light field display module adapted to face an eye of a viewer wearing the device, the multiplexed light field display module comprising a light field view image generator and a waveguide with a set of shutters. U.S. patent application 20130077175 (Hotta et al., Mar. 28, 2013, "Display Device") discloses a display device with an image projection unit, an optical unit, and a mounting unit. U.S. patent application 20190278092 (Kuo et al., Sep. 12, 2019, "Augmented Reality Display System and Display Method Thereof") discloses an augmented reality display system with an input unit, an operation processing unit, and an output unit.

SUMMARY OF THE INVENTION

This invention is Augmented Reality (AR) eyewear with at least one Quasi Fresnel Reflector (QFR). A conventional Fresnel lens refracts radially-diverging light rays from a light source at a central-axial location into collimated light rays. A conventional Fresnel reflector reflects collimated light rays from a light source at a central-axial and/or at a very distant location into radially-converging light rays which converge on a central-axial location. A Quasi Fresnel Reflector (QFR) reflects light rays from a non-central (lateral) light source into radially-converging light rays which converge on a central-axial location. In this invention a Quasi Fresnel Reflector (QFR) is used to reflect light rays from a lateral Light Emitter Array (LEA) toward a person's eye to create virtual images in the person's field of view.

In an example, a Quasi Fresnel Reflector (QFR) can have an array of partially-reflective, partially-transmissive surfaces, wherein the surfaces collectively reflect light beams from a LEA toward a person's eye to create virtual images in the person's field of view. In an example, surfaces in the array of partially-reflective, partially-transmissive surfaces can be flat. In an example, a Quasi Fresnel Reflector (QFR) can have: an array of linear, partially-reflective, partially-transmissive surfaces; an array of nested, arcuate, partially-reflective, partially-transmissive surfaces; and/or a spoke-and-ring array of partially-reflective, partially-transmissive surfaces. In an example, reflective surfaces which are closer to the center of the QFR can be closer together than reflective surfaces which are farther from the center of the QFR to enable higher image resolution in the center of a person's field of view.

In an example, there can be two Quasi Fresnel Reflectors (QFRs) in augmented reality eyewear, one QFR in front of each of a person's eyes. Augmented Reality (AR) eyewear with one or more Quasi Fresnel Reflectors (QFRs) enables the display of virtual objects in a person's field of view with a more compact design than most heads-up display or bird bath AR designs, with less loss of field of view or color blurring than most waveguide designs, and with less loss of real world three-dimensionality than most computer display (e.g. digital merging) designs.

INTRODUCTION TO THE FIGURES

Figure 2:
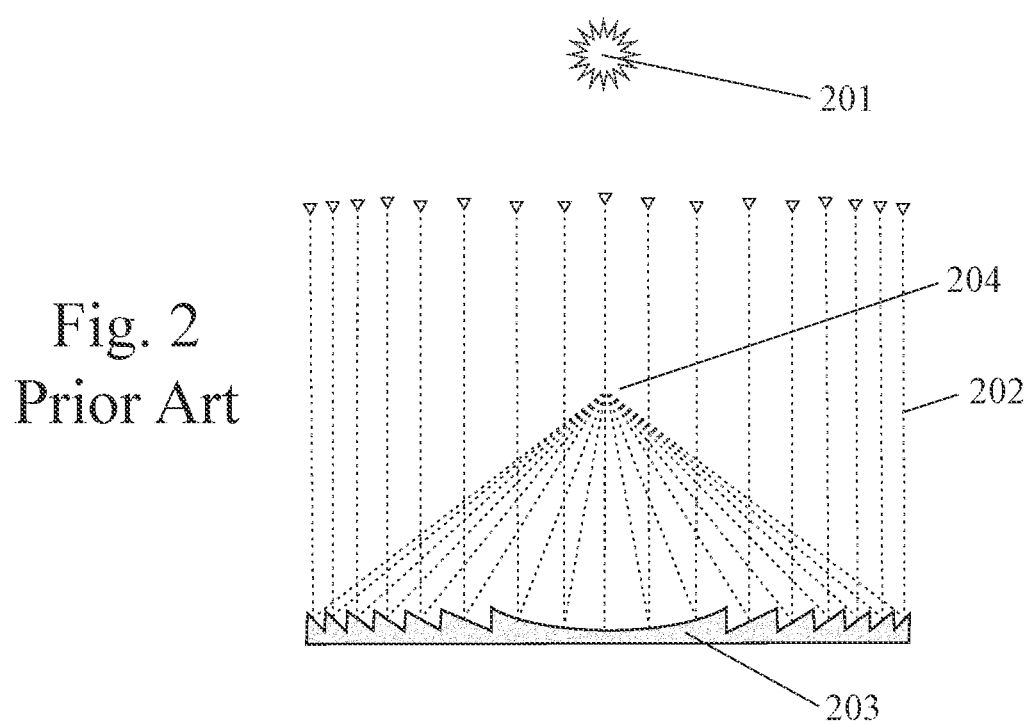
Figure 3:
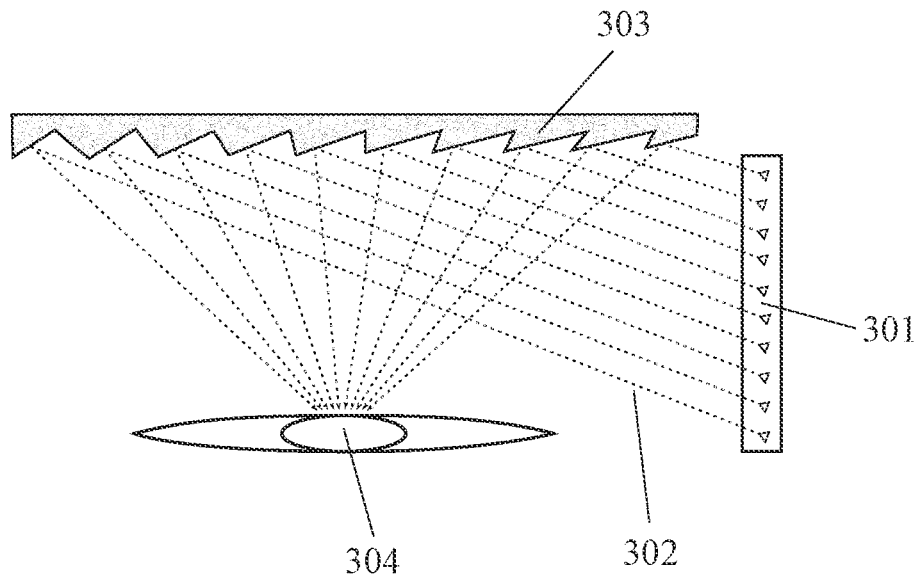
Figure 4:
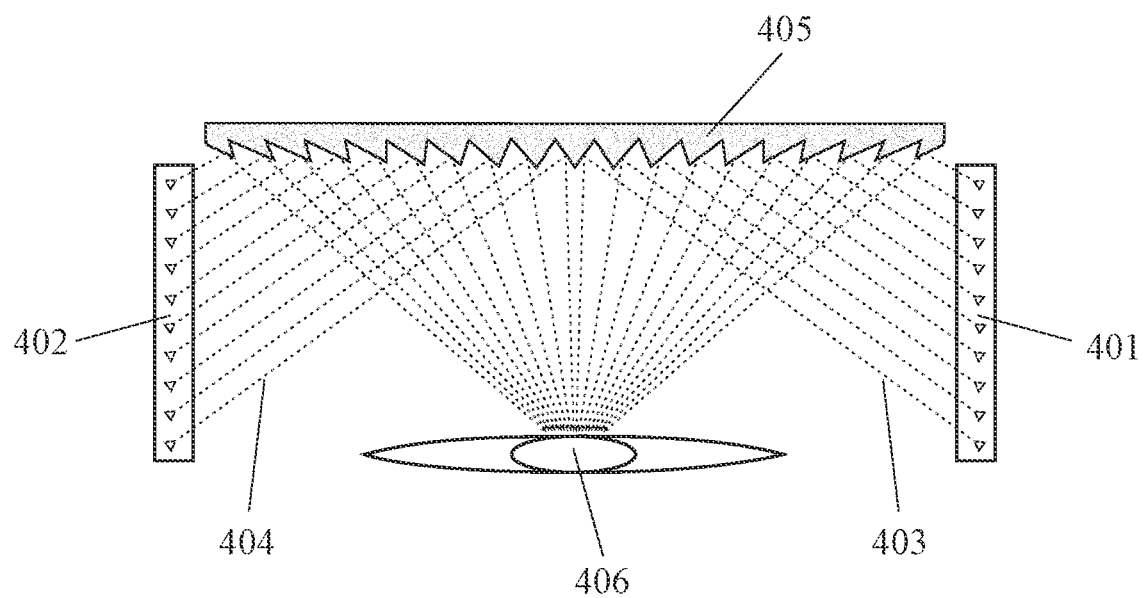

FIG. 1 shows a classic Fresnel lens which is prior art.
FIG. 2 shows a classic Fresnel reflector which is prior art.
FIG. 3 shows a Quasi Fresnel Reflector (QFR) and one Light Emitter Array (LEA) being used for augmented reality eyewear.
FIG. 4 shows a Quasi Fresnel Reflector (QFR) and two Light Emitter Arrays (LEAs) being used for augmented reality eyewear.

DETAILED DESCRIPTION OF THE FIGURES

FIG. 1 shows a cross-sectional (e.g. top down) view of a classic Fresnel lens which is prior art. A classic Fresnel lens receives non-collimated (e.g. non-parallel) light rays into a first side of the lens and emits substantially-collimated (e.g. substantially-parallel) light rays out from the opposite side of the lens. In an example, a classic Fresnel lens can receive light rays which have been radially emitted from a light source on a first side of the lens and refract those light rays into a collimated beam of light (with substantially-parallel light rays) which exits the opposite side of the lens. Fresnel lenses have been frequently used in light houses. In light house applications, a Fresnel lens collimates light rays from lamp on one side of the lens and emits a collimated (parallel-ray) light beam out from the opposite side. The collimated light beam can be seen by ships over long distances because it does not disperse very much. Fresnel lenses are also commonly used for other purposes such as theater spot lights.

FIG. 1 shows a light source 101 which radially emits light beams 102 which are received by a first side of a Fresnel lens 103 and refracted into substantially-collimated (e.g. substantially-parallel) light beams which exit out from the opposite side of the Fresnel lens. In this classic example, the light source is centrally located on a virtual extension of the central axis of the Fresnel lens.

FIG. 2 shows a cross-sectional (e.g. top down) view of a classic Fresnel reflector which is prior art. A classic Fresnel reflector receives substantially-collimated (e.g. substantially-parallel) light rays on a first side of the reflector and emits radially-converging (e.g. focusing) light rays from the same (first) side toward a focal area on the same (first) side of the reflector. For example, a classic Fresnel reflector can: receive light rays on a first side of the reflector from a light source (such as the sun) which is so distant that its light rays are substantially collimated (e.g. parallel); and reflect those light rays into convergence on a focal area on the same (first) side of the reflector. Fresnel reflectors are frequently used in solar energy collectors. In solar energy collector applications, a classic Fresnel reflector collects collimated light rays from the sun and reflects these light rays into convergence at a focal location. Heat from the light rays focused on that location is converted into electricity. Some solar energy collectors use an array with circular reflector rings which focus energy at one central spot. Other solar energy collectors use an array of linear reflectors which focus energy along a central linear area.

FIG. 2 shows distant light source 201 which emits light beams 202. The light source is so far away that these light beams become substantially-collimated (e.g. substantially-parallel) by the time they reach the Fresnel reflector 203 which, in turn, reflects these light beams into convergence at focal point 204. In this example, the light source is so distant and its light beams are so collimated, that functionally it is as if the light source were centrally located on a virtual extension of the central axis of the Fresnel reflector. This cross-sectional (e.g. top down) view looks substantially the same for an array of circular reflective surfaces (e.g. reflective rings) or for an array of vertical linear reflective surfaces (e.g. linear reflectors).

FIG. 3 shows a cross-sectional (e.g. top down) view of one example a Quasi Fresnel Reflector (QFR) being used as part of Augmented Reality (AR) eyewear. This Quasi Fresnel Reflector (QFR) differs from a classic Fresnel reflector because the light source is not along a virtual extension of the central axis of the reflector. In this example, the light source is one Light Emitter Array (LEA) on a first side of the QFR. According, this type of Quasi Fresnel Reflector (QFR) can be called a unilateral Quasi Fresnel Reflector (QFR). In this example, the LEA is located on the right side of the QFR. Augmented reality eyewear can include two such QSR and LEA configurations, one in front of each eye.

FIG. 3 shows a lateral Quasi Fresnel Reflector (QFR) 303 which receives light rays 302 from Light Emitter Array (LEA) 301 on a first side (right side in this case) of the QSF and reflects those light rays toward a person's eye 304. In this example, the light rays are reflected so as to converge on (or within) the person's eye. For augmented reality, a Quasi Fresnel Reflector (QFR) should be partially-transmissive and partially-reflective so that: (a) the QFR partially transmits light beams from the person's environment so that the person sees their environment; and (b) the QFR partially reflects light beams from the Light Emitter Array (LEA) so that the person sees virtual images in juxtaposition with their environment. In this example, a QFR comprises an array of partially-reflective, partially-transmissive flat surfaces (e.g. partially-reflective microridges or micromirrors). Other components and variations discussed elsewhere in this disclosure and in priority-linked disclosures can also be applied to this example.

FIG. 4 shows a cross-sectional (e.g. top down) view of another example a Quasi Fresnel Reflector (QFR) being used as part of Augmented Reality (AR) eyewear. This Quasi Fresnel Reflector (QFR) differs from a classic Fresnel reflector because there are two light sources and neither is along a virtual extension of the central axis of the reflector. In this example, there a first Light Emitter Array (LEA) 401 on a first (e.g. right) side of a Quasi Fresnel Reflector (QFR) 405 and a second Light Emitter Array (LEA) 402 on a second (e.g. left) side of the QFR. Accordingly, this type of Quasi Fresnel Reflector (QFR) can be called a bilateral Quasi Fresnel Reflector (QFR). Augmented reality eyewear can include two such QSRs, one in front of each eye.

FIG. 4 shows a bilateral Quasi Fresnel Reflector (QFR) 405 which receives light rays 403 from a first Light Emitter Array (LEA) 401 on a first (e.g. right) side of the QSF and light rays 404 from a second Light Emitter Array (LEA) 402 on a second (e.g. left) side of the QSF. The QSF reflects those light rays toward (convergence on or within) a person's eye 406. For augmented reality, a Quasi Fresnel Reflector (QFR) should be partially-transmissive and partially-reflective so that: (a) the QFR partially transmits light beams from the person's environment so that the person sees their environment; and (b) the QFR partially reflects light beams from the Light Emitter Arrays (LEAs) so that the person sees virtual images in juxtaposition with their environment. In this example, the QFR comprises an array of partially-reflective, partially-transmissive flat surfaces (e.g. partially-reflective microridges or micromirrors). Other components and variations discussed elsewhere in this disclosure and in priority-linked disclosures can also be applied to this example.

In an example, a Quasi Fresnel Reflector (QFR) can be substantially flat and/or planar. In an example, a QFR can be concave. In an example, a QFR can be convex. In an example, Augmented Reality (AR) eyewear can have two Quasi Fresnel Reflectors (QFRs), one in front of each eye. In an example, a QFR can comprise an array of partially-reflective, partially-transmissive surfaces. In an example, these surfaces can be partially-reflective microridges. In an example, these surfaces can be partially-reflective micromirrors. In an example, these surfaces can be half-silvered micromirrors.

In an example, a QFR can comprise an array of nested (e.g. concentric) partially-reflective surfaces (e.g. microridge rings or micromirror rings). In an example, a QFR can comprise an array of linear partially-reflective surfaces (e.g. linear microridges or linear micromirrors). In an example, an array of partially-reflective surfaces can be a spoke-and-ring array with radial spokes and nested rings. In an example, reflective components in outer rings can be larger than reflective components in inner rings. In an example, reflective components in outer rings can be father apart than reflective components in inner rings. In an example, there can be a greater number of reflective components in outer rings than in inner rings.

In an example, a QFR can have a cross-section with a saw-tooth (or sinusoidal) shape. In an example, there can be variation in the shapes and/or sizes of teeth (or waves) in this cross-sectional shape. In an example, teeth (or waves) which are closer to the center of the QFR can be shorter than teeth (or waves) which are farther from the center (e.g. closer to the peripheral edges) of the QFR. In an example, teeth (or waves) which are closer to the center of the QFR can extend farther out from the virtual plane of the QFR than teeth (or waves) which are farther from the center (e.g. closer to the peripheral edges) of the QFR. In an example, teeth (or waves) which are father from the LEA can tilt more toward the LEA than teeth (or waves) which are closer to the LEA.

In an example, a Quasi Fresnel Reflector (QFR) can be made from polycarbonate. In an example, a Quasi Fresnel Reflector (QFR) can be made from a material selected from the group consisting of: polycarbonate, glass, photopolymer, photorefractive, crystal, polyacrylate, acrylic, polyvinyl alcohol, indium tin oxide, silver, polypyrrole, acetate, neoprene, polypropylene oxide, carbon, polymethyl methacrylate, polyvinylidene difluoride, carbon nanotubes, parylene, polyimide, silicon, polyethylene naphtalate, silicone, dichromated gelatin, silicon nitride, ethylene tetrafluoroethylene, jaskonium, silicon oxide, lithium niobate, polyethylene terephthalate, gallium nitride, tantalum oxide, polyethylene oxide, polytetrafluoroethylene, polyurethane, polyvinylpyrrolidone, polyaniline, graphene, polytetramethylene oxide, silver alloy, polyamide, and silver halide emulsion.

In an example, a Light Emitter Array (LEA) can be two-dimensional light emitter array. In an example, a Light Emitter Array (LEA) can be substantially flat. In an example, a Light Emitter Array (LEA) can emit collimated light. In an example, a Light Emitter Array (LEA) can emit coherent light. In an example, there can be one Light Emitter Array (LEA) per Quasi Fresnel Reflector (QFR). In an example, a single LEA can be located to the right or left of a QFR. In an example, a single LEA can be located above or below a QFR. In an example, there can be a plurality of Light Emitter Arrays (LEAs) around (the perimeter of) a QFR. In an example, a Light Emitter Array (LEA) can be an annular or circular light emitter array which encircles the perimeter of a QFR. In an example, an annular Light Emitter Array (LEA) can be combined with a QFR comprising an array of nested (e.g. concentric) partially-reflective rings.

In an example, a light emitter in a Light Emitter Array (LEA) can be a Light Emitting Diode (LED). In an example, a light emitter can be selected from the group consisting of: Light Emitting Diode (LED), collimated light projector, edge emitting laser, holographic projector, low-power (e.g. nano-watt) laser, micro LED, microdisplay, organic light emitting diode (OLED), quantum dot laser, resonant cavity LED, scanning laser projector, and vertical-cavity surface-emitting laser (VCSEL). In an example, a light emitter can emit collimated light. In an example, a light emitter can emit coherent light. In an example, a plurality of light emitters in a Light Emitter Array (LEA) can emit beams of light at different times. In an example, a plurality of light emitters can emit beams of light with different colors, wavelengths, and/or wavelength ranges. In an example, a plurality of light emitters can emit beams of light with different phases, polarities, or levels of coherence.

In an example, augmented reality eyewear can further comprise an eyewear frame which holds Quasi Fresnel Reflectors (QFRs) and Light Emitter Arrays (LEAs) in proximity to a person's eyes. In an example, augmented reality eyewear can further comprise a Digital Micromirror Device (DMD) which receives light beams from a LEA and (selectively) reflects those light beams toward a QFR. In an example, augmented reality eyewear can further comprise an electromagnetic field generator which generates an electromagnetic field which (selectively) changes the orientations and/or shapes of reflective surfaces in a QFR.

In an example, augmented reality eyewear can further comprise one or more electromagnetic actuators which (selectively) change the orientations and/or shapes of reflective surfaces in a QFR. In an example, augmented reality eyewear can further comprise one or more lenses. In an example, augmented reality eyewear can further comprise an array of microlenses which adjustable focal lengths. In an example, augmented reality eyewear can further comprise a light-masking layer which (selectively and adjustably) reduces the transmission of light from the environment through the QFR. In an example, augmented reality eyewear can further comprise one or more components selected from the group consisting of: power source, data processor, data transmitter, data receiver, motion sensor, EEG sensor, and touch-based display.

In an example, augmented reality eyewear can comprise: a Quasi Fresnel Reflector (QFR) which is configured to be worn in front of a person's eye; wherein the QFR further comprises an array of horizontal, linear, partially-reflective, partially-transmissive surfaces (e.g. microridges or micromirrors); a first Light Emitter Array (LEA) which is substantially above the QFR; and a second Light Emitter Array (LEA) which is substantially below the QFR; wherein the surfaces in the QFR collectively reflect light beams from the first LEA and the second LEA toward the person's eye to create virtual images in the person's field of view; wherein the orientation angle of a surface is an upward-facing angle of intersection between the surface and the virtual plane of the QFR; wherein a first subset of surfaces is first distance from the upper side of the QFR and has a first orientation angle; wherein a second subset of surfaces is a second distance from the upper side of the QFR and has a second orientation angle; wherein a third subset of surfaces is a third distance from the upper side of the QFR and has a third orientation angle; wherein a fourth subset of surface is a fourth distance from the upper side of the QFR and has a fourth orientation angle; wherein the second distance is greater than the first distance, the third distance is greater than the second distance, and the fourth distance is greater than the third distance; wherein the second orientation angle is greater than the first orientation angle; and wherein the third orientation angle is greater than the fourth orientation angle.

In an example, Augmented Reality (AR) eyewear can comprise: a Quasi Fresnel Reflector (QFR) which is configured to be worn in front of a person's eye; wherein the QFR further comprises an array of vertical, linear, partially-reflective, partially-transmissive surfaces (e.g. microridges or micromirrors); a first Light Emitter Array (LEA) which is substantially to the right of the QFR; and a second Light Emitter Array (LEA) which is substantially to the left of the QFR; wherein the surfaces in the QFR collectively reflect light beams from the first LEA and the second LEA toward the person's eye to create virtual images in the person's field of view; wherein the orientation angle of a surface is a right-facing angle of intersection between the surface and the virtual plane of the QFR; wherein a first subset of surfaces is first distance from the right side of the QFR and has a first orientation angle; wherein a second subset of surfaces is a second distance from the right side of the QFR and has a second orientation angle; wherein a third subset of surfaces is a third distance from the right side of the QFR and has a third orientation angle; wherein a fourth subset of surface is a fourth distance from the right side of the QFR and has a fourth orientation angle; wherein the second distance is greater than the first distance, the third distance is greater than the second distance, and the fourth distance is greater than the third distance; wherein the second orientation angle is greater than the first orientation angle; and wherein the third orientation angle is greater than the fourth orientation angle.

In yet another example, this invention can be embodied in augmented reality eyewear comprising: a Light Emitter Array (LEA); a Digital Micromirror Device (DMD); and a Quasi Fresnel Reflector (QFR); wherein the QFR is configured to be worn in front of a person's eye; wherein the QFR further comprises an array of partially-reflective, partially-transmissive surfaces (e.g. microridges or micromirrors); wherein the DMD receives light beams from the LEA and reflects the light beams toward the QFR; and wherein the QFR receives the light beams from the DMD and reflects the light beams toward the person's eye to create virtual images in the person's field of view. In another embodiment, augmented reality eyewear can comprise: an annular Light Emitter Array (LEA) which creates virtual images in a person's field of view; and a Quasi Fresnel Reflector (QFR) which is configured to be worn in front of the person's eye; wherein the LEA encircles the QFR; wherein the QFR further comprises an array of arcuate, partially-reflective, partially-transmissive surfaces (e.g. rings of micromirrors or microridges); wherein the surfaces collectively reflect light beams from the LEA toward the person's eye; and wherein surfaces which are closer to the center of the QFR extend farther out from the virtual plane of the QFR than surfaces which are farther from the center (e.g. closer to the peripheral edges) of the QFR.

For example, augmented reality eyewear can comprise: an annular Light Emitter Array (LEA) which creates virtual images in a person's field of view; and a Quasi Fresnel Reflector (QFR) which is configured to be worn in front of the person's eye; wherein the LEA encircles the QFR; wherein the QFR further comprises an array of partially-reflective, partially-transmissive ridges; wherein the ridges collectively reflect light beams from the light emitters toward the person's eye; and wherein ridges which are closer to the center of the QFR are closer to each other than ridges surfaces which are farther from the center (e.g. closer to the peripheral edges) of the QFR. In another embodiment, augmented reality eyewear can comprise: an annular Light Emitter Array (LEA) which creates virtual images in a person's field of view; and a Quasi Fresnel Reflector (QFR) which is configured to be worn in front of the person's eye; wherein the LEA encircles the QFR; wherein the QFR further comprises an nested (e.g. concentric) array of arcuate, partially-reflective, partially-transmissive ridges; and wherein the ridges collectively reflect light beams from the light emitters toward the person's eye to create virtual images in the person's field of view.

In one embodiment, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of arcuate, partially-reflective, partially-transmissive ridges; wherein the ridges collectively reflect light beams from the LEA toward the person's eye; and wherein a first subset of ridges which are closer to the first side of the QFR are less convex than a second subset of ridges which are farther from the first side of the QFR. In another example, this invention can be embodied in augmented reality eyewear comprising: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of linear, partially-reflective, partially-transmissive ridges; wherein the ridges collectively reflect light beams from the LEA toward the person's eye; wherein different ridges have different angles relative to the virtual plane which best fits the LEA; and wherein the angles of a first subset of ridges which are closer to the first side of the QFR are greater than the angles of a second subset of ridges which are farther from the first side of the QFR.

In one example, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of linear, partially-reflective, partially-transmissive ridges; wherein the ridges collectively reflect light beams from the LEA toward the person's eye; wherein different ridges have different angles relative to the virtual plane which best fits the QFR and/or relative to the virtual plane which best fits the LEA; and wherein the angles of a first subset of ridges which are closer to the first side of the QFR are less than the angles of a second subset of ridges which are farther from the first side of the QFR. In another embodiment, augmented reality eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of linear, partially-reflective, partially-transmissive ridges; wherein the ridges collectively reflect light beams from the LEA toward the person's eye; wherein different ridges have different angles relative to the virtual plane which best fits the QFR and/or relative to the virtual plane which best fits the LEA; wherein the angles of a first subset of ridges which are closer to the first side of the QFR are greater than the angles of a second subset of ridges which are farther from the first side of the QFR; and wherein ridges which closer to center of the QFR are closer together than ridges which are closer to the peripheral edges of the QFR.

For example, augmented reality eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of nested (e.g. concentric) arcuate, partially-reflective, partially-transmissive ridges; wherein the ridges collectively reflect light beams from the LEA toward the person's eye; wherein different ridges have different angles relative to the virtual plane which best fits the LEA; wherein the angles of a first subset of ridges which are closer to the first side of the QFR are less than the angles of a second subset of ridges which are farther from the first side of the QFR; and wherein ridges which closer to center of the QFR are closer together than ridges which are closer to the peripheral edges of the QFR.

In one embodiment, augmented reality eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of nested (e.g. concentric) arcuate, partially-reflective, partially-transmissive ridges; wherein the ridges collectively reflect light beams from the LEA toward the person's eye; wherein different ridges have different angles relative to the virtual plane which best fits the QFR; and wherein the angles of a first subset of ridges which are closer to the first side of the QFR are less than the angles of a second subset of ridges which are farther from the first side of the QFR. Alternatively, Augmented Reality (AR) eyeglasses can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of nested (e.g. concentric) arcuate, partially-reflective, partially-transmissive ridges; wherein the ridges collectively reflect light beams from the LEA toward the person's eye; wherein different ridges have different angles relative to the virtual plane which best fits the LEA; wherein the angles of a first subset of ridges which are closer to the first side of the QFR are greater than the angles of a second subset of ridges which are farther from the first side of the QFR; and wherein ridges which closer to center of the QFR are closer together than ridges which are closer to the peripheral edges of the QFR.

In an example, augmented reality eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of nested (e.g. concentric) arcuate, partially-reflective, partially-transmissive ridges; wherein the ridges collectively reflect light beams from the LEA toward the person's eye; wherein different ridges have different angles relative to the virtual plane which best fits the QFR; wherein the angles of a first subset of ridges which are closer to the first side of the QFR are greater than the angles of a second subset of ridges which are farther from the first side of the QFR; and wherein ridges which closer to center of the QFR are closer together than ridges which are closer to the peripheral edges of the QFR. In another example, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of nested (e.g. concentric) circular, partially-reflective, partially-transmissive ridges; wherein the ridges collectively reflect light beams from the LEA toward the person's eye; wherein different ridges have different angles relative to the virtual plane which best fits the QFR and/or relative to the virtual plane which best fits the LEA; wherein the angles of a first subset of ridges which are closer to the first side of the QFR are less than the angles of a second subset of ridges which are farther from the first side of the QFR; and wherein ridges which closer to center of the QFR are closer together than ridges which are closer to the peripheral edges of the QFR.

For example, augmented reality eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of nested (e.g. concentric) circular, partially-reflective, partially-transmissive ridges; wherein the ridges collectively reflect light beams from the LEA toward the person's eye; wherein different ridges have different angles relative to the virtual plane which best fits the LEA; wherein the angles of a first subset of ridges which are closer to the first side of the QFR are greater than the angles of a second subset of ridges which are farther from the first side of the QFR; and wherein ridges which closer to center of the QFR are closer together than ridges which are closer to the peripheral edges of the QFR. Alternatively, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of nested (e.g. concentric) circular, partially-reflective, partially-transmissive ridges; wherein the ridges collectively reflect light beams from the LEA toward the person's eye; wherein different ridges have different angles relative to the virtual plane which best fits the QFR; wherein the angles of a first subset of ridges which are closer to the first side of the QFR are greater than the angles of a second subset of ridges which are farther from the first side of the QFR; and wherein ridges which closer to center of the QFR are closer together than ridges which are closer to the peripheral edges of the QFR.

In one example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of arcuate subsets of partially-reflective, partially-transmissive micromirrors; wherein the micromirrors collectively reflect light beams from the LEA toward the person's eye in order to create virtual images in the person's field of view; and wherein arcuate subsets of micromirrors which are closer to the first side of the QFR are more convex than arcuate subsets of micromirrors which are farther from the first side of the QFR. In another embodiment, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of linear subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the LEA; and wherein the angles of a first linear subset of micromirrors which are closer to the first side of the QFR are greater than the angles of a second linear subset of micromirrors which are farther from the first side of the QFR.

For example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of linear subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR and/or relative to the virtual plane which best fits the LEA; and wherein the angles of a first subset of micromirrors which are closer to the first side of the QFR are greater than the angles of a second subset of micromirrors which are farther from the first side of the QFR. In another embodiment, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of linear subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR;

and wherein the angles of a first subset of micromirrors which are closer to the first side of the QFR are greater than the angles of a second subset of micromirrors which are farther from the first side of the QFR.

In an example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of nested arcuate subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the LEA; and wherein the angles of a first arcuate subset of micromirrors which are closer to the first side of the QFR are greater than the angles of a second arcuate subset of micromirrors which are farther from the first side of the QFR. In another example, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of nested arcuate subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR and/or relative to the virtual plane which best fits the LEA; wherein the angles of a first arcuate subset of micromirrors which are closer to the first side of the QFR are greater than the angles of a second arcuate subset of micromirrors which are farther from the first side of the QFR; and wherein arcuate subsets of micromirrors which closer to center of the QFR are closer together than arcuate subsets of micromirrors which are closer to the periphery of the QFR.

In one embodiment, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of nested arcuate subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR; wherein the angles of a first subset of micromirrors which are closer to the first side of the QFR are greater than the angles of a second subset of micromirrors which are farther from the first side of the QFR; and wherein subsets of micromirrors which closer to center of the QFR are closer together than subsets of micromirrors which are closer to the periphery of the QFR. In another example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of nested circular subsets of partially-reflective, partially-transmissive micromirrors; wherein the micromirrors collectively reflect light beams from the LEA toward the person's eye in order to create virtual images in the person's field of view; and wherein a first subset of micromirrors which are closer to the center of the QFR are closer to each other than a second subset of micromirrors which are farther from the center of the QFR.

In yet another example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of nested circular subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the LEA; and wherein the angles of a first subset of micromirrors which are closer to the first side of the QFR are less than the angles of a second subset of micromirrors which are farther from the first side of the QFR. In another example, Augmented Reality (AR) eyeglasses can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of nested circular subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR and/or relative to the virtual plane which best fits the LEA; and wherein the angles of a first subset of micromirrors which are closer to the first side of the QFR are less than the angles of a second subset of micromirrors which are farther from the first side of the QFR.

For example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of nested circular subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR; and wherein the angles of a first subset of micromirrors which are closer to the first side of the QFR are less than the angles of a second subset of micromirrors which are farther from the first side of the QFR. In another embodiment, Augmented Reality (AR) eyewear can comprise: a Light Emitter Array (LEA) which creates virtual images in a person's field of view; and a Quasi Fresnel Reflector (QFR)

which is configured to be worn in front of the person's eye; wherein the LEA is located to one side (e.g. right, left, top, or bottom) of the QFR; wherein the QFR further comprises an array of linear partially-reflective, partially-transmissive surfaces; wherein the surfaces collectively reflect light beams from the LEA toward the person's eye to create virtual images in the person's field of view; wherein the orientation angle of a surface is the LEA-facing angle of intersection between the surface and a virtual plane which best fits the QFR; wherein a first subset of surfaces in the QFR has a first orientation angle and is a first distance from the LEA; wherein a second subset of surfaces in the QFR has a second orientation angle and is a second distance from the LEA; wherein a third subset of surfaces in the QFR has a third orientation angle and is a third distance from the LEA; wherein a fourth subset of surfaces in the QFR has a fourth orientation angle and is a fourth distance from the LEA; wherein the second distance is greater than the first distance; wherein the third distance is greater than the second distance; wherein the fourth distance is greater than the third distance; wherein the second orientation angle is greater than the first orientation angle; wherein the third orientation angle is greater than the second orientation angle; and wherein the fourth orientation angle is greater than the third orientation angle.

In one embodiment, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located to one side (e.g. right, left, top, or bottom) of the QFR; wherein the QFR further comprises an array of linear subsets of partially-reflective, partially-transmissive micromirrors; wherein the micromirrors collectively reflect light beams from the LEA toward the person's eye to create virtual images in the person's field of view; and wherein linear subsets of micromirrors which are closer to the center of the QFR are closer to each other than linear subsets of micromirrors which are farther from the center of the QFR. In another embodiment, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located to one side (e.g. right, left, top, or bottom side) of the QFR; wherein the QFR further comprises an array of partially-reflective, partially-transmissive micromirrors; wherein the micromirrors collectively reflect light beams from the LEA toward the person's eye to create virtual images in the person's field of view; wherein the orientation angle of a micromirror in the QFR is the LEA-facing angle of intersection between a virtual plane which best fits the micromirror and a virtual plane which best fits the QFR; wherein a first subset of micromirrors in the QFR has a first orientation angle and is a first distance from the LEA; wherein a second subset of micromirrors in the QFR has a second orientation angle and is a second distance from the LEA; wherein a third subset of micromirrors in the QFR has a third orientation angle and is a third distance from the LEA; wherein a fourth subset of micromirrors in the QFR has a fourth orientation angle and is a fourth distance from the LEA; wherein the second distance is greater than the first distance; wherein the third distance is greater than the second distance; wherein the fourth distance is greater than the third distance; and wherein the fourth distance minus the third distance is less than the second distance minus the first distance.

In an example, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the LEA is located to one side (e.g. right, left, top, or bottom) of the QFR; wherein the QFR further comprises an array of partially-reflective, partially-transmissive, flat surfaces; wherein the surfaces collectively reflect light beams from the LEA toward the person's eye to create virtual images in the person's field of view; wherein the orientation angle of a surface is the LEA-facing angle of intersection between the surface and a virtual plane which best fits the QFR; wherein a first subset of surfaces in the QFR has a first orientation angle and is a first distance from the LEA; wherein a second subset of surfaces in the QFR has a second orientation angle and is a second distance from the LEA; wherein a third subset of surfaces in the QFR has a third orientation angle and is a third distance from the LEA; wherein a fourth subset of surfaces in the QFR has a fourth orientation angle and is a fourth distance from the LEA; wherein the second distance is greater than the first distance; wherein the third distance is greater than the second distance; wherein the fourth distance is greater than the third distance; and wherein the fourth distance minus the third distance is greater than the second distance minus the first distance.

In one example, augmented reality eyewear can comprise: a Light Emitter Array (LEA) which creates virtual images in a person's field of view; and a Quasi Fresnel Reflector (QFR) which is configured to be worn in front of the person's eye; wherein the LEA is located to one side (e.g. right, left, top, or bottom) of the QFR; wherein the QFR further comprises an array of partially-reflective, partially-transmissive, flat surfaces; wherein the surfaces collectively reflect light beams from the LEA toward the person's eye to create virtual images in the person's field of view; and wherein surfaces which are farther from the LEA extend farther out from the main plane of the QFR than surfaces which are closer to the LEA. Alternatively, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises a nested (e.g. concentric) array of partially-reflective, partially-transmissive rings; wherein rings in the QFR collectively reflect light beams from the LEA toward the person's eye; wherein the orientation angle of a ring is the LEA-facing angle of intersection between the ring and the virtual plane of the QFR; wherein a first subset of rings in the QFR has a first orientation angle and is a first distance from the LEA; wherein a second subset of rings in the QFR has a second orientation angle and is a second distance from the LEA; wherein a third subset of rings in the QFR has a third orientation angle and is a third distance from the LEA; wherein the second distance is greater than the first distance; wherein the third distance is greater than the second distance; wherein the second orientation angle is less than the first orientation angle; and wherein the third orientation angle is less than the second orientation angle.

For example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises a nested (e.g. concentric) array of rings of partially-reflective, partially-transmissive flat micromirrors; wherein the micromirrors collectively reflect light beams from the LEA toward the person's eye to create virtual images in the person's field of view; wherein the orientation angle of a micromirror is the LEA-facing angle of intersection between the micromirror and the virtual plane of the QFR; wherein a first subset of micromirrors in the QFR has a first orientation angle and is a first distance from the LEA; wherein a second subset of micromirrors in the QFR has a second orientation angle and is a second distance from the LEA; wherein a third subset of micromirrors in the QFR has a third orientation angle and is a third distance from the LEA; wherein the second distance is greater than the first distance; wherein the third distance is greater than the second distance; wherein the second orientation angle is less than the first orientation angle; and wherein the third orientation angle is less than the second orientation angle. In another example, augmented reality eyewear can comprise: an annular Light Emitter Array (LEA) which creates virtual images in a person's field of view; and a Quasi Fresnel Reflector (QFR) which is configured to be worn in front of the person's eye; wherein the QFR further comprises a ring-and-spoke array of partially-reflective, partially-transmissive surfaces (e.g. micromirrors or ridges); wherein the surfaces collectively reflect light beams from the LEA toward the person's eye to create virtual images in the person's field of view.

In an example, this invention can be embodied in augmented reality eyewear comprising: an annular Light Emitter Array (LEA) which creates virtual images in a person's field of view; and a Quasi Fresnel Reflector (QFR) which is configured to be worn in front of the person's eye; wherein the QFR further comprises a ring-and-spoke array of partially-reflective, partially-transmissive surfaces (e.g. micromirrors or ridges); wherein the surfaces collectively reflect light beams from the LEA toward the person's eye to create virtual images in the person's field of view; and wherein surfaces which are closer to the center of the QFR are more aligned with the best-fitting flat virtual plane of the QFR than surfaces which are father from the center (e.g. closer to the peripheral edges) of the QFR. In another embodiment, augmented reality eyewear can comprise: an annular Light Emitter Array (LEA) which creates virtual images in a person's field of view; and a Quasi Fresnel Reflector (QFR) which is configured to be worn in front of the person's eye; wherein the QFR further comprises a ring-and-spoke array of partially-reflective, partially-transmissive, flat surfaces (e.g. micromirrors or ridges); wherein there is intra-spoke variation in surface angle with respect to the virtual plane of the QFR; wherein surfaces in a spoke which are closer to the center of the QFR have smaller angles than surfaces in the spoke which are closer to the peripheral edges of the QFR; and wherein the surfaces collectively reflect light beams from the LEA toward the person's eye to create virtual images in the person's field of view.

For example, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of arcuate (e.g. conic-section-shaped) subsets of partially-reflective, partially-transmissive surfaces (e.g. micromirrors or ridges); wherein the surfaces collectively reflect light beams from the LEA toward the person's eye; and wherein arcuate subsets of surfaces which are closer to the center of the QFR are more concave than arcuate subsets of surfaces which are farther from the center (e.g. closer to the peripheral edges) of the QFR. Alternatively, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of arcuate subsets of partially-reflective, partially-transmissive micromirrors; wherein the micromirrors collectively reflect light beams from the LEA toward the person's eye in order to create virtual images in the person's field of view; and wherein arcuate subsets of micromirrors which are closer to the LEA are farther apart than arcuate subsets of micromirrors which are farther from the LEA.

In one embodiment, Augmented Reality (AR) eyeglasses can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of arcuate subsets of partially-reflective, partially-transmissive micromirrors; wherein the micromirrors collectively reflect light beams from the LEA toward the person's eye in order to create virtual images in the person's field of view; and wherein subsets of micromirrors which are closer to the LEA are less convex than subsets of micromirrors which are farther from the LEA. In another embodiment, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of arcuate, partially-reflective, partially-transmissive ridges; wherein the ridges collectively reflect light beams from the LEA toward the person's eye; and wherein a first subset of ridges which are closer to the center of the QFR are closer to each other than a second subset of ridges which are farther from the center (e.g. closer to the peripheral edges) of the QFR.

For example, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of arcuate, partially-reflective, partially-transmissive ridges; wherein the ridges collectively reflect light beams from the LEA toward the person's eye; and wherein a first subset of ridges which are closer to the LEA are less convex than a second subset of ridges which are farther from the LEA. In another example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of at least 50 linear, parallel, partially-reflective, partially-transmissive surfaces (e.g. micromirrors or ridges); wherein the surfaces collectively reflect light beams from the LEA toward the person's eye; and wherein the surfaces which are farther from the LEA are tilted further toward the LEA than the surfaces which are closer to the LEA.

In one example, augmented reality eyewear can comprise: an annular Light Emitter Array (LEA) which creates virtual images in a person's field of view; and a Quasi Fresnel Reflector (QFR) which is configured to be worn in front of the person's eye; wherein the QFR further comprises an array of circular, partially-reflective, partially-transmissive ridges; and wherein the ridges collectively reflect light beams from the LEA toward the person's eye to create virtual images in the person's field of view. Alternatively, augmented reality eyewear can comprise: an annular Light Emitter Array (LEA) which is configured to encircle a person's eye and emit light beams which create virtual images in the person's field of view; and a Quasi Fresnel Reflector (QFR) which is configured to be worn in front of the person's eye; wherein the QFR further comprises an array of concentric subsets of partially-reflective, partially-transmissive micromirrors; and wherein the micromirrors collectively reflect light beams from the LEA toward the person's eye in order to create virtual images in the person's field of view.

In one embodiment, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of linear subsets of partially-reflective and partially-transmissive linear micromirrors; wherein micromirrors in the QFR collectively reflect light beams from the LEA toward the person's eye to create virtual images in the person's field of view; wherein the orientation angle of a micromirror is the LEA-facing angle of intersection between the micromirror and the virtual flat plane which best fits the QFR; wherein a first subset of micromirrors in the QFR have a first orientation angle and a first distance from the LEA; wherein a second subset of micromirrors in the QFR have a second orientation angle and a second distance from the LEA; wherein a third subset of micromirrors in the QFR have a third orientation angle and a third distance from the LEA; wherein the second distance is greater than the first distance; wherein the third distance is greater than the second distance; wherein the second orientation angle is less than the first orientation angle; and wherein the third orientation angle is less than the second orientation angle.

In yet another example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of linear subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the LEA; and wherein the angles of a first linear subset of micromirrors which are closer to the LEA are less than the angles of a second linear subset of micromirrors which are farther from the LEA. In another example, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of linear subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR; and wherein the angles of a first subset of micromirrors which are closer to the LEA are greater than the angles of a second subset of micromirrors which are farther from the LEA.

For example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of linear subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR; wherein the angles of a first subset of micromirrors which are closer to the LEA are less than the angles of a second subset of micromirrors which are farther from the LEA; and wherein subsets of micromirrors which closer to center of the QFR are closer together than subsets of micromirrors which are closer to the periphery of the QFR. In another embodiment, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of linear subsets of partially-reflective, partially-transmissive micromirrors; wherein the micromirrors collectively reflect light beams from the LEA toward the person's eye to create virtual images in the person's field of view; wherein the orientation angle of a micromirror in the QFR is the LEA-facing angle of intersection between the micromirror and a virtual plane which best fits the QFR; wherein a first linear subset of micromirrors in the QFR has a first orientation angle and is a first distance from the LEA; wherein a second linear subset of micromirrors in the QFR has a second orientation angle and is a second distance from the LEA; wherein a third linear subset of micromirrors in the QFR has a third orientation angle and is a third distance from the LEA; wherein a fourth linear subset of micromirrors in the QFR has a fourth orientation angle and is a fourth distance from the LEA; wherein the second distance is greater than the first distance; wherein the third distance is greater than the second distance; wherein the fourth distance is greater than the third distance; and wherein the fourth distance minus the third distance is less than the second distance minus the first distance.

In an example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of linear, parallel, partially-reflective, partially-transmissive surfaces (e.g. micromirrors or ridges); wherein the surfaces collectively reflect light beams from the LEA toward the person's eye; and wherein the surfaces which are closer to the center of the QFR extend further out from the virtual plane of the QFR than the surfaces which are farther from the center (e.g. closer to the peripheral edges) of the QFR.

For example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of linear, partially-reflective, partially-transmissive surfaces (e.g. micromirrors or ridges) which reflect light beams from the LEA toward the person's eye to create virtual images in the person's field of view; and wherein a Conventional Fresnel Reflector (CFR) reflects collimated light rays from a distant light source into convergence, but this Quasi Fresnel Reflector (QFR) reflects light rays from a LEA on one side (e.g. right, left, top, or bottom side) of the QFR into convergence on (or within) the person's eye. In another embodiment, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of linear, partially-reflective, partially-transmissive ridges; wherein the ridges collectively reflect light beams from the LEA toward the person's eye; and wherein a first subset of ridges which are closer to the center of the QFR are closer to each other than a second subset of ridges which are farther from the center (e.g. closer to the peripheral edges) of the QFR.

In one example, Augmented Reality (AR) eyeglasses can comprise: a Light Emitter Array (LEA) which creates virtual images in a person's field of view; and a Quasi Fresnel Reflector (QFR) which is configured to be worn in front of the person's eye; wherein the QFR further comprises an array of linear, partially-reflective, partially-transmissive ridges; wherein the ridges collectively reflect light beams from the LEA toward the person's eye; wherein different ridges have different angles relative to the virtual plane which best fits the LEA; wherein the angles of a first subset of ridges which are closer to the LEA are greater than the angles of a second subset of ridges which are farther from the LEA; and wherein ridges which closer to center of the QFR are closer together than ridges which are closer to the peripheral sides of the QFR. In another example, this invention can be embodied in augmented reality eyewear comprising: a Light Emitter Array (LEA) which creates virtual images in a person's field of view; and a Quasi Fresnel Reflector (QFR) which is configured to be worn in front of the person's eye; wherein the QFR further comprises an array of linear, partially-reflective, partially-transmissive ridges; wherein the ridges collectively reflect light beams from the LEA toward the person's eye; wherein different ridges have different angles relative to the virtual plane which best fits the QFR and/or relative to the virtual plane which best fits the LEA; wherein the angles of a first subset of ridges which are closer to the LEA are greater than the angles of a second subset of ridges which are farther from the LEA; and wherein ridges which closer to center of the QFR are closer together than ridges which are closer to the peripheral edges of the QFR.

In one embodiment, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of linear, partially-reflective, partially-transmissive ridges; wherein the ridges collectively reflect light beams from the LEA toward the person's eye; wherein different ridges have different angles relative to the virtual plane which best fits the QFR; wherein the angles of a first subset of ridges which are closer to the LEA are greater than the angles of a second subset of ridges which are farther from the LEA; and wherein ridges which closer to center of the QFR are closer together than ridges which are closer to the peripheral edges of the QFR. In another embodiment, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of linear, partially-reflective, partially-transmissive surfaces (e.g. micromirrors or ridges); wherein the surfaces collectively reflect light beams from the LEA toward the person's eye; and wherein the surfaces which are closer to the center of the QFR are closer to each other than the surfaces which are farther from the center (e.g. closer to the peripheral edges) of the QFR.

In an example, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of movable, linear, partially-reflective, partially-transmissive surfaces (e.g. microridges or micromirrors) which reflect light beams from the LEA toward the person's eye to create virtual images in the person's field of view; and one or more electromagnetic actuators which move the linear, partially-reflective, partially-transmissive surfaces in the QFR. In another example, augmented reality eyewear can comprise: an annular Light Emitter Array (LEA) which creates virtual images in a person's field of view; and a Quasi Fresnel Reflector (QFR) which is configured to be worn in front of the person's eye; wherein the QFR further comprises an array of nested (e.g. concentric), circular, partially-reflective, partially-transmissive ridges; wherein the ridges collectively reflect light beams from the LEA toward the person's eye; and wherein ridges which are closer to the center of the QFR are closer to each other than ridges which are farther from the center (e.g. closer to the peripheral edges) of the QFR.

For example, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of nested (e.g. concentric) arcuate, partially-reflective, partially-transmissive ridges; wherein the ridges collectively reflect light beams from the LEA toward the person's eye; wherein different ridges have different angles relative to the virtual plane which best fits the LEA; wherein the angles of a first subset of ridges which are closer to the LEA are less than the angles of a second subset of ridges which are farther from the LEA; and wherein ridges which closer to center of the QFR are closer together than ridges which are closer to the peripheral edges of the QFR. Alternatively, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of nested (e.g. concentric) arcuate, partially-reflective, partially-transmissive ridges; wherein the ridges collectively reflect light beams from the LEA toward the person's eye; wherein different ridges have different angles relative to the virtual plane which best fits the QFR and/or relative to the virtual plane which best fits the LEA; and wherein the angles of a first subset of ridges which are closer to the LEA are greater than the angles of a second subset of ridges which are farther from the LEA.

In one embodiment, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of nested (e.g. concentric) arcuate, partially-reflective, partially-transmissive ridges; wherein the ridges collectively reflect light beams from the LEA toward the person's eye; wherein different ridges have different angles relative to the virtual plane which best fits the QFR; and wherein the angles of a first subset of ridges which are closer to the LEA are greater than the angles of a second subset of ridges which are farther from the LEA. In another example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of nested (e.g. concentric) circular, partially-reflective, partially-transmissive ridges; wherein the ridges collectively reflect light beams from the LEA toward the person's eye; wherein different ridges have different angles relative to the virtual plane which best fits the LEA; and wherein the angles of a first subset of ridges which are closer to the LEA are greater than the angles of a second subset of ridges which are farther from the LEA.

For example, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of nested (e.g. concentric) circular, partially-reflective, partially-transmissive ridges; wherein the ridges collectively reflect light beams from the LEA toward the person's eye; wherein different ridges have different angles relative to the virtual plane which best fits the QFR and/or relative to the virtual plane which best fits the LEA; wherein the angles of a first subset of ridges which are closer to the LEA are less than the angles of a second subset of ridges which are farther from the LEA; and wherein ridges which closer to center of the QFR are closer together than ridges which are closer to the peripheral edges of the QFR. In another embodiment, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of nested (e.g. concentric) circular, partially-reflective, partially-transmissive ridges; wherein the ridges collectively reflect light beams from the LEA toward the person's eye; wherein different ridges have different angles relative to the virtual plane which best fits the QFR; and wherein the angles of a first subset of ridges which are closer to the LEA are greater than the angles of a second subset of ridges which are farther from the LEA.

In one example, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of nested arcuate subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR; and wherein the angles of a first subset of micromirrors which are closer to the LEA are less than the angles of a second subset of micromirrors which are farther from the LEA. In another embodiment, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of nested arcuate subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the LEA; and wherein the angles of subsets of micromirrors which are closer to the LEA are greater than the angles of subsets of micromirrors which are farther from the LEA.

For example, Augmented Reality (AR) eyeglasses can comprise: an annular Light Emitter Array (LEA) which is configured to encircle a person's eye and emit light beams which create virtual images in the person's field of view; and a Quasi Fresnel Reflector (QFR) which is configured to be worn in front of the person's eye; wherein the QFR further comprises an array of nested circular subsets of partially-reflective, partially-transmissive micromirrors; and wherein the micromirrors collectively reflect light beams from the LEA toward the person's eye in order to create virtual images in the person's field of view. Alternatively, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of nested circular subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR and/or relative to the virtual plane which best fits the LEA; and wherein the angles of a first subset of micromirrors which are closer to the LEA are less than the angles of a second subset of micromirrors which are farther from the LEA.

In one embodiment, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of nested circular subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR; and wherein the angles of a first subset of micromirrors which are closer to the LEA are greater than the angles of a second subset of micromirrors which are farther from the LEA. In another embodiment, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of nested circular subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the LEA; wherein the angles of a first subset of micromirrors which are closer to the LEA are greater than the angles of a second subset of micromirrors which are farther from the LEA; and wherein subsets of micromirrors which closer to center of the QFR are closer together than subsets of micromirrors which are closer to the periphery of the QFR.

For example, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of partially-reflective, partially-transmissive surfaces (e.g. microridges or micromirrors) which reflect light beams from the LEA toward the person's eye to create virtual images in the person's field of view; and an Electromagnetic Field Generator (EFG) which generates a magnetic field which moves the partially-reflective, partially-transmissive surfaces in the QFR. In another example, augmented reality eyewear can comprise: an annular Light Emitter Array (LEA) which creates virtual images in a person's field of view; and a Quasi Fresnel Reflector (QFR) which is configured to be worn in front of the person's eye; wherein the QFR further comprises an array of partially-reflective, partially-transmissive rings; and wherein the rings collectively reflect light beams from the LEA toward the person's eye; and wherein rings which are closer to the center of the QFR are closer to each other than rings which are farther from the center (e.g. closer to the peripheral edges) of the QFR.

For example, Augmented Reality (AR) eyeglasses can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of partially-reflective and partially-transmissive micromirrors; wherein micromirrors in the QFR collectively reflect light beams from the LEA toward the person's eye to create virtual images in the person's field of view; wherein the orientation angle of a micromirror is the LEA-facing angle of intersection between the micromirror and the virtual flat plane which best fits the QFR; wherein a first subset of micromirrors in the QFR have a first orientation angle and is a first distance from the LEA; a second subset of micromirrors in the QFR have a second orientation angle and is a second distance from the LEA; and a third subset of micromirrors in the QFR have a third orientation angle and is a third distance from the LEA; wherein the second distance is greater than the first distance; wherein the third distance is greater than the second distance; wherein the second orientation angle is greater than the first orientation angle; and wherein the third orientation angle is greater than the second orientation angle. In another embodiment, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of partially-reflective, partially-transmissive surfaces; wherein surfaces in the QFR collectively reflect light beams from the LEA toward the person's eye; wherein the orientation angle of a surface is the LEA-facing angle of intersection between the surface and the virtual plane of the QFR; wherein a first subset of surfaces in the QFR has a first orientation angle and is a first distance from the LEA; wherein a second subset of surfaces in the QFR has a second orientation angle and is a second distance from the LEA; wherein a third subset of surfaces in the QFR has a third orientation angle and is a third distance from the LEA; wherein the second distance is greater than the first distance; wherein the third distance is greater than the second distance; wherein the second orientation angle is greater than the first orientation angle; and wherein the third orientation angle is greater than the second orientation angle.

In yet another example, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of partially-reflective, partially-transmissive micromirrors; wherein the LEA is located to the right of the QFR; wherein micromirrors in the QFR collectively reflect light beams from the LEA toward the person's eye to create virtual images in the person's field of view; wherein the orientation angle of a micromirror in the QFR is the LEA-facing angle of intersection between the micromirror and a virtual flat plane which best fits the QFR; wherein a first subset of micromirrors in the first quadrant across the (right-to-left) width of the QFR has a first orientation angle; wherein a second subset of micromirrors in the second quadrant across the (right-to-left) width of the QFR has a second orientation angle; wherein a third subset of micromirrors in the third quadrant across the (right-to-left) width of the QFR has a third orientation angle; wherein a fourth subset of micromirrors in the fourth quadrant across the (right-to-left) width of the QFR has a fourth orientation angle; wherein the second orientation angle is less than the first orientation angle; wherein the third orientation angle is less than the second orientation angle; and wherein the fourth orientation angle is less than the third orientation angle.

In an example, augmented reality eyewear can comprise: an annular Light Emitter Array (LEA) which is configured to encircle a person's eye and emit light beams which create virtual images in the person's field of view; and a Quasi Fresnel Reflector (QFR) which is configured to be worn in front of the person's eye; wherein the QFR further comprises an array of partially-reflective, partially-transmissive micromirrors; wherein the micromirrors collectively reflect light beams from the LEA toward the person's eye in order to create virtual images in the person's field of view; and wherein the combined surfaces of the micromirrors which face the LEA collectively comprise sections of a rotated parabola (e.g. paraboloid). Alternatively, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of partially-reflective, partially-transmissive micromirrors; wherein the micromirrors collectively reflect light beams from the LEA toward the person's eye to create virtual images in the person's field of view; wherein a first subset of micromirrors in the QFR are a first distance from the LEA; wherein a second subset of micromirrors in the QFR are a second distance from the LEA; wherein a third subset of micromirrors in the QFR are a third distance from the LEA; wherein the second distance is greater than the first distance; wherein the third distance is greater than the second distance; wherein the second subset of micromirrors has an orientation which is rotated in a first (e.g. clockwise) direction relative to the orientation of the first subset of micromirrors, and wherein the third subset of micromirrors has an orientation which is rotated in the first (e.g. clockwise) direction relative to the orientation of the second subset of micromirrors.

In an example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of partially-reflective, partially-transmissive micromirrors; wherein the micromirrors collectively reflect light beams from the LEA so that the light beams are collimated and directed toward the person's eye; wherein the orientation angle of a micromirror in the QFR is the LEA-facing angle of intersection between the micromirror and a virtual flat plane which best fits the QFR; wherein a first subset of micromirrors in the QFR has a first orientation angle and is a first distance from the LEA; wherein a second subset of micromirrors in the QFR has a second orientation angle and is a second distance from the LEA; wherein a third subset of micromirrors in the QFR has a third orientation angle and is a third distance from the LEA; wherein the second distance is greater than the first distance; wherein the third distance is greater than the second distance; wherein the second orientation angle is less than the first orientation angle, and wherein the third orientation angle is less than the second orientation angle.

In one embodiment, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of partially-reflective, partially-transmissive micromirrors; wherein the micromirrors collectively reflect light beams from the LEA toward the person's eye to create virtual images in the person's field of view; wherein the orientation angle of a micromirror in the QFR is the LEA-facing angle of intersection between the micromirror and a virtual flat plane which best fits the QFR; wherein a first subset of micromirrors in the QFR has a first orientation angle and is a first distance from the LEA; wherein a second subset of micromirrors in the QFR has a second orientation angle and is a second distance from the LEA; wherein a third subset of micromirrors in the QFR have a third orientation angle and is a third distance from the LEA; wherein the second distance is greater than the first distance; wherein the third distance is greater than the second distance; wherein the second orientation angle is less than the first orientation angle, and wherein the third orientation angle is greater than the second orientation angle.

In one embodiment, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of partially-reflective, partially-transmissive micromirrors; wherein the micromirrors collectively reflect light beams from the LEA toward the person's eye to create virtual images in the person's field of view; wherein the orientation angle of a micromirror in the QFR is the LEA-facing angle of intersection between the micromirror and a virtual flat plane which best fits the QFR; wherein a first subset of micromirrors in the QFR has a first orientation angle and is a first distance from the LEA; wherein a second subset of micromirrors in the QFR has a second orientation angle and is a second distance from the LEA; wherein a third subset of micromirrors in the QFR have a third orientation angle and is a third distance from the LEA; wherein the second distance is greater than the first distance; wherein the third distance is greater than the second distance; wherein the second orientation angle is less than the first orientation angle; wherein the third orientation angle is less than the second orientation angle, and wherein there are surfaces of the QFR between the three subsets of micromirrors which all have the same orientation angle. In another example, Augmented Reality (AR) eyewear can comprise: at least four Light Emitter Arrays (LEAs) which configured to be equi-distantly-distributed around a person's eye; and a Quasi Fresnel Reflector (QFR) which is configured to be worn in front of the person's eye; wherein the QFR further comprises an array of partially-reflective, partially-transmissive surfaces (e.g. micromirrors or ridges); wherein the surfaces collectively reflect light beams from the LEAs toward the person's eye to create virtual images in the person's field of view.

For example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of partially-reflective, partially-transmissive flat surfaces; wherein the surfaces collectively reflect light beams from the LEA so that the light beams converge on (or in) the person's eye and create virtual images in the person's field of view; wherein the orientation angle of a surface is the LEA-facing angle of intersection between the surface and the virtual plane of the QFR; wherein a first subset of surfaces in the QFR has a first orientation angle and is a first distance from the LEA; wherein a second subset of surfaces in the QFR has a second orientation angle and is a second distance from the LEA; wherein a third subset of surfaces in the QFR has a third orientation angle and is a third distance from the LEA; wherein the second distance is greater than the first distance; wherein the third distance is greater than the second distance; wherein the second orientation angle is less than the first orientation angle; and wherein the third orientation angle is less than the second orientation angle.

In one example, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of partially-reflective, partially-transmissive, flat surfaces; wherein the surfaces collectively reflect light beams from the LEA toward the person's eye to create virtual images in the person's field of view; wherein the orientation angle of a surface is the LEA-facing angle of intersection between the surface and the virtual plane of the QFR; wherein a first subset of surfaces in the QFR has a first orientation angle and is a first distance from the LEA; wherein a second subset of surfaces in the QFR has a second orientation angle and is a second distance from the LEA; wherein a third subset of surfaces in the QFR has a third orientation angle and is a third distance from the LEA; wherein the second distance is greater than the first distance; wherein the third distance is greater than the second distance; wherein the second orientation angle is less than the first orientation angle; wherein the third orientation angle is less than the second orientation angle; and wherein there are surfaces of the QFR between the three subsets of surfaces with orientation angles which are different than the first, second, and third orientation angles.

For example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of partially-reflective, partially-transmissive, flat surfaces; wherein the surfaces collectively reflect light beams from the LEA toward the person's eye to create virtual images in the person's field of view; wherein the orientation angle of a surface is the LEA-facing angle of intersection between the surface and the virtual plane of the QFR; wherein a first subset of surfaces in the QFR has a first orientation angle and is a first distance from the LEA; wherein a second subset of surfaces in the QFR has a second orientation angle and is a second distance from the LEA; wherein a third subset of surfaces in the QFR has a third orientation angle and is a third distance from the LEA; wherein the second distance is greater than the first distance; wherein the third distance is greater than the second distance; wherein the second orientation angle is less than the first orientation angle; wherein the third orientation angle is less than the second orientation angle; and wherein there are surfaces of the QFR between the three subsets of surfaces which are substantially perpendicular to the QFR plane.

In one embodiment, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of rings of partially-reflective, partially-transmissive micromirrors; wherein the micromirrors collectively reflect light beams from the LEA toward the person's eye in order to create virtual images in the person's field of view; and wherein rings which are closer to the center of the QFR are closer to each other than rings which are farther from the center (e.g. closer to the peripheral edges) of the QFR.

For example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR and/or relative to the virtual plane which best fits the LEA; wherein the angles of a first subset of micromirrors which are closer to the LEA are less than the angles of a second subset of micromirrors which are farther from the LEA; and wherein subsets of micromirrors which closer to center of the QFR are closer together than subsets of micromirrors which are closer to the periphery of the QFR.

In yet another example, Augmented Reality (AR) eyewear can comprise: an annular Light Emitter Array (LEA) which is configured to encircle a person's eye and emit light beams which create virtual images in the person's field of view; and a Quasi Fresnel Reflector (QFR) which is configured to be worn in front of the person's eye; wherein the QFR further comprises partially-reflective, partially-transmissive ridges; wherein the ridges collectively reflect light beams from the LEA toward the person's eye in order to create virtual images in the person's field of view; and wherein the combined surfaces of the ridges which face toward LEA collectively comprise sections of an ellipsoid. In another example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR is an off-axis Fresnel reflector; wherein the QFR further comprises an array of nested rings of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR and/or relative to the virtual plane which best fits the LEA; wherein the angles of a rings of micromirrors which are closer to the LEA are greater than the angles of rings of micromirrors which are farther from the LEA; and wherein rings of micromirrors which closer to center of the QFR are closer together than rings of micromirrors which are closer to the periphery of the QFR.

For example, Augmented Reality (AR) eyeglasses can comprise: a Light Emitter Array (LEA) which creates virtual images in a person's field of view; and a Quasi Fresnel Reflector (QFR) which is configured to be worn in front of the person's eye; wherein the QFR is partially-reflective and partially-transmissive; wherein a cross-section of the QFR has a saw-tooth (e.g. zigzag) shape with teeth whose angle of intersection with the virtual plane of the QFR increases across the width of the QFR; and wherein the QFR reflects light beams from the LEA toward the person's eye to create virtual images in the person's field of view. In another embodiment, augmented reality eyewear can comprise: a Quasi Fresnel Reflector (QFR) which is configured to be worn in front of a person's eye; wherein the QFR further comprises an array of horizontal, linear, partially-reflective, partially-transmissive surfaces (e.g. microridges or micromirrors); a first Light Emitter Array (LEA) which is substantially above the QFR; and a second Light Emitter Array (LEA) which is substantially below the QFR; wherein the surfaces in the QFR collectively reflect light beams from the first LEA and the second LEA toward the person's eye to create virtual images in the person's field of view; wherein the orientation angle of a surface is an upward-facing angle of intersection between the surface and the virtual plane of the QFR; wherein a first subset of surfaces is first distance from the upper side of the QFR and has a first orientation angle; wherein a second subset of surfaces is a second distance from the upper side of the QFR and has a second orientation angle; wherein a third subset of surfaces is a third distance from the upper side of the QFR and has a third orientation angle; wherein a fourth subset of surface is a fourth distance from the upper side of the QFR and has a fourth orientation angle; wherein the second distance is greater than the first distance, the third distance is greater than the second distance, and the fourth distance is greater than the third distance; wherein the second orientation angle is greater than the first orientation angle; and wherein the third orientation angle is less than the fourth orientation angle.

In one embodiment, Augmented Reality (AR) eyewear can comprise: a Quasi Fresnel Reflector (QFR) which is configured to be worn in front of a person's eye; wherein the QFR further comprises an array of vertical, linear, partially-reflective, partially-transmissive surfaces (e.g. microridges or micromirrors); a first Light Emitter Array (LEA) which is substantially to the right of the QFR; and a second Light Emitter Array (LEA) which is substantially to the left of the QFR; wherein the surfaces in the QFR collectively reflect light beams from the first LEA and the second LEA toward the person's eye to create virtual images in the person's field of view; wherein the orientation angle of a surface is a right-facing angle of intersection between the surface and the virtual plane of the QFR; wherein a first subset of surfaces is first distance from the right side of the QFR and has a first orientation angle; wherein a second subset of surfaces is a second distance from the right side of the QFR and has a second orientation angle; wherein a third subset of surfaces is a third distance from the right side of the QFR and has a third orientation angle; wherein a fourth subset of surface is a fourth distance from the right side of the QFR and has a fourth orientation angle; wherein the second distance is greater than the first distance, the third distance is greater than the second distance, and the fourth distance is greater than the third distance; wherein the second orientation angle is greater than the first orientation angle; and wherein the third orientation angle is less than the fourth orientation angle.

In one example, augmented reality eyewear can comprise: a Light Emitter Array (LEA) which is configured to be located to a first side (e.g. right side, left side, top side, or bottom side) of a person's eye; a Digital Micromirror Device (DMD) which is also configured to be located to the first side; and a Quasi Fresnel Reflector (QFR); wherein the QFR is configured to be worn in front of the person's eye; wherein the QFR further comprises an array of partially-reflective, partially-transmissive surfaces (e.g. microridges or micromirrors); wherein the DMD receives light beams from the LEA and reflects the light beams toward the QFR; and wherein the QFR receives the light beams from the DMD and reflects the light beams toward the person's eye to create virtual images in the person's field of view.

For example, augmented reality eyewear can comprise: an annular Light Emitter Array (LEA) which creates virtual images in a person's field of view; and a Quasi Fresnel Reflector (QFR) which is configured to be worn in front of the person's eye; wherein the LEA encircles the QFR; wherein the QFR further comprises an array of nested (e.g. concentric), partially-reflective, partially-transmissive rings; and wherein the rings collectively reflect light beams from the LEA toward the person's eye to create virtual images in the person's field of view. Alternatively, augmented reality eyewear can comprise: an annular Light Emitter Array (LEA) which creates virtual images in a person's field of view; and a Quasi Fresnel Reflector (QFR) which is configured to be worn in front of the person's eye; wherein the LEA encircles the QFR; wherein the QFR further comprises an array of partially-reflective, partially-transmissive ridges; wherein the ridges collectively reflect light beams from the light emitters toward the person's eye; and wherein ridges which are closer to the center of the QFR extend farther out from the virtual plane of the QFR than ridges surfaces which are farther from the center (e.g. closer to the peripheral edges) of the QFR.

In one embodiment, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the LEA is located above or below the QFR; wherein the QFR further comprises an array of linear, partially-reflective, partially-transmissive, flat surfaces; wherein the surfaces collectively reflect light beams from the LEA toward the person's eye to create virtual images in the person's field of view; wherein the orientation angle of a surface is the LEA-facing angle of intersection between the surface and the virtual plane of the QFR; wherein a first subset of surfaces in the QFR has a first orientation angle and is a first distance from the LEA; wherein a second subset of surfaces in the QFR has a second orientation angle and is a second distance from the LEA; wherein a third subset of surfaces in the QFR has a third orientation angle and is a third distance from the LEA; wherein the second distance is greater than the first distance; wherein the third distance is greater than the second distance; wherein the second orientation angle is less than the first orientation angle; and wherein the third orientation angle is less than the second orientation angle.

For example, augmented reality eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of arcuate, partially-reflective, partially-transmissive ridges; wherein the ridges collectively reflect light beams from the LEA toward the person's eye; and wherein a first subset of ridges which are closer to the first side of the QFR are less concave than a second subset of ridges which are farther from the first side of the QFR. In another embodiment, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of linear, partially-reflective, partially-transmissive ridges; wherein the ridges collectively reflect light beams from the LEA toward the person's eye; wherein different ridges have different angles relative to the virtual plane which best fits the LEA; wherein the angles of a first subset of ridges which are closer to the first side of the QFR are less than the angles of a second subset of ridges which are farther from the first side of the QFR; and wherein ridges which closer to center of the QFR are closer together than ridges which are closer to the peripheral edges of the QFR.

In an example, augmented reality eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of linear, partially-reflective, partially-transmissive ridges; wherein the ridges collectively reflect light beams from the LEA toward the person's eye; wherein different ridges have different angles relative to the virtual plane which best fits the QFR; wherein the angles of a first subset of ridges which are closer to the first side of the QFR are less than the angles of a second subset of ridges which are farther from the first side of the QFR; and wherein ridges which closer to center of the QFR are closer together than ridges which are closer to the peripheral edges of the QFR. In another example, Augmented Reality (AR) eyeglasses can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of linear, partially-reflective, partially-transmissive ridges; wherein the ridges collectively reflect light beams from the LEA toward the person's eye; wherein different ridges have different angles relative to the virtual plane which best fits the QFR and/or relative to the virtual plane which best fits the LEA; and wherein the angles of a first subset of ridges which are closer to the first side of the QFR are greater than the angles of a second subset of ridges which are farther from the first side of the QFR.

In one example, augmented reality eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of nested (e.g. concentric) arcuate, partially-reflective, partially-transmissive ridges; wherein the ridges collectively reflect light beams from the LEA toward the person's eye; wherein different ridges have different angles relative to the virtual plane which best fits the LEA; and wherein the angles of a first subset of ridges which are closer to the first side of the QFR are less than the angles of a second subset of ridges which are farther from the first side of the QFR. Alternatively, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of nested (e.g. concentric) arcuate, partially-reflective, partially-transmissive ridges; wherein the ridges collectively reflect light beams from the LEA toward the person's eye; wherein different ridges have different angles relative to the virtual plane which best fits the LEA; and wherein the angles of a first subset of ridges which are closer to the first side of the QFR are less than the angles of a second subset of ridges which are farther from the first side of the QFR.

In an example, this invention can be embodied in augmented reality eyewear comprising: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of nested (e.g. concentric) arcuate, partially-reflective, partially-transmissive ridges; wherein the ridges collectively reflect light beams from the LEA toward the person's eye; wherein different ridges have different angles relative to the virtual plane which best fits the LEA; and wherein the angles of a first subset of ridges which are closer to the first side of the QFR are greater than the angles of a second subset of ridges which are farther from the first side of the QFR. In another example, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of nested (e.g. concentric) arcuate, partially-reflective, partially-transmissive ridges; wherein the ridges collectively reflect light beams from the LEA toward the person's eye; wherein different ridges have different angles relative to the virtual plane which best fits the QFR; and wherein the angles of a first subset of ridges which are closer to the first side of the QFR are greater than the angles of a second subset of ridges which are farther from the first side of the QFR.

For example, augmented reality eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of nested (e.g. concentric) circular, partially-reflective, partially-transmissive ridges; wherein the ridges collectively reflect light beams from the LEA toward the person's eye; wherein different ridges have different angles relative to the virtual plane which best fits the QFR and/or relative to the virtual plane which best fits the LEA; and wherein the angles of a first subset of ridges which are closer to the first side of the QFR are less than the angles of a second subset of ridges which are farther from the first side of the QFR. In another embodiment, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of nested (e.g. concentric) circular, partially-reflective, partially-transmissive ridges; wherein the ridges collectively reflect light beams from the LEA toward the person's eye; wherein different ridges have different angles relative to the virtual plane which best fits the LEA; and wherein the angles of a first subset of ridges which are closer to the first side of the QFR are greater than the angles of a second subset of ridges which are farther from the first side of the QFR.

In one embodiment, augmented reality eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of nested (e.g. concentric) circular, partially-reflective, partially-transmissive ridges; wherein the ridges collectively reflect light beams from the LEA toward the person's eye; wherein different ridges have different angles relative to the virtual plane which best fits the QFR; and wherein the angles of a first subset of ridges which are closer to the first side of the QFR are greater than the angles of a second subset of ridges which are farther from the first side of the QFR. In another example, this invention can be embodied in augmented reality eyewear comprising: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of arcuate subsets of partially-reflective, partially-transmissive micromirrors; wherein the micromirrors collectively reflect light beams from the LEA toward the person's eye in order to create virtual images in the person's field of view; and wherein arcuate subsets of micromirrors which are closer to the first side of the QFR are less concave than arcuate subsets of micromirrors which are farther from the first side of the QFR.

For example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of linear subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the LEA; wherein the angles of a first linear subset of micromirrors which are closer to the first side of the QFR are less than the angles of a second linear subset of micromirrors which are farther from the first side of the QFR; and wherein linear subsets of micromirrors which closer to center of the QFR are closer together than linear subsets of micromirrors which are closer to the periphery of the QFR. In another embodiment, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of linear subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR and/or relative to the virtual plane which best fits the LEA; wherein the angles of a first subset of micromirrors which are closer to the first side of the QFR are less than the angles of a second subset of micromirrors which are farther from the first side of the QFR; and wherein subsets of micromirrors which closer to center of the QFR are closer together than subsets of micromirrors which are closer to the periphery of the QFR.

In an example, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of linear subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR; wherein the angles of a first subset of micromirrors which are closer to the first side of the QFR are less than the angles of a second subset of micromirrors which are farther from the first side of the QFR; and wherein subsets of micromirrors which closer to center of the QFR are closer together than subsets of micromirrors which are closer to the periphery of the QFR. In another example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of nested arcuate subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the LEA; and wherein the angles of a first arcuate subset of micromirrors which are closer to the first side of the QFR are less than the angles of a second arcuate subset of micromirrors which are farther from the first side of the QFR.

For example, Augmented Reality (AR) eyeglasses can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of nested arcuate subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR and/or relative to the virtual plane which best fits the LEA; and wherein the angles of a first arcuate subset of micromirrors which are closer to the first side of the QFR are greater than the angles of a second arcuate subset of micromirrors which are farther from the first side of the QFR. Alternatively, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of nested arcuate subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR; and wherein the angles of a first arcuate subset of micromirrors which are closer to the first side of the QFR are greater than the angles of a second arcuate subset of micromirrors which are farther from the first side of the QFR.

In one embodiment, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of nested circular subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the LEA; wherein the angles of a first subset of micromirrors which are closer to the first side of the QFR are greater than the angles of a second subset of micromirrors which are farther from the first side of the QFR; and wherein subsets of micromirrors which closer to center of the QFR are closer together than subsets of micromirrors which are closer to the periphery of the QFR.

In yet another example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of nested circular subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR and/or relative to the virtual plane which best fits the LEA; wherein the angles of a first subset of micromirrors which are closer to the first side of the QFR are greater than the angles of a second subset of micromirrors which are farther from the first side of the QFR; and wherein subsets of micromirrors which closer to center of the QFR are closer together than subsets of micromirrors which are closer to the periphery of the QFR.

In one embodiment, Augmented Reality (AR) eyeglasses can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of nested circular subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR; wherein the angles of a first subset of micromirrors which are closer to the first side of the QFR are greater than the angles of a second subset of micromirrors which are farther from the first side of the QFR; and wherein subsets of micromirrors which closer to center of the QFR are closer together than subsets of micromirrors which are closer to the periphery of the QFR. In another embodiment, augmented reality eyewear can comprise: a Light Emitter Array (LEA) which creates virtual images in a person's field of view; and a Quasi Fresnel Reflector (QFR) which is configured to be worn in front of the person's eye; wherein the LEA is located to one side (e.g. right, left, top, or bottom) of the QFR; wherein the QFR further comprises an array of linear partially-reflective, partially-transmissive surfaces; wherein the surfaces collectively reflect light beams from the LEA toward the person's eye to create virtual images in the person's field of view; wherein the orientation angle of a surface is the LEA-facing angle of intersection between the surface and a virtual plane which best fits the QFR; wherein a first subset of surfaces in the QFR has a first orientation angle and is a first distance from the LEA; wherein a second subset of surfaces in the QFR has a second orientation angle and is a second distance from the LEA; wherein a third subset of surfaces in the QFR has a third orientation angle and is a third distance from the LEA; wherein a fourth subset of surfaces in the QFR has a fourth orientation angle and is a fourth distance from the LEA; wherein the second distance is greater than the first distance; wherein the third distance is greater than the second distance; wherein the fourth distance is greater than the third distance; and wherein the fourth distance minus the third distance is less than the second distance minus the first distance.

For example, augmented reality eyewear can comprise: a Light Emitter Array (LEA) which creates virtual images in a person's field of view; and a Quasi Fresnel Reflector (QFR) which is configured to be worn in front of the person's eye; wherein the LEA is located to one side (e.g. right, left, top, or bottom) of the QFR; wherein the QFR further comprises an array of linear partially-reflective, partially-transmissive surfaces; wherein the surfaces collectively reflect light beams from the LEA toward the person's eye to create virtual images in the person's field of view; and wherein surfaces which are closer to the center of the QFR are closer to each other than surfaces which are farther from the center (e.g. closer to the peripheral edges) of the QFR. In another example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located to one side (e.g. right, left, top, or bottom) of the QFR; wherein the QFR further comprises an array of linear subsets of partially-reflective, partially-transmissive micromirrors; wherein the micromirrors collectively reflect light beams from the LEA toward the person's eye to create virtual images in the person's field of view; and wherein linear subsets of micromirrors which are closer to the center of the QFR extend out from the main plane of the QFR further than linear subsets of micromirrors which are farther from the center of the QFR.

In one embodiment, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located to one side (e.g. right, left, top, or bottom side) of the QFR; wherein the QFR further comprises an array of partially-reflective, partially-transmissive micromirrors; wherein the micromirrors collectively reflect light beams from the LEA toward the person's eye to create virtual images in the person's field of view; wherein the orientation angle of a micromirror in the QFR is the LEA-facing angle of intersection between a virtual plane which best fits the micromirror and a virtual plane which best fits the QFR; wherein a first subset of micromirrors in the QFR has a first orientation angle and is a first distance from the LEA; wherein a second subset of micromirrors in the QFR has a second orientation angle and is a second distance from the LEA; wherein a third subset of micromirrors in the QFR has a third orientation angle and is a third distance from the LEA; wherein a fourth subset of micromirrors in the QFR has a fourth orientation angle and is a fourth distance from the LEA; wherein the second distance is greater than the first distance; wherein the third distance is greater than the second distance; wherein the fourth distance is greater than the third distance; and wherein the fourth distance minus the third distance is greater than the second distance minus the first distance.

For example, augmented reality eyewear can comprise: a Light Emitter Array (LEA) which creates virtual images in a person's field of view; and a Quasi Fresnel Reflector (QFR) which is configured to be worn in front of the person's eye; wherein the LEA is located to one side (e.g. right, left, top, or bottom) of the QFR; wherein the QFR further comprises an array of partially-reflective, partially-transmissive, flat surfaces; wherein the surfaces collectively reflect light beams from the LEA toward the person's eye to create virtual images in the person's field of view; wherein the orientation angle of a surface is the LEA-facing angle of intersection between the surface and a virtual plane which best fits the QFR; wherein a first subset of surfaces in the QFR has a first orientation angle and is a first distance from the LEA; wherein a second subset of surfaces in the QFR has a second orientation angle and is a second distance from the LEA; wherein a third subset of surfaces in the QFR has a third orientation angle and is a third distance from the LEA;

wherein a fourth subset of surfaces in the QFR has a fourth orientation angle and is a fourth distance from the LEA; wherein the second distance is greater than the first distance; wherein the third distance is greater than the second distance; wherein the fourth distance is greater than the third distance; wherein the second orientation angle is greater than the first orientation angle; wherein the third orientation angle is greater than the second orientation angle; and wherein the fourth orientation angle is greater than the third orientation angle.

In an example, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located to the right or left of the QFR; wherein the QFR further comprises an array of linear subsets of partially-reflective, partially-transmissive micromirrors; wherein the micromirrors collectively reflect light beams from the LEA toward the person's eye to create virtual images in the person's field of view; wherein the orientation angle of a micromirror in the QFR is the LEA-facing angle of intersection between the micromirror and a virtual flat plane which best fits the QFR; wherein a first subset of micromirrors in the QFR has a first orientation angle and is a first distance from the LEA; wherein a second subset of micromirrors in the QFR has a second orientation angle and is a second distance from the LEA; wherein a third subset of micromirrors in the QFR have a third orientation angle and is a third distance from the LEA; wherein the second distance is greater than the first distance; wherein the third distance is greater than the second distance; wherein the second orientation angle is less than the first orientation angle, and wherein the third orientation angle is less than the second orientation angle.

For example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises a nested (e.g. concentric) array of partially-reflective, partially-transmissive rings; wherein rings in the QFR collectively reflect light beams from the LEA toward the person's eye; wherein the orientation angle of a ring is the LEA-facing angle of intersection between the ring and the virtual plane of the QFR; wherein a first subset of rings in the QFR has a first orientation angle and is a first distance from the LEA; wherein a second subset of rings in the QFR has a second orientation angle and is a second distance from the LEA; wherein a third subset of rings in the QFR has a third orientation angle and is a third distance from the LEA; wherein the second distance is greater than the first distance; wherein the third distance is greater than the second distance; wherein the second orientation angle is less than the first orientation angle; and wherein the third orientation angle is greater than the second orientation angle. In another embodiment, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises a nested (e.g. concentric) array of rings of substantially-flat, partially-reflective, partially-transmissive, flat micromirrors; wherein the micromirrors collectively reflect light beams from the LEA toward the person's eye to create virtual images in the person's field of view; wherein the orientation angle of a micromirror is the LEA-facing angle of intersection between the micromirror and the virtual plane of the QFR; wherein a first subset of micromirrors in the QFR has a first orientation angle and is a first distance from the LEA; wherein a second subset of micromirrors in the QFR has a second orientation angle and is a second distance from the LEA; wherein a third subset of micromirrors in the QFR has a third orientation angle and is a third distance from the LEA; wherein the second distance is greater than the first distance; wherein the third distance is greater than the second distance; wherein the second orientation angle is less than the first orientation angle; and wherein the third orientation angle is greater than the second orientation angle.

In one example, augmented reality eyewear can comprise: at least four Light Emitter Arrays (LEAs) which configured to be equidistantly-distributed around a person's eye; and a Quasi Fresnel Reflector (QFR) which is configured to be worn in front of the person's eye; wherein the QFR further comprises a ring-and-spoke array of partially-reflective, partially-transmissive surfaces (e.g. micromirrors or ridges); wherein the surfaces collectively reflect light beams from the LEAs toward the person's eye to create virtual images in the person's field of view. Alternatively, Augmented Reality (AR) eyewear can comprise: an annular Light Emitter Array (LEA) which creates virtual images in a person's field of view; and a Quasi Fresnel Reflector (QFR) which is configured to be worn in front of the person's eye; wherein the QFR further comprises a ring-and-spoke array of partially-reflective, partially-transmissive surfaces (e.g. micromirrors or ridges); wherein the surfaces collectively reflect light beams from the LEA toward the person's eye to create virtual images in the person's field of view; and wherein surfaces which are farther from the center (e.g. closer to the peripheral edges) of the QFR are more aligned with the best-fitting flat virtual plane of the QFR than surfaces which are closer to the center of the QFR.

In yet another example, augmented reality eyewear can comprise: an annular Light Emitter Array (LEA) which creates virtual images in a person's field of view; and a Quasi Fresnel Reflector (QFR) which is configured to be worn in front of the person's eye; wherein the QFR further comprises a ring-and-spoke array of partially-reflective, partially-transmissive, flat surfaces (e.g. micromirrors or ridges); wherein there is intra-spoke variation in surface angle with respect to the virtual plane of the QFR; wherein surfaces in a spoke which are closer to the center of the QFR have larger angles than surfaces in the spoke which are closer to the peripheral edges of the QFR; and wherein the surfaces collectively reflect light beams from the LEA toward the person's eye to create virtual images in the person's field of view. In another example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of arcuate (e.g. conic-section-shaped) subsets of partially-reflective, partially-transmissive surfaces (e.g. micromirrors or ridges); wherein the surfaces collectively reflect light beams from the LEA toward the person's eye; and wherein arcuate subsets of surfaces which are closer to the center of the QFR are more convex than arcuate subsets of surfaces which are farther from the center (e.g. closer to the peripheral edges) of the QFR.

In one embodiment, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of arcuate subsets of partially-reflective, partially-transmissive micromirrors; wherein the micromirrors collectively reflect light beams from the LEA toward the person's eye in order to create virtual images in the person's field of view; and wherein distances between subsets of micromirrors decrease toward the center of the QFR and increase toward the periphery of the QFR. Alternatively, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of arcuate subsets of partially-reflective, partially-transmissive micromirrors; wherein the micromirrors collectively reflect light beams from the LEA toward the person's eye in order to create virtual images in the person's field of view; and wherein subsets of micromirrors which are closer to the LEA are less concave than subsets of micromirrors which are farther from the LEA.

For example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of arcuate, partially-reflective, partially-transmissive ridges; wherein the ridges collectively reflect light beams from the LEA toward the person's eye; and wherein a first subset of ridges which are closer to the LEA are closer to each other than a second subset of ridges which are farther from the LEA. In another embodiment, Augmented Reality (AR) eyeglasses can comprise: a Light Emitter Array (LEA) which creates virtual images in a person's field of view; and a Quasi Fresnel Reflector (QFR) which is configured to be worn in front of the person's eye; wherein the QFR further comprises an array of arcuate, partially-reflective, partially-transmissive ridges; wherein the ridges collectively reflect light beams from the LEA toward the person's eye; and wherein a first subset of ridges which are closer to the LEA are more convex than a second subset of ridges which are farther from the LEA.

In one example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of at least 50 linear, parallel, partially-reflective, partially-transmissive surfaces (e.g. micromirrors or ridges); wherein the surfaces collectively reflect light beams from the LEA toward the person's eye; and wherein the surfaces which are farther from the LEA extend further out from the virtual plane of the QFR than the surfaces which are closer to the LEA. In another example, Augmented Reality (AR) eyewear can comprise: an annular Light Emitter Array (LEA) which creates virtual images in a person's field of view; and a Quasi Fresnel Reflector (QFR) which is configured to be worn in front of the person's eye; wherein the QFR further comprises an array of circular, partially-reflective, partially-transmissive ridges; wherein the ridges collectively reflect light beams from the LEA toward the person's eye; and wherein ridges which are closer to the center of the QFR are closer to each other than ridges surfaces which are farther from the center (e.g. closer to the peripheral edges) of the QFR.

For example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of flat partially-reflective, partially-transmissive, flat surfaces; wherein surfaces in the QFR collectively reflect light beams from the LEA toward the person's eye; wherein the orientation angle of a surface is the LEA-facing angle of intersection between the surface and the virtual plane of the QFR; wherein a first subset of surfaces in the QFR has a first orientation angle and is a first distance from the LEA; wherein a second subset of surfaces in the QFR has a second orientation angle and is a second distance from the LEA; wherein a third subset of surfaces in the QFR has a third orientation angle and is a third distance from the LEA; wherein the second distance is greater than the first distance; wherein the third distance is greater than the second distance; wherein the second orientation angle is less than the first orientation angle; and wherein the third orientation angle is less than the second orientation angle. In another embodiment, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of linear subsets of partially-reflective, partially-transmissive micromirrors; wherein the micromirrors collectively reflect light beams from the LEA toward the person's eye to create virtual images in the person's field of view; and wherein linear subsets of micromirrors which are farther from the LEA extend farther out from the main plane of the QFR than linear subsets of micromirrors which are closer to the LEA.

In one embodiment, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of linear subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR and/or relative to the virtual plane which best fits the LEA; and wherein the angles of a first linear subset of micromirrors which are closer to the LEA are less than the angles of a second linear subset of micromirrors which are farther from the LEA. Alternatively, Augmented Reality (AR) eyeglasses can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of linear subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the LEA; wherein the angles of a first linear subset of micromirrors which are closer to the LEA are less than the angles of a second linear subset of micromirrors which are farther from the LEA; and wherein linear subsets of micromirrors which closer to center of the QFR are closer together than linear subsets of micromirrors which are closer to the periphery of the QFR.

For example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of linear subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR; wherein the angles of a first subset of micromirrors which are closer to the LEA are greater than the angles of a second subset of micromirrors which are farther from the LEA; and wherein subsets of micromirrors which closer to center of the QFR are closer together than subsets of micromirrors which are closer to the periphery of the QFR.

In an example, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of linear subsets of partially-reflective, partially-transmissive micromirrors; wherein the micromirrors collectively reflect light beams from the LEA toward the person's eye to create virtual images in the person's field of view; wherein the orientation angle of a micromirror in the QFR is the LEA-facing angle of intersection between the micromirror and a virtual plane which best fits the QFR; wherein a first linear subset of micromirrors in the QFR has a first orientation angle and is a first distance from the LEA; wherein a second linear subset of micromirrors in the QFR has a second orientation angle and is a second distance from the LEA; wherein a third linear subset of micromirrors in the QFR has a third orientation angle and is a third distance from the LEA; wherein a fourth linear subset of micromirrors in the QFR has a fourth orientation angle and is a fourth distance from the LEA; wherein the second distance is greater than the first distance; wherein the third distance is greater than the second distance; wherein the fourth distance is greater than the third distance; wherein the second orientation angle is less than the first orientation angle; wherein the third orientation angle is less than the second orientation angle; and wherein the fourth orientation angle is less than the third orientation angle.

For example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of linear, parallel, partially-reflective, partially-transmissive surfaces (e.g. micromirrors or ridges); wherein the surfaces collectively reflect light beams from the LEA toward the person's eye; and wherein the surfaces which are farther from the center (e.g. closer to the peripheral edges) of the QFR extend further out from the virtual plane of the QFR than the surfaces which are closer to the center of the QFR. In another embodiment, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of linear, partially-reflective, partially-transmissive surfaces (e.g. micromirrors or ridges) which reflect light beams from the LEA toward the person's eye to create virtual images in the person's field of view; and wherein a Conventional Fresnel Reflector (CFR) reflects collimated light rays from a distant light source into convergence at a central focal point, but this Quasi Fresnel Reflector (QFR) reflects light rays from a LEA on one side (e.g. right, left, top, or bottom side) of the QFR into convergence on a central focal point.

In one example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of linear, partially-reflective, partially-transmissive ridges; wherein the ridges collectively reflect light beams from the LEA toward the person's eye; and wherein a first subset of ridges which are closer to the center of the QFR are closer to each other than a second subset of ridges which are farther from the center (e.g. closer to the peripheral edges) of the QFR. In another example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of linear, partially-reflective, partially-transmissive ridges; wherein the ridges collectively reflect light beams from the LEA toward the person's eye; wherein different ridges have different angles relative to the virtual plane which best fits the LEA; and wherein the angles of a first subset of ridges which are closer to the LEA are greater than the angles of a second subset of ridges which are farther from the LEA.

In yet another example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of linear, partially-reflective, partially-transmissive ridges; wherein the ridges collectively reflect light beams from the LEA toward the person's eye; wherein different ridges have different angles relative to the virtual plane which best fits the QFR and/or relative to the virtual plane which best fits the LEA; and wherein the angles of a first subset of ridges which are closer to the LEA are greater than the angles of a second subset of ridges which are farther from the LEA. In another example, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of linear, partially-reflective, partially-transmissive ridges; wherein the ridges collectively reflect light beams from the LEA toward the person's eye; wherein different ridges have different angles relative to the virtual plane which best fits the QFR; and wherein the angles of a first subset of ridges which are closer to the LEA are greater than the angles of a second subset of ridges which are farther from the LEA.

In one embodiment, augmented reality eyewear can comprise: a Light Emitter Array (LEA) which is configured to be worn to the right or to the left of a person's eye; and a Quasi Fresnel Reflector (QFR) which is configured to be worn in front of the person's eye; wherein the QFR further comprises an array of linear, partially-reflective, partially-transmissive surfaces; wherein the surfaces collectively reflect light beams from the LEA toward the person's eye to create virtual images in the person's field of view; wherein the orientation angle of a surface is the LEA-facing angle of intersection between the surface and the virtual plane of the QFR; wherein a first subset of surfaces in the QFR has a first orientation angle and is a first distance from the LEA; wherein a second subset of surfaces in the QFR has a second orientation angle and is a second distance from the LEA; wherein a third subset of surfaces in the QFR has a third orientation angle and is a third distance from the LEA; wherein the second distance is greater than the first distance; wherein the third distance is greater than the second distance; wherein the second orientation angle is less than the first orientation angle; and wherein the third orientation angle is less than the second orientation angle.

For example, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of movable, linear, partially-reflective, partially-transmissive surfaces (e.g. microridges or micromirrors) which reflect light beams from the LEA toward the person's eye to create virtual images in the person's field of view; and one or more electromagnetic actuators which selectively move subsets of surfaces in the QFR. In another example, augmented reality eyewear can comprise: an annular Light Emitter Array (LEA) which creates virtual images in a person's field of view; and a Quasi Fresnel Reflector (QFR) which is configured to be worn in front of the person's eye; wherein the QFR further comprises an array of nested (e.g. concentric), circular, partially-reflective, partially-transmissive ridges; wherein the ridges collectively reflect light beams from the LEA toward the person's eye; and wherein ridges which are closer to the center of the QFR intersect the plane of the QFR at a different angle than ridges which are farther from the center (e.g. closer to the peripheral edges) of the QFR.

In an example, Augmented Reality (AR) eyeglasses can comprise: a Light Emitter Array (LEA) which creates virtual images in a person's field of view; and a Quasi Fresnel Reflector (QFR) which is configured to be worn in front of the person's eye; wherein the QFR further comprises an array of nested (e.g. concentric) arcuate, partially-reflective, partially-transmissive ridges; wherein the ridges collectively reflect light beams from the LEA toward the person's eye; wherein different ridges have different angles relative to the virtual plane which best fits the LEA; and wherein the angles of a first subset of ridges which are closer to the LEA are greater than the angles of a second subset of ridges which are farther from the LEA. In another embodiment, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of nested (e.g. concentric) arcuate, partially-reflective, partially-transmissive ridges; wherein the ridges collectively reflect light beams from the LEA toward the person's eye; wherein different ridges have different angles relative to the virtual plane which best fits the QFR and/or relative to the virtual plane which best fits the LEA; wherein the angles of a first subset of ridges which are closer to the LEA are less than the angles of a second subset of ridges which are farther from the LEA; and wherein ridges which closer to center of the QFR are closer together than ridges which are closer to the peripheral edges of the QFR.

For example, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of nested (e.g. concentric) arcuate, partially-reflective, partially-transmissive ridges; wherein the ridges collectively reflect light beams from the LEA toward the person's eye; wherein different ridges have different angles relative to the virtual plane which best fits the QFR; wherein the angles of a first subset of ridges which are closer to the LEA are less than the angles of a second subset of ridges which are farther from the LEA; and wherein ridges which closer to center of the QFR are closer together than ridges which are closer to the peripheral edges of the QFR. Alternatively, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of nested (e.g. concentric) circular, partially-reflective, partially-transmissive ridges; wherein the ridges collectively reflect light beams from the LEA toward the person's eye; wherein different ridges have different angles relative to the virtual plane which best fits the LEA; wherein the angles of a first subset of ridges which are closer to the LEA are less than the angles of a second subset of ridges which are farther from the LEA; and wherein ridges which closer to center of the QFR are closer together than ridges which are closer to the peripheral edges of the QFR.

In one embodiment, Augmented Reality (AR) eyeglasses can comprise: a Light Emitter Array (LEA) which creates virtual images in a person's field of view; and a Quasi Fresnel Reflector (QFR) which is configured to be worn in front of the person's eye; wherein the QFR further comprises an array of nested (e.g. concentric) circular, partially-reflective, partially-transmissive ridges; wherein the ridges collectively reflect light beams from the LEA toward the person's eye; wherein different ridges have different angles relative to the virtual plane which best fits the QFR and/or relative to the virtual plane which best fits the LEA; and wherein the angles of a first subset of ridges which are closer to the LEA are greater than the angles of a second subset of ridges which are farther from the LEA. In another embodiment, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of nested (e.g. concentric) circular, partially-reflective, partially-transmissive ridges; wherein the ridges collectively reflect light beams from the LEA toward the person's eye; wherein different ridges have different angles relative to the virtual plane which best fits the QFR; and wherein the angles of a first subset of ridges which are closer to the LEA are less than the angles of a second subset of ridges which are farther from the LEA.

For example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of nested arcuate subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR and/or relative to the virtual plane which best fits the LEA; and wherein the angles of a first subset of micromirrors which are closer to the LEA are greater than the angles of a second subset of micromirrors which are farther from the LEA. Alternatively, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of nested arcuate subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR; wherein the angles of a first subset of micromirrors which are closer to the LEA are less than the angles of a second subset of micromirrors which are farther from the LEA; and wherein subsets of micromirrors which closer to center of the QFR are closer together than subsets of micromirrors which are closer to the periphery of the QFR.

In yet another example, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of nested circular subsets of partially-reflective, partially-transmissive micromirrors; wherein the micromirrors collectively reflect light beams from the LEA toward the person's eye in order to create virtual images in the person's field of view; and wherein distances between circular subsets of micromirrors decrease toward the center of the QFR and increase toward the periphery of the QFR.

In one embodiment, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of nested circular subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR; and wherein the angles of a first subset of micromirrors which are closer to the LEA are less than the angles of a second subset of micromirrors which are farther from the LEA. In another embodiment, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of nested circular subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the LEA; wherein the angles of a first subset of micromirrors which are closer to the LEA are less than the angles of a second subset of micromirrors which are farther from the LEA; and wherein subsets of micromirrors which closer to center of the QFR are closer together than subsets of micromirrors which are closer to the periphery of the QFR.

In an example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of nested circular subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR and/or relative to the virtual plane which best fits the LEA; wherein the angles of a first subset of micromirrors which are closer to the LEA are greater than the angles of a second subset of micromirrors which are farther from the LEA; and wherein subsets of micromirrors which closer to center of the QFR are closer together than subsets of micromirrors which are closer to the periphery of the QFR. In another example, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of partially-reflective, partially-transmissive surfaces (e.g. microridges or micromirrors) which reflect light beams from the LEA toward the person's eye to create virtual images in the person's field of view; and an Electromagnetic Field Generator (EFG) which generates a magnetic field which selectively moves subsets of surfaces in the QFR.

For example, augmented reality eyewear can comprise: an annular Light Emitter Array (LEA) which creates virtual images in a person's field of view; and a Quasi Fresnel Reflector (QFR) which is configured to be worn in front of the person's eye; wherein the QFR further comprises an array of partially-reflective, partially-transmissive rings; and wherein the rings collectively reflect light beams from the LEA toward the person's eye; and wherein rings which are closer to the center of the QFR extend farther out from the virtual plane of the QFR than rings which are farther from the center (e.g. closer to the peripheral edges) of the QFR.

In one embodiment, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of partially-reflective and partially-transmissive micromirrors; wherein micromirrors in the QFR collectively reflect light beams from the LEA toward the person's eye to create virtual images in the person's field of view; wherein the orientation angle of a micromirror is the LEA-facing angle of intersection between the micromirror and the virtual flat plane which best fits the QFR; wherein a first subset of micromirrors in the QFR have a first orientation angle and is a first distance from the LEA; a second subset of micromirrors in the QFR have a second orientation angle and is a second distance from the LEA; and a third subset of micromirrors in the QFR have a third orientation angle and is a third distance from the LEA; wherein the second distance is greater than the first distance; wherein the third distance is greater than the second distance; wherein the second orientation angle is less than the first orientation angle; wherein the third orientation angle is less than the second orientation angle; and wherein there are surfaces of the QFR between the three subsets of micromirrors which are perpendicular to the QFR plane, parallel to each other, or parallel to radial lines of light extending outward from an eye.

For example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of partially-reflective, partially-transmissive surfaces; wherein surfaces in the QFR collectively reflect light beams from the LEA toward the person's eye; wherein the orientation angle of a surface is the LEA-facing angle of intersection between the surface and the virtual plane of the QFR; wherein a first subset of surfaces in the QFR has a first orientation angle and is a first distance from the LEA; wherein a second subset of surfaces in the QFR has a second orientation angle and is a second distance from the LEA; wherein a third subset of surfaces in the QFR has a third orientation angle and is a third distance from the LEA; wherein the second distance is greater than the first distance; wherein the third distance is greater than the second distance; wherein the second orientation angle is less than the first orientation angle; wherein the third orientation angle is less than the second orientation angle; and wherein there are surfaces of the QFR between the three subsets of surfaces which are substantially perpendicular to the QFR plane, parallel to each other, and/or parallel to radial lines of light from an eye.

In an example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of partially-reflective, partially-transmissive, flat surfaces; wherein the LEA is located to the right of the QFR; wherein the surfaces collectively reflect light beams from the LEA toward the person's eye to create virtual images in the person's field of view; wherein the orientation angle of a surface is the LEA-facing angle of intersection between the surface and the virtual plane of the QFR; wherein a first subset of surfaces in the first quadrant across the (right-to-left) width of the QFR has a first orientation angle; wherein a second subset of surfaces in the second quadrant across the (right-to-left) width of the QFR has a second orientation angle; wherein a third subset of surfaces in the first quadrant across the (right-to-left) width of the QFR has a third orientation angle; wherein a fourth subset of surfaces in the second quadrant across the (right-to-left) width of the QFR has a fourth orientation angle; wherein the second orientation angle is less than the first orientation angle; wherein the third orientation angle is less than the second orientation angle; wherein the fourth orientation angle is less than the third orientation angle.

For example, augmented reality eyewear can comprise: an annular Light Emitter Array (LEA) which is configured to encircle a person's eye and emit light beams which create virtual images in the person's field of view; and a Quasi Fresnel Reflector (QFR) which is configured to be worn in front of the person's eye; wherein the QFR further comprises an array of partially-reflective, partially-transmissive micromirrors; wherein the micromirrors collectively reflect light beams from the LEA toward the person's eye in order to create virtual images in the person's field of view; and wherein the combined surfaces of the micromirrors which face the LEA collectively comprise sections of a sphere.

In one example, Augmented Reality (AR) eyeglasses can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of partially-reflective, partially-transmissive micromirrors; wherein the micromirrors collectively reflect light beams from the LEA toward the person's eye to create virtual images in the person's field of view; wherein a first subset of micromirrors in the QFR are a first distance from the LEA; wherein a second subset of micromirrors in the QFR are a second distance from the LEA; wherein a third subset of micromirrors in the QFR are a third distance from the LEA; wherein the second distance is greater than the first distance; wherein the third distance is greater than the second distance; wherein the second subset of micromirrors has an orientation which is rotated in a first (e.g. clockwise) direction relative to the orientation of the first subset of micromirrors, and wherein the third subset of micromirrors has an orientation which is rotated in a second (e.g. counter-clockwise) direction relative to the orientation of the second subset of micromirrors, wherein the second direction is opposite the first direction.

In an example, this invention can be embodied in augmented reality eyewear comprising: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of partially-reflective, partially-transmissive micromirrors; wherein the micromirrors collectively reflect light beams from the LEA so that the light beams focus on or within the person's eye; wherein the orientation angle of a micromirror in the QFR is the LEA-facing angle of intersection between the micromirror and a virtual flat plane which best fits the QFR; wherein a first subset of micromirrors in the QFR has a first orientation angle and is a first distance from the LEA; wherein a second subset of micromirrors in the QFR has a second orientation angle and is a second distance from the LEA; wherein a third subset of micromirrors in the QFR has a third orientation angle and is a third distance from the LEA; wherein the second distance is greater than the first distance; wherein the third distance is greater than the second distance; wherein the second orientation angle is less than the first orientation angle, and wherein the third orientation angle is less than the second orientation angle.

In one embodiment, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of partially-reflective, partially-transmissive micromirrors; wherein the micromirrors collectively reflect light beams from the LEA toward the person's eye to create virtual images in the person's field of view; wherein the orientation angle of a micromirror in the QFR is the LEA-facing angle of intersection between the micromirror and a virtual flat plane which best fits the QFR; wherein a first subset of micromirrors in the QFR has a first orientation angle and is a first distance from the LEA; wherein a second subset of micromirrors in the QFR has a second orientation angle and is a second distance from the LEA; wherein a third subset of micromirrors in the QFR have a third orientation angle and is a third distance from the LEA; wherein the second distance is greater than the first distance; wherein the third distance is greater than the second distance; wherein the second orientation angle is less than the first orientation angle; wherein the third orientation angle is less than the second orientation angle, and wherein there are surfaces of the QFR between the three subsets of micromirrors with orientation angles which are different than the first, second, and third orientation angles.

For example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of partially-reflective, partially-transmissive micromirrors; wherein the micromirrors collectively reflect light beams from the LEA toward the person's eye to create virtual images in the person's field of view; wherein the orientation angle of a micromirror in the QFR is the LEA-facing angle of intersection between the micromirror and a virtual flat plane which best fits the QFR; wherein a first subset of micromirrors in the QFR has a first orientation angle and is a first distance from the LEA; wherein a second subset of micromirrors in the QFR has a second orientation angle and is a second distance from the LEA; wherein a third subset of micromirrors in the QFR have a third orientation angle and is a third distance from the LEA; wherein the second distance is greater than the first distance; wherein the third distance is greater than the second distance; wherein the second orientation angle is less than the first orientation angle; wherein the third orientation angle is less than the second orientation angle, and wherein there are surfaces of the QFR between the three subsets of micromirrors which are substantially perpendicular to the QFR plane.

In one example, Augmented Reality (AR) eyeglasses can comprise: a Light Emitter Array (LEA) which creates virtual images in a person's field of view; and a Quasi Fresnel Reflector (QFR) which is configured to be worn in front of the person's eye; wherein the QFR further comprises an array of partially-reflective, partially-transmissive surfaces; wherein the surfaces collectively reflect light beams from the LEA toward the person's eye to create virtual images in the person's field of view; wherein a first subset of surfaces in the QFR is a first distance from the LEA; wherein a second subset of surfaces in the QFR is a second distance from the LEA; wherein a third subset of surfaces in the QFR is a third distance from the LEA; wherein the second distance is greater than the first distance; wherein the third distance is greater than the second distance; wherein the orientation of the second subset of surfaces is rotated in a first (e.g. clockwise) direction relative to the orientation of the first subset of surfaces, and wherein the orientation of the third subset of surfaces is rotated in the first (e.g. clockwise) direction relative to the orientation of the second subset of surfaces.

For example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of partially-reflective, partially-transmissive, flat surfaces; wherein the surfaces collectively reflect light beams from the LEA toward the person's eye to create virtual images in the person's field of view; wherein the orientation angle of a surface is the LEA-facing angle of intersection between the surface and the virtual plane of the QFR; wherein a first subset of surfaces in the QFR has a first orientation angle and is a first distance from the LEA; wherein a second subset of surfaces in the QFR has a second orientation angle and is a second distance from the LEA; wherein a third subset of surfaces in the QFR has a third orientation angle and is a third distance from the LEA; wherein the second distance is greater than the first distance; wherein the third distance is greater than the second distance; wherein the second orientation angle is less than the first orientation angle; and wherein the third orientation angle is less than the second orientation angle. In another example, this invention can be embodied in augmented reality eyewear comprising: a Light Emitter Array (LEA) which creates virtual images in a person's field of view; and a Quasi Fresnel Reflector (QFR) which is configured to be worn in front of the person's eye; wherein the QFR further comprises an array of partially-reflective, partially-transmissive, flat surfaces; wherein the surfaces collectively reflect light beams from the LEA toward the person's eye to create virtual images in the person's field of view; wherein the orientation angle of a surface is the LEA-facing angle of intersection between the surface and the virtual plane of the QFR; wherein a first subset of surfaces in the QFR has a first orientation angle and is a first distance from the LEA; wherein a second subset of surfaces in the QFR has a second orientation angle and is a second distance from the LEA; wherein a third subset of surfaces in the QFR has a third orientation angle and is a third distance from the LEA; wherein the second distance is greater than the first distance; wherein the third distance is greater than the second distance; wherein the second orientation angle is less than the first orientation angle; wherein the third orientation angle is less than the second orientation angle; and wherein there are surfaces of the QFR between the three subsets of surfaces which are substantially parallel to radial lines of light from an eye.

In one embodiment, augmented reality eyewear can comprise: a Light Emitter Array (LEA) which creates virtual images in a person's field of view; and a substantially flat and/or planar Quasi Fresnel Reflector (QFR) which is configured to be worn in front of the person's eye; wherein the QFR further comprises an array of partially-reflective, partially-transmissive, flat surfaces; wherein the surfaces collectively reflect light beams from the LEA toward the person's eye to create virtual images in the person's field of view; wherein the orientation angle of a surface is the LEA-facing angle of intersection between the surface and the virtual plane of the QFR; wherein a first subset of surfaces in the QFR has a first orientation angle and is a first distance from the LEA; wherein a second subset of surfaces in the QFR has a second orientation angle and is a second distance from the LEA; wherein a third subset of surfaces in the QFR has a third orientation angle and is a third distance from the LEA; wherein the second distance is greater than the first distance; wherein the third distance is greater than the second distance; wherein the second orientation angle is less than the first orientation angle; and wherein the third orientation angle is less than the second orientation angle.

For example, Augmented Reality (AR) eyewear can comprise: an annular Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of rings of partially-reflective, partially-transmissive micromirrors; wherein the micromirrors collectively reflect light beams from the LEA toward the person's eye in order to create virtual images in the person's field of view; and wherein rings which are closer to the center of the QFR are closer to each other than rings which are farther from the center (e.g. closer to the peripheral edges) of the QFR.

In yet another example, augmented reality eyewear can comprise: a Light Emitter Array (LEA) which is configured to be worn to the right or to the left of a person's eye and emit light beams which create virtual images in the person's field of view; and a Quasi Fresnel Reflector (QFR) which is configured to be worn in front of the person's eye; wherein the QFR further comprises an array of vertically-linear subsets of partially-reflective, partially-transmissive micromirrors; wherein the micromirrors collectively reflect light beams from the LEA toward the person's eye to create virtual images in the person's field of view; wherein the orientation angle of a micromirror in the QFR is the LEA-facing angle of intersection between the micromirror and a virtual flat plane which best fits the QFR; wherein a first linear subset of micromirrors in the QFR has a first orientation angle and is a first distance from the LEA; wherein a second linear subset of micromirrors in the QFR has a second orientation angle and is a second distance from the LEA; wherein a third linear subset of micromirrors in the QFR has a third orientation angle and is a third distance from the LEA; wherein the second distance is greater than the first distance; wherein the third distance is greater than the second distance; wherein the second orientation angle is less than the first orientation angle, and wherein the third orientation angle is less than the second orientation angle.

In one embodiment, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR is an off-axis Fresnel reflector; wherein the QFR further comprises an array of linear subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR and/or relative to the virtual plane which best fits the LEA; wherein the angles of linear subsets of micromirrors which are closer to the LEA are less than the angles of linear subsets of micromirrors which are farther from the LEA; and wherein linear subsets of micromirrors which closer to center of the QFR are closer together than linear subsets of micromirrors which are closer to the periphery of the QFR. Alternatively, augmented reality eyewear can comprise: a Light Emitter Array (LEA) which creates virtual images in a person's field of view; and a Quasi Fresnel Reflector (QFR) which is configured to be worn in front of the person's eye; wherein the QFR is like a Conventional Fresnel Reflector (CFR) except that the QFR reflects light from a lateral (e.g. right-side or left-side) LEA toward a central focal point (e.g. on or within the person's eye); wherein the QFR is partially-reflective and partially-transmissive; and wherein the QFR reflects light beams from the LEA toward the person's eye to create virtual images in the person's field of view.

In one example, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR is partially-reflective and partially-transmissive; wherein a cross-section of the QFR has a sinusoidal shape with waves whose lengths increase across the width of the QFR; and wherein the QFR reflects light beams from the LEA toward the person's eye to create virtual images in the person's field of view. In another embodiment, augmented reality eyewear can comprise: a Quasi Fresnel Reflector (QFR) which is configured to be worn in front of a person's eye; wherein the QFR further comprises an array of horizontal, linear, partially-reflective, partially-transmissive surfaces (e.g. microridges or micromirrors); a first Light Emitter Array (LEA) which is substantially above the QFR; and a second Light Emitter Array (LEA) which is substantially below the QFR; wherein the surfaces in the QFR collectively reflect light beams from the first LEA and the second LEA toward the person's eye to create virtual images in the person's field of view; wherein the orientation angle of a surface is an upward-facing angle of intersection between the surface and the virtual plane of the QFR; wherein a first subset of surfaces is first distance from the upper side of the QFR and has a first orientation angle; wherein a second subset of surfaces is a second distance from the upper side of the QFR and has a second orientation angle; wherein a third subset of surfaces is a third distance from the upper side of the QFR and has a third orientation angle; wherein a fourth subset of surface is a fourth distance from the upper side of the QFR and has a fourth orientation angle; wherein the second distance is greater than the first distance, the third distance is greater than the second distance, and the fourth distance is greater than the third distance; wherein the second orientation angle is less than the first orientation angle; and wherein the third orientation angle is less than the fourth orientation angle.

For example, augmented reality eyewear can comprise: a Quasi Fresnel Reflector (QFR) which is configured to be worn in front of a person's eye; wherein the QFR further comprises an array of vertical, linear, partially-reflective, partially-transmissive surfaces (e.g. microridges or micromirrors); a first Light Emitter Array (LEA) which is substantially to the right of the QFR; and a second Light Emitter Array (LEA) which is substantially to the left of the QFR; wherein the surfaces in the QFR collectively reflect light beams from the first LEA and the second LEA toward the person's eye to create virtual images in the person's field of view; wherein the orientation angle of a surface is a right-facing angle of intersection between the surface and the virtual plane of the QFR; wherein a first subset of surfaces is first distance from the right side of the QFR and has a first orientation angle; wherein a second subset of surfaces is a second distance from the right side of the QFR and has a second orientation angle; wherein a third subset of surfaces is a third distance from the right side of the QFR and has a third orientation angle; wherein a fourth subset of surface is a fourth distance from the right side of the QFR and has a fourth orientation angle; wherein the second distance is greater than the first distance, the third distance is greater than the second distance, and the fourth distance is greater than the third distance; wherein the second orientation angle is less than the first orientation angle; and wherein the third orientation angle is less than the fourth orientation angle. In another example, Augmented Reality (AR) eyeglasses can comprise: a Light Emitter Array (LEA) which is configured to be located to a first side (e.g. right side, left side, top side, or bottom side) of a person's eye; a Digital Micromirror Device (DMD) which is also configured to be located to a second side (e.g. left side, right side, top side, or bottom side) of the person's eye, wherein the second side is opposite the first side; and a Quasi Fresnel Reflector (QFR); wherein the QFR is configured to be worn in front of the person's eye; wherein the QFR further comprises an array of partially-reflective, partially-transmissive surfaces (e.g. microridges or micromirrors); wherein the DMD receives light beams from the LEA and reflects the light beams toward the QFR; and wherein the QFR receives the light beams from the DMD and reflects the light beams toward the person's eye to create virtual images in the person's field of view.

In an example, augmented reality eyewear can comprise: an annular Light Emitter Array (LEA) which creates virtual images in a person's field of view; and a Quasi Fresnel Reflector (QFR) which is configured to be worn in front of the person's eye; wherein the LEA encircles the QFR; wherein the QFR further comprises an array of nested (e.g. concentric), partially-reflective, partially-transmissive rings; wherein the rings collectively reflect light beams from the LEA toward the person's eye; and wherein rings which are closer to the center of the QFR are closer to each other than rings which are farther from the center (e.g. closer to the peripheral edges) of the QFR. In another embodiment, Augmented Reality (AR) eyewear can comprise: an annular Light Emitter Array (LEA) which creates virtual images in a person's field of view; and a Quasi Fresnel Reflector (QFR) which is configured to be worn in front of the person's eye; wherein the LEA encircles the QFR; wherein the QFR further comprises an array of partially-reflective, partially-transmissive, flat surfaces (e.g. micromirrors or microridges); wherein the surfaces collectively reflect light beams from the LEA toward the person's eye; and wherein reflective surfaces which are closer to the center of the QFR are closer to each other than reflective surfaces which are farther from the center (e.g. closer to the peripheral edges) of the QFR.

For example, augmented reality eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of arcuate, partially-reflective, partially-transmissive ridges; wherein the ridges collectively reflect light beams from the LEA toward the person's eye; and wherein a first subset of ridges which are closer to the first side of the QFR are more convex than a second subset of ridges which are farther from the first side of the QFR. Alternatively, augmented reality eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of arcuate, partially-reflective, partially-transmissive ridges; wherein the ridges collectively reflect light beams from the LEA toward the person's eye; and wherein a first subset of ridges which are closer to the first side of the QFR are farther apart from each other than a second subset of ridges which are farther from the first side of the QFR.

In one example, augmented reality eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of linear, partially-reflective, partially-transmissive ridges; wherein the ridges collectively reflect light beams from the LEA toward the person's eye; wherein different ridges have different angles relative to the virtual plane which best fits the LEA; and wherein the angles of a first subset of ridges which are closer to the first side of the QFR are less than the angles of a second subset of ridges which are farther from the first side of the QFR. In another embodiment, augmented reality eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of linear, partially-reflective, partially-transmissive ridges; wherein the ridges collectively reflect light beams from the LEA toward the person's eye; wherein different ridges have different angles relative to the virtual plane which best fits the QFR; and wherein the angles of a first subset of ridges which are closer to the first side of the QFR are less than the angles of a second subset of ridges which are farther from the first side of the QFR.

For example, Augmented Reality (AR) eyeglasses can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of linear, partially-reflective, partially-transmissive ridges; wherein the ridges collectively reflect light beams from the LEA toward the person's eye; wherein different ridges have different angles relative to the virtual plane which best fits the QFR; wherein the angles of a first subset of ridges which are closer to the first side of the QFR are greater than the angles of a second subset of ridges which are farther from the first side of the QFR; and wherein ridges which closer to center of the QFR are closer together than ridges which are closer to the peripheral edges of the QFR. In another example, augmented reality eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of nested (e.g. concentric) arcuate, partially-reflective, partially-transmissive ridges; wherein the ridges collectively reflect light beams from the LEA toward the person's eye; wherein different ridges have different angles relative to the virtual plane which best fits the QFR; wherein the angles of a first subset of ridges which are closer to the first side of the QFR are less than the angles of a second subset of ridges which are farther from the first side of the QFR; and wherein ridges which closer to center of the QFR are closer together than ridges which are closer to the peripheral edges of the QFR.

In one embodiment, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of nested (e.g. concentric) arcuate, partially-reflective, partially-transmissive ridges; wherein the ridges collectively reflect light beams from the LEA toward the person's eye; wherein different ridges have different angles relative to the virtual plane which best fits the QFR; wherein the angles of a first subset of ridges which are closer to the first side of the QFR are less than the angles of a second subset of ridges which are farther from the first side of the QFR; and wherein ridges which closer to center of the QFR are closer together than ridges which are closer to the peripheral edges of the QFR. Alternatively, augmented reality eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of nested (e.g. concentric) arcuate, partially-reflective, partially-transmissive ridges; wherein the ridges collectively reflect light beams from the LEA toward the person's eye; wherein different ridges have different angles relative to the virtual plane which best fits the QFR and/or relative to the virtual plane which best fits the LEA; wherein the angles of a first subset of ridges which are closer to the first side of the QFR are greater than the angles of a second subset of ridges which are farther from the first side of the QFR; and wherein ridges which closer to center of the QFR are closer together than ridges which are closer to the peripheral edges of the QFR.

In one embodiment, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of nested (e.g. concentric) circular, partially-reflective, partially-transmissive ridges; wherein the ridges collectively reflect light beams from the LEA toward the person's eye; wherein different ridges have different angles relative to the virtual plane which best fits the LEA; wherein the angles of a first subset of ridges which are closer to the first side of the QFR are less than the angles of a second subset of ridges which are farther from the first side of the QFR; and wherein ridges which closer to center of the QFR are closer together than ridges which are closer to the peripheral edges of the QFR. In another example, augmented reality eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of nested (e.g. concentric) circular, partially-reflective, partially-transmissive ridges; wherein the ridges collectively reflect light beams from the LEA toward the person's eye; wherein different ridges have different angles relative to the virtual plane which best fits the QFR; wherein the angles of a first subset of ridges which are closer to the first side of the QFR are less than the angles of a second subset of ridges which are farther from the first side of the QFR; and wherein ridges which closer to center of the QFR are closer together than ridges which are closer to the peripheral edges of the QFR.

In yet another example, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of nested (e.g. concentric) circular, partially-reflective, partially-transmissive ridges; wherein the ridges collectively reflect light beams from the LEA toward the person's eye; wherein different ridges have different angles relative to the virtual plane which best fits the QFR and/or relative to the virtual plane which best fits the LEA; wherein the angles of a first subset of ridges which are closer to the first side of the QFR are greater than the angles of a second subset of ridges which are farther from the first side of the QFR; and wherein ridges which closer to center of the QFR are closer together than ridges which are closer to the peripheral edges of the QFR.

In another embodiment, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of arcuate subsets of partially-reflective, partially-transmissive micromirrors; wherein the micromirrors collectively reflect light beams from the LEA toward the person's eye in order to create virtual images in the person's field of view; and wherein arcuate subsets of micromirrors which are closer to the first side of the QFR are closer to each other than arcuate subsets of micromirrors which are farther from the first side of the QFR.

For example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of arcuate subsets of partially-reflective, partially-transmissive micromirrors; wherein the micromirrors collectively reflect light beams from the LEA toward the person's eye in order to create virtual images in the person's field of view; and wherein arcuate subsets of micromirrors which are closer to the first side of the QFR are more concave than arcuate subsets of micromirrors which are farther from the first side of the QFR. Alternatively, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of linear subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the LEA; and wherein the angles of a first linear subset of micromirrors which are closer to the first side of the QFR are less than the angles of a second linear subset of micromirrors which are farther from the first side of the QFR.

In one embodiment, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of linear subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR and/or relative to the virtual plane which best fits the LEA; and wherein the angles of a first subset of micromirrors which are closer to the first side of the QFR are less than the angles of a second subset of micromirrors which are farther from the first side of the QFR. In another embodiment, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of linear subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR; and wherein the angles of a first subset of micromirrors which are closer to the first side of the QFR are less than the angles of a second subset of micromirrors which are farther from the first side of the QFR.

For example, Augmented Reality (AR) eyeglasses can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of nested arcuate subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the LEA; wherein the angles of a first subset of micromirrors which are closer to the first side of the QFR are less than the angles of a second subset of micromirrors which are farther from the first side of the QFR; and wherein subsets of micromirrors which closer to center of the QFR are closer together than subsets of micromirrors which are closer to the periphery of the QFR. In another example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of nested arcuate subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR and/or relative to the virtual plane which best fits the LEA; wherein the angles of a first subset of micromirrors which are closer to the first side of the QFR are less than the angles of a second subset of micromirrors which are farther from the first side of the QFR; and wherein subsets of micromirrors which closer to center of the QFR are closer together than subsets of micromirrors which are closer to the periphery of the QFR.

In an example, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of nested arcuate subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR; wherein the angles of a first arcuate subset of micromirrors which are closer to the first side of the QFR are less than the angles of a second arcuate subset of micromirrors which are farther from the first side of the QFR; and wherein arcuate subsets of micromirrors which closer to center of the QFR are closer together than arcuate subsets of micromirrors which are closer to the periphery of the QFR.

For example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of nested circular subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the LEA; and wherein the angles of a first subset of micromirrors which are closer to the first side of the QFR are greater than the angles of a second subset of micromirrors which are farther from the first side of the QFR.

In one embodiment, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of nested circular subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR and/or relative to the virtual plane which best fits the LEA; wherein the angles of a first subset of micromirrors which are closer to the first side of the QFR are less than the angles of a second subset of micromirrors which are farther from the first side of the QFR; and wherein subsets of micromirrors which closer to center of the QFR are closer together than subsets of micromirrors which are closer to the periphery of the QFR. In another embodiment, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of nested circular subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR; and wherein the angles of a first subset of micromirrors which are closer to the first side of the QFR are greater than the angles of a second subset of micromirrors which are farther from the first side of the QFR.

For example, augmented reality eyewear can comprise: a Light Emitter Array (LEA) which creates virtual images in a person's field of view; and a Quasi Fresnel Reflector (QFR) which is configured to be worn in front of the person's eye; wherein the LEA is located to one side (e.g. right, left, top, or bottom) of the QFR; wherein the QFR further comprises an array of linear partially-reflective, partially-transmissive surfaces; wherein the surfaces collectively reflect light beams from the LEA toward the person's eye to create virtual images in the person's field of view; wherein the orientation angle of a surface is the LEA-facing angle of intersection between the surface and a virtual plane which best fits the QFR; wherein a first subset of surfaces in the QFR has a first orientation angle and is a first distance from the LEA; wherein a second subset of surfaces in the QFR has a second orientation angle and is a second distance from the LEA; wherein a third subset of surfaces in the QFR has a third orientation angle and is a third distance from the LEA; wherein a fourth subset of surfaces in the QFR has a fourth orientation angle and is a fourth distance from the LEA; wherein the second distance is greater than the first distance; wherein the third distance is greater than the second distance; wherein the fourth distance is greater than the third distance; wherein the second orientation angle is less than the first orientation angle; wherein the third orientation angle is less than the second orientation angle; and wherein the fourth orientation angle is less than the third orientation angle.

In an example, Augmented Reality (AR) eyeglasses can comprise: a Light Emitter Array (LEA) which creates virtual images in a person's field of view; and a Quasi Fresnel Reflector (QFR) which is configured to be worn in front of the person's eye; wherein the LEA is located to one side (e.g. right, left, top, or bottom) of the QFR; wherein the QFR further comprises an array of linear partially-reflective, partially-transmissive surfaces; wherein the surfaces collectively reflect light beams from the LEA toward the person's eye to create virtual images in the person's field of view; and wherein surfaces which are closer to the center of the QFR extend farther out from the main plane of the QFR than surfaces which are farther from the center (e.g. closer to the peripheral edges) of the QFR.

In one example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located to one side (e.g. right, left, top, or bottom) of the QFR; wherein the QFR further comprises an array of partially-reflective, partially-transmissive flat micromirrors; wherein the micromirrors collectively reflect light beams from the LEA toward the person's eye to create virtual images in the person's field of view; and wherein micromirrors which are closer to the center of the QFR are closer to each other than micromirrors which are farther from the center of the QFR.

In one embodiment, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the LEA is located to one side (e.g. right, left, top, or bottom) of the QFR; wherein the QFR further comprises an array of partially-reflective, partially-transmissive, flat surfaces; wherein the surfaces collectively reflect light beams from the LEA toward the person's eye to create virtual images in the person's field of view; wherein the orientation angle of a surface is the LEA-facing angle of intersection between the surface and a virtual plane which best fits the QFR; wherein a first subset of surfaces in the QFR has a first orientation angle and is a first distance from the LEA; wherein a second subset of surfaces in the QFR has a second orientation angle and is a second distance from the LEA; wherein a third subset of surfaces in the QFR has a third orientation angle and is a third distance from the LEA; wherein a fourth subset of surfaces in the QFR has a fourth orientation angle and is a fourth distance from the LEA; wherein the second distance is greater than the first distance; wherein the third distance is greater than the second distance; wherein the fourth distance is greater than the third distance; and wherein the fourth distance minus the third distance is less than the second distance minus the first distance.

For example, augmented reality eyewear can comprise: a Light Emitter Array (LEA) which creates virtual images in a person's field of view; and a Quasi Fresnel Reflector (QFR) which is configured to be worn in front of the person's eye; wherein the LEA is located to one side (e.g. right, left, top, or bottom) of the QFR; wherein the QFR further comprises an array of partially-reflective, partially-transmissive, flat surfaces; wherein the surfaces collectively reflect light beams from the LEA toward the person's eye to create virtual images in the person's field of view; and wherein surfaces which are closer to the center of the QFR are closer to each other than surfaces which are farther from the center (e.g. closer to the peripheral edges) of the QFR. Alternatively, Augmented Reality (AR) eyeglasses can comprise: a Light Emitter Array (LEA) which creates virtual images in a person's field of view; and a Quasi Fresnel Reflector (QFR) which is configured to be worn in front of the person's eye; wherein the LEA is located to the right or left of the QFR; wherein the QFR further comprises an array of linear, partially-reflective, partially-transmissive, flat surfaces; wherein the surfaces collectively reflect light beams from the LEA toward the person's eye to create virtual images in the person's field of view; wherein the orientation angle of a surface is the LEA-facing angle of intersection between the surface and the virtual plane of the QFR; wherein a first subset of surfaces in the QFR has a first orientation angle and is a first distance from the LEA; wherein a second subset of surfaces in the QFR has a second orientation angle and is a second distance from the LEA; wherein a third subset of surfaces in the QFR has a third orientation angle and is a third distance from the LEA; wherein the second distance is greater than the first distance; wherein the third distance is greater than the second distance; wherein the second orientation angle is less than the first orientation angle; and wherein the third orientation angle is less than the second orientation angle.

In an example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises a nested (e.g. concentric) array of partially-reflective, partially-transmissive rings; wherein rings in the QFR collectively reflect light beams from the LEA toward the person's eye; wherein the orientation angle of a ring is the LEA-facing angle of intersection between the ring and the virtual plane of the QFR; wherein a first subset of rings in the QFR has a first orientation angle and is a first distance from the LEA; wherein a second subset of rings in the QFR has a second orientation angle and is a second distance from the LEA; wherein a third subset of rings in the QFR has a third orientation angle and is a third distance from the LEA; wherein the second distance is greater than the first distance; wherein the third distance is greater than the second distance; wherein the second orientation angle is less than the first orientation angle; and wherein the third orientation angle is less than the second orientation angle.

For example, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises a nested (e.g. concentric) array of rings of partially-reflective, partially-transmissive surfaces (e.g. micromirrors or microridges); wherein the surfaces collectively reflect light beams from the LEA toward the person's eye to create virtual images in the person's field of view; wherein the orientation angle of a surface is the LEA-facing angle of intersection between the surface and the virtual plane of the QFR; wherein a first subset of surfaces in the QFR has a first orientation angle and is a first distance from the LEA; wherein a second subset of surfaces in the QFR has a second orientation angle and is a second distance from the LEA; wherein a third subset of surfaces in the QFR has a third orientation angle and is a third distance from the LEA; wherein the second distance is greater than the first distance; wherein the third distance is greater than the second distance; wherein the second orientation angle is less than the first orientation angle; and wherein the third orientation angle is less than the second orientation angle. In another embodiment, augmented reality eyewear can comprise: an annular Light Emitter Array (LEA) which creates virtual images in a person's field of view; and a Quasi Fresnel Reflector (QFR) which is inside the central opening of the annular LEA and configured to be worn in front of the person's eye; wherein the QFR further comprises a ring-and-spoke array of partially-reflective, partially-transmissive surfaces (e.g. micromirrors or ridges); wherein the surfaces collectively reflect light beams from the LEA toward the person's eye to create virtual images in the person's field of view.

In one embodiment, augmented reality eyewear can comprise: an annular Light Emitter Array (LEA) which creates virtual images in a person's field of view; and a Quasi Fresnel Reflector (QFR) which is configured to be worn in front of the person's eye; wherein the QFR further comprises a ring-and-spoke array of partially-reflective, partially-transmissive surfaces (e.g. micromirrors or ridges); wherein there is intra-ring variation in surface orientation angle with respect to the virtual plane of the QFR; and wherein the surfaces collectively reflect light beams from the LEA toward the person's eye to create virtual images in the person's field of view. In another example, augmented reality eyewear can comprise: an annular Light Emitter Array (LEA) which creates virtual images in a person's field of view; and a Quasi Fresnel Reflector (QFR) which is configured to be worn in front of the person's eye; wherein the QFR further comprises a ring-and-spoke array of partially-reflective, partially-transmissive surfaces (e.g. micromirrors or ridges); wherein there is intra-spoke variation in surface orientation angle with respect to the virtual plane of the QFR; and wherein the surfaces collectively reflect light beams from the LEA toward the person's eye to create virtual images in the person's field of view.

For example, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of arcuate (e.g. parabolic) subsets of partially-reflective, partially-transmissive surfaces (e.g. micromirrors or ridges); wherein the surfaces collectively reflect light beams from the LEA toward the person's eye; and wherein arcuate subsets of surfaces which are closer to the center of the QFR are closer to each other than arcuate subsets of surfaces which are farther from the center (e.g. closer to the peripheral edges) of the QFR. In another example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of arcuate subsets of partially-reflective, partially-transmissive micromirrors; wherein the micromirrors collectively reflect light beams from the LEA toward the person's eye in order to create virtual images in the person's field of view; and wherein subsets of micromirrors which are closer to the center of the QFR are closer to each other than subsets of micromirrors which are farther from the center of the QFR.

In one example, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of arcuate subsets of partially-reflective, partially-transmissive micromirrors; wherein the micromirrors collectively reflect light beams from the LEA toward the person's eye in order to create virtual images in the person's field of view; and wherein subsets of micromirrors which are closer to the LEA are more convex than subsets of micromirrors which are farther from the LEA. In another example, this invention can be embodied in augmented reality eyewear comprising: a Light Emitter Array (LEA) which creates virtual images in a person's field of view; and a Quasi Fresnel Reflector (QFR) which is configured to be worn in front of the person's eye; wherein the QFR further comprises an array of arcuate, partially-reflective, partially-transmissive ridges; wherein the ridges collectively reflect light beams from the LEA toward the person's eye; and wherein a first subset of ridges which are closer to the LEA are less concave than a second subset of ridges which are farther from the LEA.

In one embodiment, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of arcuate, partially-reflective, partially-transmissive ridges; wherein the ridges collectively reflect light beams from the LEA toward the person's eye; and wherein a first subset of ridges which are closer to the LEA are farther apart from each other than a second subset of ridges which are farther from the LEA. In another embodiment, augmented reality eyewear can comprise: an annular Light Emitter Array (LEA) which creates virtual images in a person's field of view; and a Quasi Fresnel Reflector (QFR) which is configured to be worn in front of the person's eye; wherein the QFR further comprises an array of at least 50 nested (e.g. concentric), partially-reflective, partially-transmissive rings; wherein the rings collectively reflect light beams from the LEA toward the person's eye;

and wherein rings which are closer to the center of the QFR are closer to each other than rings which are farther from the center (e.g. closer to the peripheral edges) of the QFR.

In yet another example, Augmented Reality (AR) eyeglasses can comprise: an annular Light Emitter Array (LEA) which creates virtual images in a person's field of view; and a Quasi Fresnel Reflector (QFR) which is configured to be worn in front of the person's eye; wherein the QFR further comprises an array of circular, partially-reflective, partially-transmissive ridges; wherein the ridges collectively reflect light beams from the LEA toward the person's eye; and wherein ridges which are closer to the center of the QFR extend farther out from the virtual plane of the QFR than ridges which are farther from the center (e.g. closer to the peripheral edges) of the QFR. Alternatively, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of flat partially-reflective, partially-transmissive, flat surfaces; wherein surfaces in the QFR collectively reflect light beams from the LEA toward the person's eye; wherein the orientation angle of a surface is the LEA-facing angle of intersection between the surface and the virtual plane of the QFR; wherein a first subset of surfaces in the QFR has a first orientation angle and is a first distance from the LEA; wherein a second subset of surfaces in the QFR has a second orientation angle and is a second distance from the LEA; wherein a third subset of surfaces in the QFR has a third orientation angle and is a third distance from the LEA; wherein the second distance is greater than the first distance; wherein the third distance is greater than the second distance; wherein the second orientation angle is less than the first orientation angle; and wherein the third orientation angle is greater than the second orientation angle.

For example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of linear subsets of partially-reflective, partially-transmissive micromirrors; wherein the micromirrors collectively reflect light beams from the LEA toward the person's eye in order to create virtual images in the person's field of view; and wherein subsets of micromirrors which are closer to the center of the QFR are closer to each other than linear subsets of micromirrors which are farther from the center of the QFR. In another embodiment, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of linear subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the LEA; and wherein the angles of a first linear subset of micromirrors which are closer to the LEA are greater than the angles of a second linear subset of micromirrors which are farther from the LEA.

In an example, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of linear subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the LEA; wherein the angles of a first linear subset of micromirrors which are closer to the LEA are greater than the angles of a second linear subset of micromirrors which are farther from the LEA; and wherein linear subsets of micromirrors which closer to center of the QFR are closer together than linear subsets of micromirrors which are closer to the periphery of the QFR.

For example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of linear subsets of partially-reflective, partially-transmissive micromirrors; wherein the micromirrors collectively reflect light beams from the LEA toward the person's eye to create virtual images in the person's field of view; wherein the orientation angle of a micromirror in the QFR is the LEA-facing angle of intersection between the micromirror and a virtual flat plane which best fits the QFR; wherein a first linear subset of micromirrors in the QFR has a first orientation angle and is a first distance from the LEA; wherein a second linear subset of micromirrors in the QFR has a second orientation angle and is a second distance from the LEA; wherein a third linear subset of micromirrors in the QFR have a third orientation angle and is a third distance from the LEA; wherein the second distance is greater than the first distance; wherein the third distance is greater than the second distance; wherein the second orientation angle is less than the first orientation angle, and wherein the third orientation angle is less than the second orientation angle.

In yet another example, Augmented Reality (AR) eyeglasses can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of linear subsets of partially-reflective, partially-transmissive micromirrors; wherein the micromirrors collectively reflect light beams from the LEA toward the person's eye to create virtual images in the person's field of view; wherein the orientation angle of a micromirror in the QFR is the LEA-facing angle of intersection between a virtual plane which best fits the micromirror and a virtual plane which best fits the QFR; wherein a first linear subset of micromirrors in the QFR has a first orientation angle and is a first distance from the LEA; wherein a second linear subset of micromirrors in the QFR has a second orientation angle and is a second distance from the LEA; wherein a third linear subset of micromirrors in the QFR has a third orientation angle and is a third distance from the LEA; wherein a fourth linear subset of micromirrors in the QFR has a fourth orientation angle and is a fourth distance from the LEA; wherein the second distance is greater than the first distance; wherein the third distance is greater than the second distance; wherein the fourth distance is greater than the third distance; wherein the second orientation angle is less than the first orientation angle; and wherein the fourth orientation angle is greater than the third orientation angle.

For example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of linear, parallel, partially-reflective, partially-transmissive surfaces (e.g. micromirrors or ridges); wherein the surfaces collectively reflect light beams from the LEA toward the person's eye; and wherein the surfaces which are farther from the LEA are tilted further toward the LEA than the surfaces which are closer to the LEA. In another example, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of linear, partially-reflective, partially-transmissive, flat surfaces (e.g. micromirrors or ridges); and wherein the surfaces collectively reflect light beams from the LEA toward the person's eye to create virtual images in the person's field of view.

In one embodiment, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of linear, partially-reflective, partially-transmissive ridges; wherein the ridges collectively reflect light beams from the LEA toward the person's eye; and wherein a first subset of ridges which are closer to the LEA are more concave than a second subset of ridges which are farther from the LEA. In another embodiment, Augmented Reality (AR) eyeglasses can comprise: a Light Emitter Array (LEA) which creates virtual images in a person's field of view; and a Quasi Fresnel Reflector (QFR) which is configured to be worn in front of the person's eye; wherein the QFR further comprises an array of linear, partially-reflective, partially-transmissive ridges; wherein the ridges collectively reflect light beams from the LEA toward the person's eye; wherein different ridges have different angles relative to the virtual plane which best fits the LEA; wherein the angles of a first subset of ridges which are closer to the LEA are less than the angles of a second subset of ridges which are farther from the LEA; and wherein ridges which closer to center of the QFR are closer together than ridges which are closer to the peripheral edges of the QFR.

For example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of linear, partially-reflective, partially-transmissive ridges; wherein the ridges collectively reflect light beams from the LEA toward the person's eye; wherein different ridges have different angles relative to the virtual plane which best fits the QFR and/or relative to the virtual plane which best fits the LEA; wherein the angles of a first subset of ridges which are closer to the LEA are less than the angles of a second subset of ridges which are farther from the LEA; and wherein ridges which closer to center of the QFR are closer together than ridges which are closer to the peripheral edges of the QFR. Alternatively, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of linear, partially-reflective, partially-transmissive ridges; wherein the ridges collectively reflect light beams from the LEA toward the person's eye; wherein different ridges have different angles relative to the virtual plane which best fits the QFR; wherein the angles of a first subset of ridges which are closer to the LEA are less than the angles of a second subset of ridges which are farther from the LEA; and wherein ridges which closer to center of the QFR are closer together than ridges which are closer to the peripheral edges of the QFR.

In one example, augmented reality eyewear can comprise: two Light Emitter Arrays (LEA) which are configured to be worn to the right of a person's eye and to the left of the person's eye, respectively; and a Quasi Fresnel Reflector (QFR) which is configured to be worn in front of the person's eye; wherein the QFR further comprises an array of linear, partially-reflective, partially-transmissive surfaces; wherein the surfaces collectively reflect light beams from the two LEAs toward the person's eye to create virtual images in the person's field of view; wherein the orientation angle of a surface is a LEA-facing angle of intersection between the surface and the virtual plane of the QFR; wherein a first subset of surfaces in the first quadrant across the (right-to-left) width of the QFR has a first orientation angle; wherein a second subset of surfaces in the second quadrant across the (right-to-left) width of the QFR has a second orientation angle; wherein a third subset of surfaces in the third quadrant across the (right-to-left) width of the QFR has a third orientation angle; wherein a fourth subset of surfaces in the fourth quadrant across the (right-to-left) width of the QFR has a fourth orientation angle; wherein the second orientation angle is less than the first orientation angle; and wherein the fourth orientation angle is greater than the third orientation angle.

In one embodiment, augmented reality eyewear can comprise: an annular Light Emitter Array (LEA) which creates virtual images in a person's field of view; and a Quasi Fresnel Reflector (QFR) which is configured to be worn in front of the person's eye; wherein the QFR further comprises an array of nested (e.g. concentric) partially-reflective, partially-transmissive rings; and wherein the rings collectively reflect light beams from the LEA toward the person's eye to create virtual images in the person's field of view. In another example, augmented reality eyewear can comprise: an annular Light Emitter Array (LEA) which creates virtual images in a person's field of view; and a Quasi Fresnel Reflector (QFR) which is configured to be worn in front of the person's eye; wherein the QFR further comprises an array of nested (e.g. concentric), circular, partially-reflective, partially-transmissive ridges; wherein the ridges collectively reflect light beams from the LEA toward the person's eye; and wherein ridges which are closer to the center of the QFR protrude farther out from the virtual plane of the QFR than ridges which are farther from the center (e.g. closer to the peripheral edges) of the QFR.

In an example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of nested (e.g. concentric) arcuate, partially-reflective, partially-transmissive ridges; wherein the ridges collectively reflect light beams from the LEA toward the person's eye; wherein different ridges have different angles relative to the virtual plane which best fits the LEA; and wherein the angles of a first subset of ridges which are closer to the LEA are less than the angles of a second subset of ridges which are farther from the LEA. Alternatively, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of nested (e.g. concentric) arcuate, partially-reflective, partially-transmissive ridges; wherein the ridges collectively reflect light beams from the LEA toward the person's eye; wherein different ridges have different angles relative to the virtual plane which best fits the QFR and/or relative to the virtual plane which best fits the LEA; and wherein the angles of a first subset of ridges which are closer to the LEA are less than the angles of a second subset of ridges which are farther from the LEA.

For example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of nested (e.g. concentric) arcuate, partially-reflective, partially-transmissive ridges; wherein the ridges collectively reflect light beams from the LEA toward the person's eye; wherein different ridges have different angles relative to the virtual plane which best fits the QFR; and wherein the angles of a first subset of ridges which are closer to the LEA are less than the angles of a second subset of ridges which are farther from the LEA. In another embodiment, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of nested (e.g. concentric) circular, partially-reflective, partially-transmissive ridges; wherein the ridges collectively reflect light beams from the LEA toward the person's eye; wherein different ridges have different angles relative to the virtual plane which best fits the LEA; and wherein the angles of a first subset of ridges which are closer to the LEA are less than the angles of a second subset of ridges which are farther from the LEA.

In one example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of nested (e.g. concentric) circular, partially-reflective, partially-transmissive ridges; wherein the ridges collectively reflect light beams from the LEA toward the person's eye; wherein different ridges have different angles relative to the virtual plane which best fits the QFR and/or relative to the virtual plane which best fits the LEA; and wherein the angles of a first subset of ridges which are closer to the LEA are less than the angles of a second subset of ridges which are farther from the LEA. In another example, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of nested (e.g. concentric) circular, partially-reflective, partially-transmissive ridges; wherein the ridges collectively reflect light beams from the LEA toward the person's eye; wherein different ridges have different angles relative to the virtual plane which best fits the QFR; wherein the angles of a first subset of ridges which are closer to the LEA are less than the angles of a second subset of ridges which are farther from the LEA; and wherein ridges which closer to center of the QFR are closer together than ridges which are closer to the peripheral edges of the QFR.

For example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of nested arcuate subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR; and wherein the angles of a first subset of micromirrors which are closer to the LEA are greater than the angles of a second subset of micromirrors which are farther from the LEA. In another embodiment, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of nested arcuate subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR; wherein the angles of a first subset of micromirrors which are closer to the LEA are greater than the angles of a second subset of micromirrors which are farther from the LEA; and wherein subsets of micromirrors which closer to center of the QFR are closer together than subsets of micromirrors which are closer to the periphery of the QFR.

In yet another example, augmented reality eyewear can comprise: an annular Light Emitter Array (LEA) which is configured to encircle a person's eye and emit light beams which create virtual images in the person's field of view; and a Quasi Fresnel Reflector (QFR) which is configured to be worn in front of the person's eye; wherein the QFR further comprises an array of nested circular subsets of partially-reflective, partially-transmissive micromirrors; wherein the micromirrors collectively reflect light beams from the LEA toward the person's eye in order to create virtual images in the person's field of view; and wherein subsets of micromirrors which are closer to the center of the QFR are closer to each other than subsets of micromirrors which are farther from the center of the QFR. Alternatively, Augmented Reality (AR) eyeglasses can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of nested circular subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the LEA; and wherein the angles of a first subset of micromirrors which are closer to the LEA are greater than the angles of a second subset of micromirrors which are farther from the LEA.

For example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of nested circular subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR and/or relative to the virtual plane which best fits the LEA; wherein the angles of a first subset of micromirrors which are closer to the LEA are less than the angles of a second subset of micromirrors which are farther from the LEA; and wherein subsets of micromirrors which closer to center of the QFR are closer together than subsets of micromirrors which are closer to the periphery of the QFR. In another embodiment, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of nested circular subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR; wherein the angles of a first subset of micromirrors which are closer to the LEA are greater than the angles of a second subset of micromirrors which are farther from the LEA; and wherein subsets of micromirrors which closer to center of the QFR are closer together than subsets of micromirrors which are closer to the periphery of the QFR.

In one embodiment, augmented reality eyewear can comprise: an annular Light Emitter Array (LEA) which creates virtual images in a person's field of view; and a Quasi Fresnel Reflector (QFR) which is configured to be worn in front of the person's eye; wherein the QFR further comprises an array of partially-reflective, partially-transmissive rings which reflect light beams from the LEA toward the person's eye to create virtual images in the person's field of view; and wherein a Conventional Fresnel Reflector (CFR) reflects collimated light rays from a distant light source into convergence on a central focal point, but this Quasi Fresnel Reflector (QFR) reflects light rays from a LEA encircling the QFR into convergence on a central focal point.

For example, Augmented Reality (AR) eyeglasses can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of partially-reflective and partially-transmissive micromirrors; wherein micromirrors in the QFR collectively reflect light beams from the LEA toward the person's eye to create virtual images in the person's field of view; wherein the orientation angle of a micromirror is the LEA-facing angle of intersection between the micromirror and the virtual flat plane which best fits the QFR; wherein a first subset of micromirrors in the QFR have a first orientation angle and is a first distance from the LEA; a second subset of micromirrors in the QFR have a second orientation angle and is a second distance from the LEA; and a third subset of micromirrors in the QFR have a third orientation angle and is a third distance from the LEA; wherein the second distance is greater than the first distance; wherein the third distance is greater than the second distance; wherein the second orientation angle is less than the first orientation angle, and wherein the third orientation angle is less than the second orientation angle.

In an example, this invention can be embodied in augmented reality eyewear comprising: a Light Emitter Array (LEA) which creates virtual images in a person's field of view; and a Quasi Fresnel Reflector (QFR) which is configured to be worn in front of the person's eye; wherein the QFR further comprises an array of partially-reflective, partially-transmissive flat micromirrors; wherein micromirrors in the QFR collectively reflect light beams from the LEA toward the person's eye; wherein the orientation angle of a micromirror is the LEA-facing angle of intersection between the micromirror and the virtual plane of the QFR; wherein a first subset of micromirrors in the QFR has a first orientation angle and is a first distance from the LEA; wherein a second subset of micromirrors in the QFR has a second orientation angle and is a second distance from the LEA; wherein a third subset of micromirrors in the QFR has a third orientation angle and is a third distance from the LEA; wherein the second distance is greater than the first distance; wherein the third distance is greater than the second distance; wherein the second orientation angle is less than the first orientation angle; and wherein the third orientation angle is less than the second orientation angle.

In one embodiment, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of partially-reflective, partially-transmissive micromirrors; wherein the LEA is located to the left of the QFR; wherein micromirrors in the QFR collectively reflect light beams from the LEA toward the person's eye to create virtual images in the person's field of view; wherein the orientation angle of a micromirror in the QFR is the LEA-facing angle of intersection between the micromirror and a virtual flat plane which best fits the QFR; wherein a first subset of micromirrors in the first quadrant across the (left-to-right) width of the QFR has a first orientation angle; wherein a second subset of micromirrors in the second quadrant across the (left-to-right) width of the QFR has a second orientation angle; wherein a third subset of micromirrors in the third quadrant across the (left-to-right) width of the QFR has a third orientation angle; wherein a fourth subset of micromirrors in the fourth quadrant across the (left-to-right) width of the QFR has a fourth orientation angle; wherein the second orientation angle is less than the first orientation angle; wherein the third orientation angle is less than the second orientation angle; and wherein the fourth orientation angle is less than the third orientation angle.

In an example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of partially-reflective, partially-transmissive, flat surfaces; wherein the LEA is located to the right or left of the QFR; wherein the surfaces collectively reflect light beams from the LEA toward the person's eye to create virtual images in the person's field of view; wherein the orientation angle of a surface is the LEA-facing angle of intersection between the surface and the virtual plane of the QFR; wherein a first subset of surfaces in the first quadrant across the (right-to-left or left-to-right) width of the QFR has a first orientation angle; wherein a second subset of surfaces in the second quadrant across the (right-to-left or left-to-right) width of the QFR has a second orientation angle; wherein a third subset of surfaces in the first quadrant across the (right-to-left or left-to-right) width of the QFR has a third orientation angle; wherein a fourth subset of surfaces in the second quadrant across the (right-to-left or left-to-right) width of the QFR has a fourth orientation angle; wherein the second orientation angle is less than the first orientation angle; wherein the third orientation angle is less than the second orientation angle; wherein the fourth orientation angle is less than the third orientation angle.

For example, augmented reality eyewear can comprise: an annular Light Emitter Array (LEA) which is configured to encircle a person's eye and emit light beams which create virtual images in the person's field of view; and a Quasi Fresnel Reflector (QFR) which is configured to be worn in front of the person's eye; wherein the QFR further comprises an array of partially-reflective, partially-transmissive micromirrors; wherein the micromirrors collectively reflect light beams from the LEA toward the person's eye in order to create virtual images in the person's field of view; and wherein the combined surfaces of the micromirrors which face the LEA collectively comprise sections of an ellipsoid. In another example, augmented reality eyewear can comprise: two Light Emitter Arrays (LEA) which are configured to be worn to the right and to the left, respectively, of a person's eye and to emit light beams which create virtual images in the person's field of view; and a Quasi Fresnel Reflector (QFR) which is configured to be worn on the person's head in front of the person's eye; wherein the QFR further comprises an array of partially-reflective, partially-transmissive micromirrors; wherein the micromirrors collectively reflect light beams from the two LEAs toward the person's eye to create virtual images in the person's field of view; wherein a first subset of micromirrors is in the first quadrant across the (right-to-left or left-to-right) width of the QFR; wherein a second subset of micromirrors is in the second quadrant across the (right-to-left or left-to-right) width of the QFR; wherein a third subset of micromirrors is in third first quadrant across the (right-to-left or left-to-right) width of the QFR; wherein a fourth subset of micromirrors is in the fourth quadrant across the (right-to-left or left-to-right) width of the QFR; wherein the orientation of micromirrors in the second subset is rotated clockwise relative to the orientation of micromirrors in the first subset; and wherein the orientation of micromirrors in the fourth subset is rotated counter-clockwise relative to the orientation of micromirrors in the third subset.

In one embodiment, Augmented Reality (AR) eyeglasses can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of partially-reflective, partially-transmissive micromirrors; wherein the micromirrors collectively reflect light beams from the LEA so that the light beams converge on or within the person's eye; wherein the orientation angle of a micromirror in the QFR is the LEA-facing angle of intersection between the micromirror and a virtual flat plane which best fits the QFR; wherein a first subset of micromirrors in the QFR has a first orientation angle and is a first distance from the LEA; wherein a second subset of micromirrors in the QFR has a second orientation angle and is a second distance from the LEA; wherein a third subset of micromirrors in the QFR has a third orientation angle and is a third distance from the LEA; wherein the second distance is greater than the first distance; wherein the third distance is greater than the second distance; wherein the second orientation angle is less than the first orientation angle, and wherein the third orientation angle is less than the second orientation angle.

For example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of partially-reflective, partially-transmissive micromirrors; wherein the micromirrors collectively reflect light beams from the LEA toward the person's eye to create virtual images in the person's field of view; wherein the orientation angle of a micromirror in the QFR is the LEA-facing angle of intersection between the micromirror and a virtual flat plane which best fits the QFR; wherein a first subset of micromirrors in the QFR has a first orientation angle and is a first distance from the LEA; wherein a second subset of micromirrors in the QFR has a second orientation angle and is a second distance from the LEA; wherein a third subset of micromirrors in the QFR have a third orientation angle and is a third distance from the LEA; wherein the second distance is greater than the first distance; wherein the third distance is greater than the second distance; wherein the second orientation angle is less than the first orientation angle; wherein the third orientation angle is less than the second orientation angle, and wherein there are surfaces of the QFR between the three subsets of micromirrors which are substantially parallel to radial lines of light extending outward from the person's eye.

In one example, Augmented Reality (AR) eyewear can comprise: a Light Emitter Array (LEA) which is configured to be worn on a person's head and emit light beams which create virtual images in the person's field of view; and a substantially flat Quasi Fresnel Reflector (QFR) which is configured to be worn in front of the person's eye; wherein the QFR further comprises an array of partially-reflective, partially-transmissive micromirrors; wherein the micromirrors collectively reflect light beams from the LEA toward the person's eye to create virtual images in the person's field of view; wherein the orientation angle of a micromirror in the QFR is the LEA-facing angle of intersection between the micromirror and a virtual flat plane which best fits the QFR; wherein a first subset of micromirrors in the QFR has a first orientation angle and is a first distance from the LEA; wherein a second subset of micromirrors in the QFR has a second orientation angle and is a second distance from the LEA; wherein a third subset of micromirrors in the QFR have a third orientation angle and is a third distance from the LEA; wherein the second distance is greater than the first distance; wherein the third distance is greater than the second distance; wherein the second orientation angle is less than the first orientation angle, and wherein the third orientation angle is less than the second orientation angle.

For example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of partially-reflective, partially-transmissive surfaces; wherein the surfaces collectively reflect light beams from the LEA toward the person's eye to create virtual images in the person's field of view; wherein a first subset of surfaces in the QFR is a first distance from the LEA; wherein a second subset of surfaces in the QFR is a second distance from the LEA; wherein a third subset of surfaces in the QFR is a third distance from the LEA; wherein the second distance is greater than the first distance; wherein the third distance is greater than the second distance; wherein the orientation of the second subset of surfaces is rotated in a first (e.g. clockwise) direction relative to the orientation of the first subset of surfaces, and wherein the orientation of the third subset of surfaces is rotated in a second (e.g. counter clockwise) direction relative to the orientation of the second subset of surfaces.

In one embodiment, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of partially-reflective, partially-transmissive, flat surfaces; wherein the surfaces collectively reflect light beams from the LEA toward the person's eye to create virtual images in the person's field of view; wherein the orientation angle of a surface is the LEA-facing angle of intersection between the surface and the virtual plane of the QFR; wherein a first subset of surfaces in the QFR has a first orientation angle and is a first distance from the LEA; wherein a second subset of surfaces in the QFR has a second orientation angle and is a second distance from the LEA; wherein a third subset of surfaces in the QFR has a third orientation angle and is a third distance from the LEA; wherein the second distance is greater than the first distance; wherein the third distance is greater than the second distance; wherein the second orientation angle is less than the first orientation angle; and wherein the third orientation angle is less than the second orientation angle.

For example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of partially-reflective, partially-transmissive, flat surfaces; wherein the surfaces collectively reflect light beams from the LEA toward the person's eye to create virtual images in the person's field of view; wherein the orientation angle of a surface is the LEA-facing angle of intersection between the surface and the virtual plane of the QFR; wherein a first subset of surfaces in the QFR has a first orientation angle and is a first distance from the LEA; wherein a second subset of surfaces in the QFR has a second orientation angle and is a second distance from the LEA; wherein a third subset of surfaces in the QFR has a third orientation angle and is a third distance from the LEA; wherein the second distance is greater than the first distance; wherein the third distance is greater than the second distance; wherein the second orientation angle is less than the first orientation angle; wherein the third orientation angle is less than the second orientation angle; and wherein there are surfaces of the QFR between the three subsets of surfaces which are substantially parallel to each other.

In an example, augmented reality eyewear can comprise: two Light Emitter Arrays (LEA) which are configured to be worn to the right of a person's eye and to the left of the person's eye, respectively; and a Quasi Fresnel Reflector (QFR) which is configured to be worn in front of the person's eye; wherein the QFR further comprises an array of partially-reflective, partially-transmissive surfaces; wherein the surfaces collectively reflect light beams from the two LEAs toward the person's eye to create virtual images in the person's field of view; wherein the orientation angle of a surface is a LEA-facing angle of intersection between the surface and the virtual plane of the QFR; wherein a first subset of surfaces in the first quadrant across the (right-to-left) width of the QFR has a first orientation angle; wherein a second subset of surfaces in the second quadrant across the (right-to-left) width of the QFR has a second orientation angle; wherein a third subset of surfaces in the third quadrant across the (right-to-left) width of the QFR has a third orientation angle; wherein a fourth subset of surfaces in the fourth quadrant across the (right-to-left) width of the QFR has a fourth orientation angle; wherein the second orientation angle is less than the first orientation angle; and wherein the fourth orientation angle is greater than the third orientation angle.

For example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of rings of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR and/or relative to the virtual plane which best fits the LEA; and wherein rings of micromirrors which closer to center of the QFR are closer together than rings of micromirrors which are closer to the periphery of the QFR. Alternatively, Augmented Reality (AR) eyewear can comprise: an annular Light Emitter Array (LEA) which is configured to encircle a person's eye and emit light beams which create virtual images in the person's field of view; and a Quasi Fresnel Reflector (QFR) which is configured to be worn in front of the person's eye; wherein the QFR further comprises partially-reflective, partially-transmissive ridges; wherein the ridges collectively reflect light beams from the LEA toward the person's eye in order to create virtual images in the person's field of view; and wherein the combined surfaces of the ridges which face toward LEA collectively comprise sections of a rotated parabola (e.g. paraboloid).

In one example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR is an off-axis Fresnel reflector; wherein the QFR further comprises an array of linear subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR and/or relative to the virtual plane which best fits the LEA; wherein the angles of linear subsets of micromirrors which are closer to the LEA are greater than the angles of linear subsets of micromirrors which are farther from the LEA; and wherein linear subsets of micromirrors which closer to center of the QFR are closer together than linear subsets of micromirrors which are closer to the periphery of the QFR.

In another example, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR is partially-reflective and partially-transmissive; wherein a cross-section of the QFR has a saw-tooth (e.g. zigzag) shape with teeth whose shapes vary across the width of the QFR; and wherein the QFR reflects light beams from the LEA toward the person's eye to create virtual images in the person's field of view.

In yet another example, augmented reality eyewear can comprise: a Light Emitter Array (LEA) which creates virtual images in a person's field of view; and a Quasi Fresnel Reflector (QFR) which is configured to be worn in front of the person's eye; wherein the QFR is partially-reflective and partially-transmissive; wherein a cross-section of the QFR has a sinusoidal shape with waves whose amplitudes increase across the width of the QFR; and wherein the QFR reflects light beams from the LEA toward the person's eye to create virtual images in the person's field of view. In another embodiment, Augmented Reality (AR) eyeglasses can comprise: a Quasi Fresnel Reflector (QFR) which is configured to be worn in front of a person's eye; wherein the QFR further comprises an array of horizontal, linear, partially-reflective, partially-transmissive surfaces (e.g. microridges or micromirrors); a first Light Emitter Array (LEA) which is substantially above the QFR; and a second Light Emitter Array (LEA) which is substantially below the QFR; wherein the surfaces in the QFR collectively reflect light beams from the first LEA and the second LEA toward the person's eye to create virtual images in the person's field of view; wherein the orientation angle of a surface is an upward-facing angle of intersection between the surface and the virtual plane of the QFR; wherein a first subset of surfaces is first distance from the upper side of the QFR and has a first orientation angle; wherein a second subset of surfaces is a second distance from the upper side of the QFR and has a second orientation angle; wherein a third subset of surfaces is a third distance from the upper side of the QFR and has a third orientation angle; wherein a fourth subset of surface is a fourth distance from the upper side of the QFR and has a fourth orientation angle; wherein the second distance is greater than the first distance, the third distance is greater than the second distance, and the fourth distance is greater than the third distance; wherein the second orientation angle is less than the first orientation angle; and wherein the third orientation angle is greater than the fourth orientation angle.

In one embodiment, augmented reality eyewear can comprise: a Quasi Fresnel Reflector (QFR) which is configured to be worn in front of a person's eye; wherein the QFR further comprises an array of vertical, linear, partially-reflective, partially-transmissive surfaces (e.g. microridges or micromirrors); a first Light Emitter Array (LEA) which is substantially to the right of the QFR; and a second Light Emitter Array (LEA) which is substantially to the left of the QFR; wherein the surfaces in the QFR collectively reflect light beams from the first LEA and the second LEA toward the person's eye to create virtual images in the person's field of view; wherein the orientation angle of a surface is a right-facing angle of intersection between the surface and the virtual plane of the QFR; wherein a first subset of surfaces is first distance from the right side of the QFR and has a first orientation angle; wherein a second subset of surfaces is a second distance from the right side of the QFR and has a second orientation angle; wherein a third subset of surfaces is a third distance from the right side of the QFR and has a third orientation angle; wherein a fourth subset of surface is a fourth distance from the right side of the QFR and has a fourth orientation angle; wherein the second distance is greater than the first distance, the third distance is greater than the second distance, and the fourth distance is greater than the third distance; wherein the second orientation angle is less than the first orientation angle; and wherein the third orientation angle is greater than the fourth orientation angle.

For example, Augmented Reality (AR) eyewear can comprise: an annular Light Emitter Array (LEA) which creates virtual images in a person's field of view; and a Quasi Fresnel Reflector (QFR) which is configured to be worn in front of the person's eye; wherein the LEA encircles the QFR; wherein the QFR further comprises an array of arcuate, partially-reflective, partially-transmissive, flat surfaces (e.g. micromirrors or ridges); and wherein the surfaces collectively reflect light beams from the LEA toward the person's eye to create virtual images in the person's field of view. Alternatively, augmented reality eyewear can comprise: an annular Light Emitter Array (LEA) which creates virtual images in a person's field of view; and a Quasi Fresnel Reflector (QFR) which is configured to be worn in front of the person's eye; wherein the LEA encircles the QFR; wherein the QFR further comprises an array of nested (e.g. concentric), partially-reflective, partially-transmissive rings; wherein the rings collectively reflect light beams from the LEA toward the person's eye; and wherein rings which are closer to the center of the QFR extend farther out from the virtual plane of the QFR than rings which are farther from the center (e.g. closer to the peripheral edges) of the QFR.

In one example, augmented reality eyewear can comprise: an annular Light Emitter Array (LEA) which creates virtual images in a person's field of view; and a Quasi Fresnel Reflector (QFR) which is configured to be worn in front of the person's eye; wherein the LEA encircles the QFR; wherein the QFR further comprises an array of partially-reflective, partially-transmissive, flat surfaces (e.g. micromirrors or microridges); wherein the surfaces collectively reflect light beams from the LEA toward the person's eye; and wherein reflective surfaces which are closer to the center of the QFR extend farther out from the virtual plane of the QFR than reflective surfaces which are farther from the center (e.g. closer to the peripheral edges) of the QFR. In another embodiment, augmented reality eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of arcuate, partially-reflective, partially-transmissive ridges; wherein the ridges collectively reflect light beams from the LEA toward the person's eye; and wherein a first subset of ridges which are closer to the first side of the QFR are more concave than a second subset of ridges which are farther from the first side of the QFR.

For example, Augmented Reality (AR) eyeglasses can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of arcuate, partially-reflective, partially-transmissive ridges; wherein the ridges collectively reflect light beams from the LEA toward the person's eye; and wherein a first subset of ridges which are closer to the first side of the QFR are closer to each other than a second subset of ridges which are farther from the first side of the QFR. In another example, augmented reality eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of linear, partially-reflective, partially-transmissive ridges; wherein the ridges collectively reflect light beams from the LEA toward the person's eye; wherein different ridges have different angles relative to the virtual plane which best fits the QFR and/or relative to the virtual plane which best fits the LEA; wherein the angles of a first subset of ridges which are closer to the first side of the QFR are less than the angles of a second subset of ridges which are farther from the first side of the QFR; and wherein ridges which closer to center of the QFR are closer together than ridges which are closer to the peripheral edges of the QFR.

In one embodiment, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of linear, partially-reflective, partially-transmissive ridges; wherein the ridges collectively reflect light beams from the LEA toward the person's eye; wherein different ridges have different angles relative to the virtual plane which best fits the LEA; wherein the angles of a first subset of ridges which are closer to the first side of the QFR are greater than the angles of a second subset of ridges which are farther from the first side of the QFR; and wherein ridges which closer to center of the QFR are closer together than ridges which are closer to the peripheral edges of the QFR. In another embodiment, augmented reality eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of linear, partially-reflective, partially-transmissive ridges; wherein the ridges collectively reflect light beams from the LEA toward the person's eye; wherein different ridges have different angles relative to the virtual plane which best fits the QFR; and wherein the angles of a first subset of ridges which are closer to the first side of the QFR are greater than the angles of a second subset of ridges which are farther from the first side of the QFR.

For example, Augmented Reality (AR) eyeglasses can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of nested (e.g. concentric) arcuate, partially-reflective, partially-transmissive ridges; wherein the ridges collectively reflect light beams from the LEA toward the person's eye; wherein different ridges have different angles relative to the virtual plane which best fits the LEA; wherein the angles of a first subset of ridges which are closer to the first side of the QFR are less than the angles of a second subset of ridges which are farther from the first side of the QFR; and wherein ridges which closer to center of the QFR are closer together than ridges which are closer to the peripheral edges of the QFR. Alternatively, augmented reality eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of nested (e.g. concentric) arcuate, partially-reflective, partially-transmissive ridges; wherein the ridges collectively reflect light beams from the LEA toward the person's eye; wherein different ridges have different angles relative to the virtual plane which best fits the QFR; and wherein the angles of a first subset of ridges which are closer to the first side of the QFR are less than the angles of a second subset of ridges which are farther from the first side of the QFR.

In an example, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of nested (e.g. concentric) arcuate, partially-reflective, partially-transmissive ridges; wherein the ridges collectively reflect light beams from the LEA toward the person's eye; wherein different ridges have different angles relative to the virtual plane which best fits the QFR and/or relative to the virtual plane which best fits the LEA; and wherein the angles of a first subset of ridges which are closer to the first side of the QFR are greater than the angles of a second subset of ridges which are farther from the first side of the QFR. In another embodiment, augmented reality eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of nested (e.g. concentric) circular, partially-reflective, partially-transmissive ridges; wherein the ridges collectively reflect light beams from the LEA toward the person's eye; wherein different ridges have different angles relative to the virtual plane which best fits the LEA; and wherein the angles of a first subset of ridges which are closer to the first side of the QFR are less than the angles of a second subset of ridges which are farther from the first side of the QFR.

For example, augmented reality eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of nested (e.g. concentric) circular, partially-reflective, partially-transmissive ridges; wherein the ridges collectively reflect light beams from the LEA toward the person's eye; wherein different ridges have different angles relative to the virtual plane which best fits the QFR; and wherein the angles of a first subset of ridges which are closer to the first side of the QFR are less than the angles of a second subset of ridges which are farther from the first side of the QFR. In another example, augmented reality eyewear can comprise: a Light Emitter Array (LEA) which creates virtual images in a person's field of view; and a Quasi Fresnel Reflector (QFR) which is configured to be worn in front of the person's eye; wherein the LEA is located on a first (e.g. right, left, top, or bottom) side of the QFR; wherein the QFR further comprises an array of nested (e.g. concentric) circular, partially-reflective, partially-transmissive ridges; wherein the ridges collectively reflect light beams from the LEA toward the person's eye; wherein different ridges have different angles relative to the virtual plane which best fits the QFR and/or relative to the virtual plane which best fits the LEA; and wherein the angles of a first subset of ridges which are closer to the first side of the QFR are greater than the angles of a second subset of ridges which are farther from the first side of the QFR.

In one embodiment, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of arcuate subsets of partially-reflective, partially-transmissive micromirrors; wherein the micromirrors collectively reflect light beams from the LEA toward the person's eye in order to create virtual images in the person's field of view; and wherein arcuate subsets of micromirrors which are closer to the first side of the QFR are less convex than arcuate subsets of micromirrors which are farther from the first side of the QFR. In another example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of linear subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the LEA; wherein the angles of a first linear subset of micromirrors which are closer to the first side of the QFR are greater than the angles of a second linear subset of micromirrors which are farther from the first side of the QFR; and wherein linear subsets of micromirrors which closer to center of the QFR are closer together than linear subsets of micromirrors which are closer to the periphery of the QFR.

In yet another example, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of linear subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR and/or relative to the virtual plane which best fits the LEA; wherein the angles of a first linear subset of micromirrors which are closer to the first side of the QFR are greater than the angles of a second linear subset of micromirrors which are farther from the first side of the QFR; and wherein linear subsets of micromirrors which closer to center of the QFR are closer together than linear subsets of micromirrors which are farther from the center (e.g. closer to the peripheral edges) of the QFR.

In one embodiment, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of linear subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR; wherein the angles of a first subset of micromirrors which are closer to the first side of the QFR are greater than the angles of a second subset of micromirrors which are farther from the first side of the QFR; and wherein subsets of micromirrors which closer to center of the QFR are closer together than subsets of micromirrors which are closer to the periphery of the QFR. In another example, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of nested arcuate subsets of partially-reflective, partially-transmissive micromirrors; wherein the micromirrors collectively reflect light beams from the LEA toward the person's eye in order to create virtual images in the person's field of view; and wherein arcuate subsets of micromirrors which closer to center of the QFR are closer together than arcuate subsets of micromirrors which are closer to the periphery of the QFR.

For example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of nested arcuate subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the LEA; and wherein the angles of a first subset of micromirrors which are closer to the first side of the QFR are less than the angles of a second subset of micromirrors which are farther from the first side of the QFR. In another embodiment, Augmented Reality (AR) eyeglasses can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of nested arcuate subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR and/or relative to the virtual plane which best fits the LEA; and wherein the angles of a first subset of micromirrors which are closer to the first side of the QFR are less than the angles of a second subset of micromirrors which are farther from the first side of the QFR.

In an example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of nested arcuate subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR; and wherein the angles of a first arcuate subset of micromirrors which are closer to the first side of the QFR are less than the angles of a second arcuate subset of micromirrors which are farther from the first side of the QFR. Alternatively, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of nested circular subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the LEA; wherein the angles of a first subset of micromirrors which are closer to the first side of the QFR are less than the angles of a second subset of micromirrors which are farther from the first side of the QFR; and wherein subsets of micromirrors which closer to center of the QFR are closer together than subsets of micromirrors which are closer to the periphery of the QFR.

For example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of nested circular subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR and/or relative to the virtual plane which best fits the LEA; and wherein the angles of a first subset of micromirrors which are closer to the first side of the QFR are greater than the angles of a second subset of micromirrors which are farther from the first side of the QFR.

In one example, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located on a first side of the QFR; wherein the QFR further comprises an array of nested circular subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR; wherein the angles of a first subset of micromirrors which are closer to the first side of the QFR are less than the angles of a second subset of micromirrors which are farther from the first side of the QFR; and wherein subsets of micromirrors which closer to center of the QFR are closer together than subsets of micromirrors which are closer to the periphery of the QFR.

For example, augmented reality eyewear can comprise: a Light Emitter Array (LEA) which creates virtual images in a person's field of view; and a Quasi Fresnel Reflector (QFR) which is configured to be worn in front of the person's eye; wherein the LEA is located to one side (e.g. right, left, top, or bottom) of the QFR; wherein the QFR further comprises an array of linear partially-reflective, partially-transmissive surfaces; wherein the surfaces collectively reflect light beams from the LEA toward the person's eye to create virtual images in the person's field of view; wherein the orientation angle of a surface is the LEA-facing angle of intersection between the surface and a virtual plane which best fits the QFR; wherein a first subset of surfaces in the QFR has a first orientation angle and is a first distance from the LEA; wherein a second subset of surfaces in the QFR has a second orientation angle and is a second distance from the LEA; wherein a third subset of surfaces in the QFR has a third orientation angle and is a third distance from the LEA; wherein a fourth subset of surfaces in the QFR has a fourth orientation angle and is a fourth distance from the LEA; wherein the second distance is greater than the first distance; wherein the third distance is greater than the second distance; wherein the fourth distance is greater than the third distance; and wherein the fourth distance minus the third distance is greater than the second distance minus the first distance.

In an example, Augmented Reality (AR) eyeglasses can comprise: a Light Emitter Array (LEA) which creates virtual images in a person's field of view; and a Quasi Fresnel Reflector (QFR) which is configured to be worn in front of the person's eye; wherein the LEA is located to one side (e.g. right, left, top, or bottom) of the QFR; wherein the QFR further comprises an array of linear partially-reflective, partially-transmissive surfaces; wherein the surfaces collectively reflect light beams from the LEA toward the person's eye to create virtual images in the person's field of view; and wherein surfaces which are farther from the LEA extend farther out from the main plane of the QFR than surfaces which are closer to the LEA. In another embodiment, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the LEA is located to one side (e.g. right, left, top, or bottom) of the QFR; wherein the QFR further comprises an array of partially-reflective, partially-transmissive flat micromirrors; wherein the micromirrors collectively reflect light beams from the LEA toward the person's eye to create virtual images in the person's field of view; and wherein micromirrors which are closer to the center of the QFR extend out from the main plane of the QFR more than micromirrors which are farther from the center of the QFR.

For example, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the LEA is located to one side (e.g. right, left, top, or bottom) of the QFR; wherein the QFR further comprises an array of partially-reflective, partially-transmissive, flat surfaces; wherein the surfaces collectively reflect light beams from the LEA toward the person's eye to create virtual images in the person's field of view; wherein the orientation angle of a surface is the LEA-facing angle of intersection between the surface and a virtual plane which best fits the QFR; wherein a first subset of surfaces in the QFR has a first orientation angle and is a first distance from the LEA; wherein a second subset of surfaces in the QFR has a second orientation angle and is a second distance from the LEA; wherein a third subset of surfaces in the QFR has a third orientation angle and is a third distance from the LEA; wherein a fourth subset of surfaces in the QFR has a fourth orientation angle and is a fourth distance from the LEA; wherein the second distance is greater than the first distance; wherein the third distance is greater than the second distance; wherein the fourth distance is greater than the third distance; wherein the second orientation angle is less than the first orientation angle; wherein the third orientation angle is less than the second orientation angle; and wherein the fourth orientation angle is less than the third orientation angle. In another example, this invention can be embodied in augmented reality eyewear comprising: a Light Emitter Array (LEA) which creates virtual images in a person's field of view; and a Quasi Fresnel Reflector (QFR) which is configured to be worn in front of the person's eye; wherein the LEA is located to one side (e.g. right, left, top, or bottom) of the QFR; wherein the QFR further comprises an array of partially-reflective, partially-transmissive, flat surfaces; wherein the surfaces collectively reflect light beams from the LEA toward the person's eye to create virtual images in the person's field of view; and wherein surfaces which are closer to the center of the QFR extend farther out from the main plane of the QFR than surfaces which are farther from the center (e.g. closer to the peripheral edges) of the QFR.

In one embodiment, Augmented Reality (AR) eyeglasses can comprise: a Light Emitter Array (LEA) which is configured to be worn on a person's head and emit light beams which create virtual images in the person's field of view; and a Quasi Fresnel Reflector (QFR) which is configured to be worn in front of the person's eye wherein the QFR further comprises an array of partially-reflective, partially-transmissive flat micromirrors; wherein the micromirrors collectively reflect light beams from the LEA toward the person's eye to create virtual images in the person's field of view; wherein the orientation angle of a micromirror in the QFR is the LEA-facing angle of intersection between a virtual plane which best fits the micromirror and a virtual plane which best fits the QFR; wherein a first subset of micromirrors in the QFR has a first orientation angle and is a first distance from the LEA; wherein a second subset of micromirrors in the QFR has a second orientation angle and is a second distance from the LEA; wherein a third subset of micromirrors in the QFR has a third orientation angle and is a third distance from the LEA; wherein a fourth subset of micromirrors in the QFR has a fourth orientation angle and is a fourth distance from the LEA; wherein the second distance is greater than the first distance; wherein the third distance is greater than the second distance; wherein the fourth distance is greater than the third distance; wherein the second orientation angle is greater than the first orientation angle; wherein the third orientation angle is greater than the second orientation angle; and wherein the fourth orientation angle is greater than the third orientation angle.

For example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises a nested (e.g. concentric) array of partially-reflective, partially-transmissive rings; wherein rings in the QFR collectively reflect light beams from the LEA toward the person's eye; wherein the orientation angle of a ring is the LEA-facing angle of intersection between the ring and the virtual plane of the QFR; wherein a first subset of rings in the QFR has a first orientation angle and is a first distance from the LEA; wherein a second subset of rings in the QFR has a second orientation angle and is a second distance from the LEA; wherein a third subset of rings in the QFR has a third orientation angle and is a third distance from the LEA; wherein the second distance is greater than the first distance; wherein the third distance is greater than the second distance; wherein the second orientation angle is less than the first orientation angle; and wherein the third orientation angle is greater than the second orientation angle. In another embodiment, augmented reality eyewear can comprise: an annular Light Emitter Array (LEA) which creates virtual images in a person's field of view; and a Quasi Fresnel Reflector (QFR) which is configured to be worn in front of the person's eye; wherein the QFR further comprises a ring-and-spoke array of partially-reflective, partially-transmissive surfaces (e.g. micromirrors or ridges); wherein surfaces which are closer to the center of the QFR are closer together than surfaces which are father from the center (e.g. closer to the peripheral edges) of the SFR; and wherein the surfaces collectively reflect light beams from the LEA toward the person's eye to create virtual images in the person's field of view.

In one example, augmented reality eyewear can comprise: an annular Light Emitter Array (LEA) which creates virtual images in a person's field of view; and a Quasi Fresnel Reflector (QFR) which is configured to be worn in front of the person's eye; wherein the QFR further comprises a ring-and-spoke array of partially-reflective, partially-transmissive surfaces (e.g. micromirrors or ridges); wherein the surfaces collectively reflect light beams from the LEA toward the person's eye to create virtual images in the person's field of view; and wherein surfaces which are closer to the center of the QFR are smaller than surfaces which are father from the center (e.g. closer to the peripheral edges) of the QFR. Alternatively, Augmented Reality (AR) eyewear can comprise: an annular Light Emitter Array (LEA) which creates virtual images in a person's field of view; and a Quasi Fresnel Reflector (QFR) which is configured to be worn in front of the person's eye; wherein the QFR further comprises a ring-and-spoke array of partially-reflective, partially-transmissive, flat surfaces (e.g. micromirrors or ridges); wherein there is intra-spoke variation in surface angle with respect to the virtual plane of the QFR; wherein surfaces in a spoke which are closer to the center of the QFR has a different angle than surfaces in the spoke which are closer to the peripheral edges of the QFR; and wherein the surfaces collectively reflect light beams from the LEA toward the person's eye to create virtual images in the person's field of view.

In one embodiment, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of arcuate (e.g. conic-section-shaped) subsets of partially-reflective, partially-transmissive surfaces (e.g. micromirrors or ridges); wherein the surfaces collectively reflect light beams from the LEA toward the person's eye; and wherein arcuate subsets of surfaces which are closer to the center of the QFR are closer to each other than arcuate subsets of surfaces which are farther from the center (e.g. closer to the peripheral edges) of the QFR. In another embodiment, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of arcuate (e.g. semicircular) subsets of partially-reflective, partially-transmissive surfaces (e.g. micromirrors or ridges); wherein the surfaces collectively reflect light beams from the LEA toward the person's eye; and wherein arcuate subsets of surfaces which are closer to the center of the QFR are closer to each other than arcuate subsets of surfaces which are farther from the center (e.g. closer to the peripheral edges) of the QFR.

In an example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of arcuate subsets of partially-reflective, partially-transmissive micromirrors; wherein the micromirrors collectively reflect light beams from the LEA toward the person's eye in order to create virtual images in the person's field of view; and wherein subsets of micromirrors which are closer to the LEA are closer to each other than subsets of micromirrors which are farther from the LEA. In another example, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of arcuate subsets of partially-reflective, partially-transmissive micromirrors; wherein the micromirrors collectively reflect light beams from the LEA toward the person's eye in order to create virtual images in the person's field of view; and wherein subsets of micromirrors which are closer to the LEA are more concave than subsets of micromirrors which are farther from the LEA.

For example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of arcuate, partially-reflective, partially-transmissive ridges; wherein the ridges collectively reflect light beams from the LEA toward the person's eye; and wherein a first subset of ridges which are closer to the LEA are more concave than a second subset of ridges which are farther from the LEA. Alternatively, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of at least 50 linear, parallel, partially-reflective, partially-transmissive surfaces (e.g. micromirrors or ridges); wherein the surfaces collectively reflect light beams from the LEA toward the person's eye; and wherein surfaces which are closer to the center of the QFR are closer together than surfaces which are farther from the center (e.g. closer to the peripheral edges) of the QFR.

In one embodiment, augmented reality eyewear can comprise: an annular Light Emitter Array (LEA) which is configured to encircle a person's eye and emit light beams which create virtual images in the person's field of view; and a Quasi Fresnel Reflector (QFR) which is configured to be worn in front of the person's eye; wherein the QFR further comprises an array of circular subsets of partially-reflective, partially-transmissive micromirrors; wherein the micromirrors collectively reflect light beams from the LEA toward the person's eye in order to create virtual images in the person's field of view; and wherein subsets of micromirrors which are closer to the center of the QFR intersect the plane of the QFR at different angles than subsets of micromirrors which are farther from the center of the QFR.

For example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of concentric rings of partially-reflective and partially-transmissive micromirrors; wherein micromirrors in the QFR collectively reflect light beams from the LEA toward the person's eye to create virtual images in the person's field of view; wherein the orientation angle of a micromirror is the LEA-facing angle of intersection between the micromirror and the virtual flat plane which best fits the QFR; wherein a first subset of micromirrors in the QFR has a first orientation angle and a first distance from the LEA; a second subset of micromirrors in the QFR has a second orientation angle and a second distance from the LEA; and a third subset of micromirrors in the QFR has a third orientation angle and a third distance from the LEA; wherein the second distance is greater than the first distance; wherein the third distance is greater than the second distance; wherein the second orientation angle is less than the first orientation angle, and wherein the third orientation angle is less than the second orientation angle.

In one example, augmented reality eyewear can comprise: a Light Emitter Array (LEA) which is configured to be worn above or below a person's eye and emit light beams which create virtual images in the person's field of view; and a Quasi Fresnel Reflector (QFR) which is configured to be worn in front of the person's eye; wherein the QFR further comprises an array of horizontally-linear subsets of partially-reflective, partially-transmissive micromirrors; wherein the micromirrors collectively reflect light beams from the LEA toward the person's eye to create virtual images in the person's field of view; wherein the orientation angle of a micromirror in the QFR is the LEA-facing angle of intersection between the micromirror and a virtual flat plane which best fits the QFR; wherein a first linear subset of micromirrors in the QFR has a first orientation angle and is a first distance from the LEA; wherein a second linear subset of micromirrors in the QFR has a second orientation angle and is a second distance from the LEA; wherein a third linear subset of micromirrors in the QFR have a third orientation angle and is a third distance from the LEA; wherein the second distance is greater than the first distance; wherein the third distance is greater than the second distance; wherein the second orientation angle is less than the first orientation angle, and wherein the third orientation angle is less than the second orientation angle.

For example, Augmented Reality (AR) eyeglasses can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of linear subsets of partially-reflective, partially-transmissive micromirrors; wherein the micromirrors collectively reflect light beams from the LEA toward the person's eye in order to create virtual images in the person's field of view; wherein different linear subsets of micromirrors have different LEA-facing angles relative to the virtual plane which best fits the LEA; and wherein the angles of a linear subsets of micromirrors which are closer to the LEA are less than the angles of linear subsets of micromirrors which are farther from the LEA. In another example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of linear subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR; and wherein the angles of a first subset of micromirrors which are closer to the LEA are less than the angles of a second subset of micromirrors which are farther from the LEA.

In yet another example, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of linear subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR and/or relative to the virtual plane which best fits the LEA; wherein the angles of a first linear subset of micromirrors which are closer to the LEA are greater than the angles of a second linear subset of micromirrors which are farther from the LEA; and wherein linear subsets of micromirrors which closer to center of the QFR are closer together than linear subsets of micromirrors which are closer to the periphery of the QFR.

For example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of linear subsets of partially-reflective, partially-transmissive micromirrors; wherein the micromirrors collectively reflect light beams from the LEA toward the person's eye to create virtual images in the person's field of view; wherein the orientation angle of a micromirror in the QFR is the LEA-facing angle of intersection between the micromirror and a virtual plane which best fits the QFR; wherein a first linear subset of micromirrors in the QFR has a first orientation angle and is a first distance from the LEA; wherein a second linear subset of micromirrors in the QFR has a second orientation angle and is a second distance from the LEA; wherein a third linear subset of micromirrors in the QFR has a third orientation angle and is a third distance from the LEA; wherein a fourth linear subset of micromirrors in the QFR has a fourth orientation angle and is a fourth distance from the LEA; wherein the second distance is greater than the first distance; wherein the third distance is greater than the second distance; wherein the fourth distance is greater than the third distance; and wherein the fourth distance minus the third distance is greater than the second distance minus the first distance.

In one example, Augmented Reality (AR) eyeglasses can comprise: a Light Emitter Array (LEA) which creates virtual images in a person's field of view; and a Quasi Fresnel Reflector (QFR) which is configured to be worn in front of the person's eye; wherein the QFR further comprises an array of linear, parallel, partially-reflective, partially-transmissive surfaces (e.g. micromirrors or ridges); wherein the surfaces collectively reflect light beams from the LEA toward the person's eye; and wherein the surfaces which are closer to the center of the QFR are closer to each other than the surfaces which are farther from the center (e.g. closer to the peripheral edges) of the QFR. In another embodiment, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of linear, parallel, partially-reflective, partially-transmissive, flat surfaces (e.g. micromirrors or ridges); wherein the surfaces collectively reflect light beams from the LEA toward the person's eye; and wherein the surfaces which are farther from the LEA extend further out from the virtual plane of the QFR than the surfaces which are closer to the LEA.

For example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of linear, partially-reflective, partially-transmissive surfaces; wherein surfaces in the QFR collectively reflect light beams from the LEA toward the person's eye; wherein the orientation angle of a surface is the LEA-facing angle of intersection between the surface and the virtual plane of the QFR; wherein a first subset of surfaces in the QFR has a first orientation angle and is a first distance from the LEA; wherein a second subset of surfaces in the QFR has a second orientation angle and is a second distance from the LEA; wherein a third subset of surfaces in the QFR has a third orientation angle and is a third distance from the LEA; wherein the second distance is greater than the first distance; wherein the third distance is greater than the second distance; wherein the second orientation angle is less than the first orientation angle; and wherein the third orientation angle is less than the second orientation angle.

In one embodiment, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of linear, partially-reflective, partially-transmissive ridges; wherein the ridges collectively reflect light beams from the LEA toward the person's eye; and wherein a first subset of ridges which are closer to the LEA are farther apart from each other than a second subset of ridges which are farther from the LEA. Alternatively, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of linear, partially-reflective, partially-transmissive ridges; wherein the ridges collectively reflect light beams from the LEA toward the person's eye; wherein different ridges have different angles relative to the virtual plane which best fits the LEA; and wherein the angles of a first subset of ridges which are closer to the LEA are less than the angles of a second subset of ridges which are farther from the LEA.

For example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of linear, partially-reflective, partially-transmissive ridges; wherein the ridges collectively reflect light beams from the LEA toward the person's eye; wherein different ridges have different angles relative to the virtual plane which best fits the QFR and/or relative to the virtual plane which best fits the LEA; and wherein the angles of a first subset of ridges which are closer to the LEA are less than the angles of a second subset of ridges which are farther from the LEA. In another embodiment, Augmented Reality (AR) eyeglasses can comprise: a Light Emitter Array (LEA) which creates virtual images in a person's field of view; and a Quasi Fresnel Reflector (QFR) which is configured to be worn in front of the person's eye; wherein the QFR further comprises an array of linear, partially-reflective, partially-transmissive ridges; wherein the ridges collectively reflect light beams from the LEA toward the person's eye; wherein different ridges have different angles relative to the virtual plane which best fits the QFR; and wherein the angles of a first subset of ridges which are closer to the LEA are less than the angles of a second subset of ridges which are farther from the LEA.

In an example, this invention can be embodied in augmented reality eyewear comprising: a Light Emitter Array (LEA) which creates virtual images in a person's field of view; and a Quasi Fresnel Reflector (QFR) which is configured to be worn in front of the person's eye; wherein the QFR further comprises an array of movable, linear, partially-reflective, partially-transmissive surfaces (e.g. microridges or micromirrors) which reflect light beams from the LEA toward the person's eye to create virtual images in the person's field of view; and an Electromagnetic Field Generator (EFG) which generates a magnetic field which moves the linear, partially-reflective, partially-transmissive surfaces in the QFR. In another example, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of nested (e.g. concentric) circular, partially-reflective, partially-transmissive ridges; wherein the ridges collectively reflect light beams from the LEA toward the person's eye; and wherein a first subset of ridges which are closer to the center of the QFR are closer to each other than a second subset of ridges which are farther from the center (e.g. closer to the peripheral edges) of the QFR.

In one embodiment, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of nested (e.g. concentric) arcuate, partially-reflective, partially-transmissive ridges; wherein the ridges collectively reflect light beams from the LEA toward the person's eye; wherein different ridges have different angles relative to the virtual plane which best fits the LEA; wherein the angles of a first subset of ridges which are closer to the LEA are greater than the angles of a second subset of ridges which are farther from the LEA; and wherein ridges which closer to center of the QFR are closer together than ridges which are closer to the peripheral edges of the QFR. In another embodiment, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of nested (e.g. concentric) arcuate, partially-reflective, partially-transmissive ridges; wherein the ridges collectively reflect light beams from the LEA toward the person's eye; wherein different ridges have different angles relative to the virtual plane which best fits the QFR and/or relative to the virtual plane which best fits the LEA; wherein the angles of a first subset of ridges which are closer to the LEA are greater than the angles of a second subset of ridges which are farther from the LEA; and wherein ridges which closer to center of the QFR are closer together than ridges which are closer to the peripheral edges of the QFR.

In yet another example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of nested (e.g. concentric) arcuate, partially-reflective, partially-transmissive ridges; wherein the ridges collectively reflect light beams from the LEA toward the person's eye; wherein different ridges have different angles relative to the virtual plane which best fits the QFR; wherein the angles of a first subset of ridges which are closer to the LEA are greater than the angles of a second subset of ridges which are farther from the LEA; and wherein ridges which closer to center of the QFR are closer together than ridges which are closer to the peripheral edges of the QFR. Alternatively, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of nested (e.g. concentric) circular, partially-reflective, partially-transmissive ridges; wherein the ridges collectively reflect light beams from the LEA toward the person's eye; wherein different ridges have different angles relative to the virtual plane which best fits the LEA; wherein the angles of a first subset of ridges which are closer to the LEA are greater than the angles of a second subset of ridges which are farther from the LEA; and wherein ridges which closer to center of the QFR are closer together than ridges which are closer to the peripheral edges of the QFR.

For example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of nested (e.g. concentric) circular, partially-reflective, partially-transmissive ridges; wherein the ridges collectively reflect light beams from the LEA toward the person's eye; wherein different ridges have different angles relative to the virtual plane which best fits the QFR and/or relative to the virtual plane which best fits the LEA; wherein the angles of a first subset of ridges which are closer to the LEA are greater than the angles of a second subset of ridges which are farther from the LEA; and wherein ridges which closer to center of the QFR are closer together than ridges which are closer to the peripheral edges of the QFR. In another example, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of nested (e.g. concentric) circular, partially-reflective, partially-transmissive ridges; wherein the ridges collectively reflect light beams from the LEA toward the person's eye; wherein different ridges have different angles relative to the virtual plane which best fits the QFR; wherein the angles of a first subset of ridges which are closer to the LEA are greater than the angles of a second subset of ridges which are farther from the LEA; and wherein ridges which closer to center of the QFR are closer together than ridges which are closer to the peripheral edges of the QFR.

In one embodiment, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of nested arcuate subsets of partially-reflective, partially-transmissive micromirrors; wherein the micromirrors collectively reflect light beams from the LEA toward the person's eye in order to create virtual images in the person's field of view; and wherein subsets of micromirrors which closer to center of the QFR are closer together than subsets of micromirrors which are closer to the periphery of the QFR.

For example, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of nested arcuate subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR and/or relative to the virtual plane which best fits the LEA; and wherein the angles of subsets of micromirrors which are closer to the LEA are less than the angles of subsets of micromirrors which are farther from the LEA.

In an example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of nested arcuate subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR and/or relative to the virtual plane which best fits the LEA; wherein the angles of subsets of micromirrors which are closer to the LEA are greater than the angles of subsets of micromirrors which are farther from the LEA; and wherein subsets of micromirrors which closer to center of the QFR are closer together than subsets of micromirrors which are closer to the periphery of the QFR.

For example, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of nested circular subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the LEA; and wherein the angles of a first subset of micromirrors which are closer to the LEA are less than the angles of a second subset of micromirrors which are farther from the LEA. In another example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of nested circular subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR and/or relative to the virtual plane which best fits the LEA; and wherein the angles of a first subset of micromirrors which are closer to the LEA are greater than the angles of a second subset of micromirrors which are farther from the LEA.

In yet another example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of nested circular subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR; wherein the angles of a first subset of micromirrors which are closer to the LEA are less than the angles of a second subset of micromirrors which are farther from the LEA; and wherein subsets of micromirrors which closer to center of the QFR are closer together than subsets of micromirrors which are closer to the periphery of the QFR.

For example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of nested subsets of partially-reflective and partially-transmissive micromirrors; wherein micromirrors in the QFR collectively reflect light beams from the LEA toward the person's eye to create virtual images in the person's field of view; wherein the orientation angle of a micromirror is the LEA-facing angle of intersection between the micromirror and the virtual flat plane which best fits the QFR; wherein a first subset of micromirrors in the QFR have a first orientation angle and is a first distance from the LEA; a second subset of micromirrors in the QFR have a second orientation angle and is a second distance from the LEA; and a third subset of micromirrors in the QFR have a third orientation angle and is a third distance from the LEA; wherein the second distance is greater than the first distance;

wherein the third distance is greater than the second distance; wherein the second orientation angle is less than the first orientation angle, and wherein the third orientation angle is less than the second orientation angle.

In one example, Augmented Reality (AR) eyewear can comprise: an annular Light Emitter Array (LEA) which creates virtual images in a person's field of view; and a Quasi Fresnel Reflector (QFR) which is configured to be worn in front of the person's eye; wherein the QFR further comprises an array of partially-reflective, partially-transmissive rings which reflect light beams from the LEA toward the person's eye to create virtual images in the person's field of view; and wherein a Conventional Fresnel Reflector (CFR) reflects collimated light rays from a distant light source into convergence on a central focal point, but this Quasi Fresnel Reflector (QFR) reflects light rays from the LEA encircling the QFR into convergence on (or within) the person's eye. In another embodiment, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of partially-reflective and partially-transmissive micromirrors; wherein micromirrors in the QFR collectively reflect light beams from the LEA toward the person's eye to create virtual images in the person's field of view; wherein the orientation angle of a micromirror is the LEA-facing angle of intersection between the micromirror and the virtual flat plane which best fits the QFR; wherein a first subset of micromirrors in the QFR have a first orientation angle and is a first distance from the LEA; a second subset of micromirrors in the QFR have a second orientation angle and is a second distance from the LEA; and a third subset of micromirrors in the QFR have a third orientation angle and is a third distance from the LEA; wherein the second distance is greater than the first distance; wherein the third distance is greater than the second distance; wherein the second orientation angle is less than the first orientation angle, and wherein the third orientation angle is less than the second orientation angle.

For example, Augmented Reality (AR) eyeglasses can comprise: a Light Emitter Array (LEA) which creates virtual images in a person's field of view; and a Quasi Fresnel Reflector (QFR) which is configured to be worn in front of the person's eye; wherein the QFR further comprises an array of partially-reflective, partially-transmissive surfaces; wherein surfaces in the QFR collectively reflect light beams from the LEA toward the person's eye; wherein the orientation angle of a surface is the LEA-facing angle of intersection between the surface and the virtual plane of the QFR; wherein a first subset of surfaces in the QFR has a first orientation angle and is a first distance from the LEA; wherein a second subset of surfaces in the QFR has a second orientation angle and is a second distance from the LEA; wherein a third subset of surfaces in the QFR has a third orientation angle and is a third distance from the LEA; wherein the second distance is greater than the first distance; wherein the third distance is greater than the second distance; wherein the second orientation angle is less than the first orientation angle; and wherein the third orientation angle is less than the second orientation angle.

In one embodiment, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of partially-reflective, partially-transmissive, flat surfaces; wherein the LEA is located to the left of the QFR; wherein the surfaces collectively reflect light beams from the LEA toward the person's eye to create virtual images in the person's field of view; wherein the orientation angle of a surface is the LEA-facing angle of intersection between the surface and the virtual plane of the QFR; wherein a first subset of surfaces in the first quadrant across the (left-to-right) width of the QFR has a first orientation angle; wherein a second subset of surfaces in the second quadrant across the (left-to-right) width of the QFR has a second orientation angle; wherein a third subset of surfaces in the first quadrant across the (left-to-right) width of the QFR has a third orientation angle; wherein a fourth subset of surfaces in the second quadrant across the (left-to-right) width of the QFR has a fourth orientation angle; wherein the second orientation angle is less than the first orientation angle; wherein the third orientation angle is less than the second orientation angle; wherein the fourth orientation angle is less than the third orientation angle.

In an example, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of partially-reflective, partially-transmissive flat micromirrors; wherein the micromirrors collectively reflect light beams from the LEA toward the person's eye to create virtual images in the person's field of view; and wherein micromirrors which are farther from the LEA extend farther out from the main plane of the QFR than micromirrors which are closer to the LEA. In another example, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises partially-reflective, partially-transmissive surfaces in a carlavian curve configuration; wherein the surfaces collectively reflect light beams from the LEA toward the person's eye to create virtual images in the person's field of view.

In one embodiment, augmented reality eyewear can comprise: two Light Emitter Arrays (LEA) which are configured to be worn to the right and to the left, respectively, of a person's eye and to emit light beams which create virtual images in the person's field of view; and a Quasi Fresnel Reflector (QFR) which is configured to be worn on the person's head in front of the person's eye; wherein the QFR further comprises an array of partially-reflective, partially-transmissive micromirrors; wherein the micromirrors collectively reflect light beams from the two LEAs toward the person's eye to create virtual images in the person's field of view; wherein a first subset of micromirrors in the first quadrant across the (right-to-left or left-to-right) width of the QFR has a first orientation angle; wherein a second subset of micromirrors in the second quadrant across the (right-to-left or left-to-right) width of the QFR has a second orientation angle; wherein a third subset of micromirrors in third first quadrant across the (right-to-left or left-to-right) width of the QFR has a third orientation angle; wherein a fourth subset of micromirrors in the fourth quadrant across the (right-to-left or left-to-right) width of the QFR has a fourth orientation angle; wherein the second orientation angle is less than the first orientation angle; and wherein the fourth orientation angle is greater than the third orientation angle.

For example, Augmented Reality (AR) eyeglasses can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of partially-reflective, partially-transmissive micromirrors; wherein the micromirrors collectively reflect light beams from the LEA toward the person's eye to create virtual images in the person's field of view; wherein the orientation angle of a micromirror in the QFR is the LEA-facing angle of intersection between a virtual plane which best fits the micromirror and a virtual plane which best fits the QFR; wherein a first subset of micromirrors in the QFR has a first orientation angle and is a first distance from the LEA; wherein a second subset of micromirrors in the QFR has a second orientation angle and is a second distance from the LEA; wherein a third subset of micromirrors in the QFR has a third orientation angle and is a third distance from the LEA; wherein a fourth subset of micromirrors in the QFR has a fourth orientation angle and is a fourth distance from the LEA; wherein the second distance is greater than the first distance; wherein the third distance is greater than the second distance; wherein the fourth distance is greater than the third distance; wherein the second orientation angle is less than the first orientation angle; wherein the third orientation angle is less than the second orientation angle; and wherein the fourth orientation angle is less than the third orientation angle.

In one example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of partially-reflective, partially-transmissive micromirrors; wherein the micromirrors collectively reflect light beams from the LEA toward the person's eye to create virtual images in the person's field of view; wherein the orientation angle of a micromirror in the QFR is the LEA-facing angle of intersection between the micromirror and a virtual flat plane which best fits the QFR; wherein a first subset of micromirrors in the QFR has a first orientation angle and is a first distance from the LEA; wherein a second subset of micromirrors in the QFR has a second orientation angle and is a second distance from the LEA; wherein a third subset of micromirrors in the QFR has a third orientation angle and is a third distance from the LEA; wherein the second distance is greater than the first distance; wherein the third distance is greater than the second distance; wherein the second orientation angle is less than the first orientation angle, and wherein the third orientation angle is less than the second orientation angle. In another example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of partially-reflective, partially-transmissive micromirrors; wherein the micromirrors collectively reflect light beams from the LEA toward the person's eye to create virtual images in the person's field of view; wherein the orientation angle of a micromirror in the QFR is the LEA-facing angle of intersection between the micromirror and a virtual flat plane which best fits the QFR; wherein a first subset of micromirrors in the QFR has a first orientation angle and is a first distance from the LEA; wherein a second subset of micromirrors in the QFR has a second orientation angle and is a second distance from the LEA; wherein a third subset of micromirrors in the QFR have a third orientation angle and is a third distance from the LEA; wherein the second distance is greater than the first distance; wherein the third distance is greater than the second distance; wherein the second orientation angle is less than the first orientation angle; wherein the third orientation angle is less than the second orientation angle, and wherein there are surfaces of the QFR between the three subsets of micromirrors which are substantially parallel to each other.

For example, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of partially-reflective, partially-transmissive rings; wherein the rings collectively reflect light beams from the LEA toward the person's eye; and wherein a first subset of rings which are closer to the center of the QFR are closer to each other than a second subset of rings which are farther from the center (e.g. closer to the peripheral edges) of the QFR. In another embodiment, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of partially-reflective, partially-transmissive flat surfaces; wherein the surfaces collectively reflect light beams from the LEA so that the light beams focus on (or in) the person's eye and create virtual images in the person's field of view; wherein the orientation angle of a surface is the LEA-facing angle of intersection between the surface and the virtual plane of the QFR; wherein a first subset of surfaces in the QFR has a first orientation angle and is a first distance from the LEA; wherein a second subset of surfaces in the QFR has a second orientation angle and is a second distance from the LEA; wherein a third subset of surfaces in the QFR has a third orientation angle and is a third distance from the LEA; wherein the second distance is greater than the first distance; wherein the third distance is greater than the second distance; wherein the second orientation angle is less than the first orientation angle; and wherein the third orientation angle is less than the second orientation angle.

In one embodiment, augmented reality eyewear can comprise: a Light Emitter Array (LEA) which creates virtual images in a person's field of view; and a Quasi Fresnel Reflector (QFR) which is configured to be worn in front of the person's eye; wherein the QFR further comprises an array of partially-reflective, partially-transmissive, flat surfaces; wherein the surfaces collectively reflect light beams from the LEA toward the person's eye to create virtual images in the person's field of view; wherein the orientation angle of a surface is the LEA-facing angle of intersection between the surface and the virtual plane of the QFR; wherein a first subset of surfaces in the QFR has a first orientation angle and is a first distance from the LEA; wherein a second subset of surfaces in the QFR has a second orientation angle and is a second distance from the LEA; wherein a third subset of surfaces in the QFR has a third orientation angle and is a third distance from the LEA; wherein the second distance is greater than the first distance; wherein the third distance is greater than the second distance; wherein the second orientation angle is less than the first orientation angle; and wherein the third orientation angle is less than the second orientation angle. Alternatively, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of partially-reflective, partially-transmissive, flat surfaces; wherein the surfaces collectively reflect light beams from the LEA toward the person's eye to create virtual images in the person's field of view; wherein the orientation angle of a surface is the LEA-facing angle of intersection between the surface and the virtual plane of the QFR; wherein a first subset of surfaces in the QFR has a first orientation angle and is a first distance from the LEA; wherein a second subset of surfaces in the QFR has a second orientation angle and is a second distance from the LEA; wherein a third subset of surfaces in the QFR has a third orientation angle and is a third distance from the LEA; wherein the second distance is greater than the first distance; wherein the third distance is greater than the second distance; wherein the second orientation angle is less than the first orientation angle; wherein the third orientation angle is less than the second orientation angle; and wherein there are surfaces of the QFR between the three subsets which share the same orientation angle.

For example, augmented reality eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of rings of partially-reflective, partially-transmissive micromirrors; wherein the micromirrors collectively reflect light beams from the LEA toward the person's eye to create virtual images in the person's field of view; and wherein rings of micromirrors which are closer to the center of the QFR extend out farther from the main plane of the QFR than rings of micromirrors which are farther from the center of the QFR (e.g. closer to the peripheral edges) of the QFR. In another example, Augmented Reality (AR) eyewear can comprise: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR further comprises an array of subsets of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR and/or relative to the virtual plane which best fits the LEA; and wherein the angles of a first subset of micromirrors which are closer to the LEA are greater than the angles of a second subset of micromirrors which are farther from the LEA.

In an example, Augmented Reality (AR) eyewear can comprise: an annular Light Emitter Array (LEA) which is configured to encircle a person's eye and emit light beams which create virtual images in the person's field of view; and a Quasi Fresnel Reflector (QFR) which is configured to be worn in front of the person's eye; wherein the QFR further comprises partially-reflective, partially-transmissive ridges; wherein the ridges collectively reflect light beams from the LEA toward the person's eye in order to create virtual images in the person's field of view; and wherein the combined surfaces of the ridges which face toward LEA collectively comprise sections of a sphere. In another example, this invention can be embodied in augmented reality eyewear comprising: a Light Emitter Array (LEA) which is configured to be worn on a person's head and emit light beams which create virtual images in the person's field of view; and a Quasi Fresnel Reflector (QFR) which is configured to be worn in front of the person's eye; wherein the QFR is an off-axis Fresnel reflector; wherein the QFR further comprises an array of nested rings of partially-reflective, partially-transmissive micromirrors; wherein the micromirrors collectively reflect light beams from the LEA toward the person's eye in order to create virtual images in the person's field of view; wherein different micromirrors have different LEA-facing angles relative to the virtual plane which best fits the QFR and/or relative to the virtual plane which best fits the LEA; wherein the angles of a rings of micromirrors which are closer to the LEA are less than the angles of rings of micromirrors which are farther from the LEA; and wherein rings of micromirrors which closer to center of the QFR are closer together than rings of micromirrors which are closer to the periphery of the QFR.

In an example, this invention can be embodied in augmented reality eyewear comprising: a Light Emitter Array (LEA) which creates virtual images in a person's field of view; and a Quasi Fresnel Reflector (QFR) which is configured to be worn in front of the person's eye; wherein the QFR is partially-reflective and partially-transmissive; wherein a cross-section of the QFR has a saw-tooth (e.g. zigzag) shape with teeth whose sizes vary across the width of the QFR; and wherein the QFR reflects light beams from the LEA toward the person's eye to create virtual images in the person's field of view. In another example, augmented reality eyewear can comprise: a Light Emitter Array (LEA) which creates virtual images in a person's field of view; and a Quasi Fresnel Reflector (QFR) which is configured to be worn in front of the person's eye; wherein the QFR is partially-reflective and partially-transmissive; wherein the QFR reflects light beams from the LEA toward the person's eye to create virtual images in the person's field of view; and wherein a conventional Fresnel Reflector reflects collimated light rays into convergence on a central focal point, but this Quasi Fresnel Reflector (QFR) reflects light rays from a light source on one side (e.g. right, left, top, or bottom) of the QFR (or from a circular array of light sources around the QFR) into convergence on a central focal point.

In an example, an optical structure for augmented reality eyewear can comprise: (1) a circumferential light emitter array which is configured to be within 4" of a person's eye and which emits light beams which display virtual objects in the person's field of view; and (2) a reflector array of at least ten reflective components which is configured to be within 4" of a person's eye; wherein each reflective component has a first configuration and a second configuration; wherein selected reflective components can each be selectively and reversibly rotated, tilted, or pivoted from their first configurations to their second configurations by the transmission of electromagnetic energy; wherein reflective components allow less light from the person's environment to reach the person's eye in their second configurations than in their first configurations; and wherein reflective components reflect more light from the circumferential light emitter array toward the person's eye in their second configurations than in their first configurations.

In an example, an optical structure for augmented reality eyewear can comprise: (1) a circumferential light emitter array which is configured to be within 4" of a person's eye and which emits light beams which display virtual objects in the person's field of view; and (2) an orthogonal (e.g. row and column) reflector array of reflective components which is configured to be within 4" of a person's eye; wherein each reflective component has a first configuration and a second configuration; wherein selected reflective components can each be selectively and reversibly rotated, tilted, or pivoted from their first configurations to their second configurations by the transmission of electromagnetic energy; wherein reflective components allow less light from the person's environment to reach the person's eye in their second configurations than in their first configurations; and wherein reflective components reflect more light from the circumferential light emitter array toward the person's eye in their second configurations than in their first configurations.

In an example, an optical structure for augmented reality eyewear can comprise: (1) a circumferential light emitter array which is configured to be within 4" of a person's eye and which emits light beams which display virtual objects in the person's field of view; and (2) a radial (spoke and ring) reflector array of reflective components which is configured to be within 4" of a person's eye; wherein each reflective component has a first configuration and a second configuration; wherein selected reflective components can each be selectively and reversibly rotated, tilted, or pivoted from their first configurations to their second configurations by the transmission of electromagnetic energy; wherein reflective components allow less light from the person's environment to reach the person's eye in their second configurations than in their first configurations; and wherein reflective components reflect more light from the circumferential light emitter array toward the person's eye in their second configurations than in their first configurations.

In an example, an optical structure for augmented reality eyewear can comprise: (1) a cylindrical array of at least ten light emitters which display virtual objects in a person's field of view; and (2) a concave eye-facing array of at least ten selectively-movable reflective components located inside the cylindrical array of at least ten light emitters; wherein each reflective component has a first configuration and a second configuration; wherein selected reflective components can each be selectively and reversibly rotated, tilted, or pivoted from their first configurations to their second configurations by the transmission of electromagnetic energy; wherein reflective components allow less light from the person's environment to reach the person's eye in their second configurations than in their first configurations; and wherein reflective components reflect more light from the cylindrical array of at least ten light emitters toward the person's eye in their second configurations than in their first configurations.

In an example, an optical structure for augmented reality eyewear can comprise: (1) a cylindrical array of at least ten light emitters which display virtual objects in a person's field of view; and (2) a convex eye-facing array of at least ten selectively-movable reflective components located inside the cylindrical array of at least ten light emitters; wherein each reflective component has a first configuration and a second configuration; wherein selected reflective components can each be selectively and reversibly rotated, tilted, or pivoted from their first configurations to their second configurations by the transmission of electromagnetic energy; wherein reflective components allow less light from the person's environment to reach the person's eye in their second configurations than in their first configurations; and wherein reflective components reflect more light from the cylindrical array of at least ten light emitters toward the person's eye in their second configurations than in their first configurations.

In an example, an optical structure for augmented reality eyewear can comprise: (1) a first light emitter which is configured to be a first distance from a person's eye and which emits light beams which display virtual objects in a person's field of view; (2) a second light emitter which is configured to be a second distance from the person's eye and which emits light beams which display virtual objects in a person's field of view; (3) a first selectively-rotatable reflective component; wherein the first selectively-rotatable reflective component has a first configuration and a second configuration; wherein the first selectively-rotatable reflective component is changed from its first configuration to its second configuration by the transmission of electromagnetic energy; wherein the first selectively-rotatable reflective component allows less light from the person's environment to reach the person's eye in its second configuration than in its first configuration; and wherein the first selectively-rotatable reflective component reflects more light from the first light emitter toward the person's eye in its second configuration than in its first configuration; and (4) a second selectively-rotatable reflective component; wherein the second selectively-rotatable reflective component has a third configuration and a fourth configuration; wherein the second selectively-rotatable reflective component is changed from its third configuration to its fourth configuration by the transmission of electromagnetic energy; wherein the second selectively-rotatable reflective component allows less light from the person's environment to reach the person's eye in its fourth configuration than in its third configuration; and wherein the second selectively-rotatable reflective component reflects more light from the second light emitter toward the person's eye in its fourth configuration than in its third configuration.

In an example, an optical structure for augmented reality eyewear can comprise: (1) a first light emitter which is configured to be at first angular (or polar coordinate) location around the circumference of virtual circle in front of a person's eye and which emits light beams which display virtual objects in a person's field of view; (2) a second light emitter which is configured to be at second angular (or polar coordinate) location around the circumference of virtual circle in front of the person's eye and which emits light beams which display virtual objects in a person's field of view; wherein the first and second angular locations differ by at least 45 degrees; (3) a first selectively-rotatable reflective component; wherein the first selectively-rotatable reflective component has a first configuration and a second configuration; wherein the first selectively-rotatable reflective component is changed from its first configuration to its second configuration by the transmission of electromagnetic energy; wherein the first selectively-rotatable reflective component allows less light from the person's environment to reach the person's eye in its second configuration than in its first configuration; and wherein the first selectively-rotatable reflective component reflects more light from the light emitters toward the person's eye in its second configuration than in its first configuration; and (4) a second selectively-rotatable reflective component; wherein the second selectively-rotatable reflective component has a third configuration and a fourth configuration; wherein the second selectively-rotatable reflective component is changed from its third configuration to its fourth configuration by the transmission of electromagnetic energy; wherein the second selectively-rotatable reflective component allows less light from the person's environment to reach the person's eye in its fourth configuration than in its third configuration; and wherein the second selectively-rotatable reflective component reflects more light from the light emitters toward the person's eye in its fourth configuration than in its third configuration.

In an example, an optical structure for augmented reality eyewear can comprise: (1) a first light emitter which is configured to be at first angular (or polar coordinate) location around the circumference of virtual circle in front of a person's eye and which emits light beams which display virtual objects in a person's field of view; (2) a second light emitter which is configured to be at second angular (or polar coordinate) location around the circumference of virtual circle in front of the person's eye and which emits light beams which display virtual objects in a person's field of view; wherein the first and second angular locations differ by at least 90 degrees; (3) a first selectively-rotatable reflective component; wherein the first selectively-rotatable reflective component has a first configuration and a second configuration; wherein the first selectively-rotatable reflective component is changed from its first configuration to its second configuration by the transmission of electromagnetic energy; wherein the first selectively-rotatable reflective component allows less light from the person's environment to reach the person's eye in its second configuration than in its first configuration; and wherein the first selectively-rotatable reflective component reflects more light from the light emitters toward the person's eye in its second configuration than in its first configuration; and (4) a second selectively-rotatable reflective component; wherein the second selectively-rotatable reflective component has a third configuration and a fourth configuration; wherein the second selectively-rotatable reflective component is changed from its third configuration to its fourth configuration by the transmission of electromagnetic energy; wherein the second selectively-rotatable reflective component allows less light from the person's environment to reach the person's eye in its fourth configuration than in its third configuration; and wherein the second selectively-rotatable reflective component reflects more light from the light emitters toward the person's eye in its fourth configuration than in its third configuration.

In an example, an optical structure for augmented reality eyewear can comprise: (1) a first light emitter which is configured to be to one side a person's eye and which emits light beams which display virtual objects in a person's field of view; (2) a second light emitter which is configured to be above the persons eye and which emits light beams which display virtual objects in a person's field of view; (3) a first rotatable reflective component; wherein the first rotatable reflective component is rotated by the transmission of electromagnetic energy; wherein the first selectively-rotatable reflective component reflects light from the first light emitter toward the person's eye when it is rotated to a first configuration and reflects light from the second light emitter toward the person's eye when it is rotated to a second configuration; and (4) a second rotatable reflective component; wherein the second rotatable reflective component is rotated by the transmission of electromagnetic energy; wherein the second selectively-rotatable reflective component reflects light from the first light emitter toward the person's eye when it is rotated to a third configuration reflects light from the second light emitter toward the person's eye when it is rotated to a fourth configuration.

In an example, an optical structure for augmented reality eyewear can comprise: (1) a first light emitter which is configured to be to the right of a person's eye and which emits light beams which display virtual objects in a person's field of view; (2) a second light emitter which is configured to be to the left of the persons eye and which emits light beams which display virtual objects in a person's field of view; (3) a first rotatable reflective component; wherein the first rotatable reflective component is rotated by the transmission of electromagnetic energy; wherein the first selectively-rotatable reflective component reflects light from the first light emitter toward the person's eye when it is rotated to a first configuration and reflects light from the second light emitter toward the person's eye when it is rotated to a second configuration; and (4) a second rotatable reflective component; wherein the second rotatable reflective component is rotated by the transmission of electromagnetic energy; wherein the second selectively-rotatable reflective component reflects light from the first light emitter toward the person's eye when it is rotated to a third configuration reflects light from the second light emitter toward the person's eye when it is rotated to a fourth configuration.

In an example, an optical structure for augmented reality eyewear can comprise: (1) a first light emitter which is configured to be within 4" of a person's eye and which emits light beams which display virtual objects in a person's field of view; (2) a second light emitter which is configured to be within 4" of the persons eye and which emits light beams which display virtual objects in a person's field of view; (3) a first selectively-rotatable reflective component; wherein the first selectively-rotatable reflective component has a first configuration and a second configuration; wherein the first selectively-rotatable reflective component is changed from its first configuration to its second configuration by the transmission of electromagnetic energy; wherein the first selectively-rotatable reflective component allows less light from the person's environment to reach the person's eye in its second configuration than in its first configuration; and wherein the first selectively-rotatable reflective component reflects light from the first light emitter toward the person's eye in its second configuration; and (4) a second selectively-rotatable reflective component; wherein the second selectively-rotatable reflective component has a third configuration and a fourth configuration; wherein the second selectively-rotatable reflective component is changed from its third configuration to its fourth configuration by the transmission of electromagnetic energy; wherein the second selectively-rotatable reflective component allows less light from the person's environment to reach the person's eye in its fourth configuration than in its third configuration; and wherein the second selectively-rotatable reflective component reflects light from the second light emitter toward the person's eye in its fourth configuration.

In an example, an optical structure for augmented reality eyewear can comprise: (1) a first light emitter which is configured to be within 4" of a person's eye and which emits light beams which display virtual objects in a person's field of view; (2) a second light emitter which is configured to be within 4" of the persons eye and which emits light beams which display virtual objects in a person's field of view; (3) a first selectively-rotatable reflective component; wherein the first selectively-rotatable reflective component has a first configuration and a second configuration; wherein the first selectively-rotatable reflective component is changed from its first configuration to its second configuration by the transmission of electromagnetic energy; wherein the first selectively-rotatable reflective component reflects light from the first light emitter toward the person's eye in its first configuration; and wherein the first selectively-rotatable reflective component reflects light from the second light emitter toward the person's eye in its second configuration; and (4) a second selectively-rotatable reflective component;

wherein the second selectively-rotatable reflective component has a third configuration and a fourth configuration; wherein the second selectively-rotatable reflective component is changed from its third configuration to its fourth configuration by the transmission of electromagnetic energy; wherein the second selectively-rotatable reflective component reflects light from the second light emitter toward the person's eye in its third configuration; and wherein the second selectively-rotatable reflective component reflects light from the first light emitter toward the person's eye in its fourth configuration.

In an example, an optical structure for augmented reality eyewear can comprise: (1) a first ring of light emitters to display virtual objects at a first focal distance from a person; (2) a second ring of light emitters to display virtual objects at a second focal distance from the person, wherein the second distance is greater than the first distance; (3) a first concave array of at least ten selectively-movable reflective components located a third distance from the person's eye; wherein each reflective component in the first array has a first configuration and a second configuration; wherein reflective components can each be selectively, independently, and reversibly rotated, tilted, or pivoted from their first configurations to their second configurations by the transmission of electromagnetic energy; wherein reflective components allow less light from the person's environment to reach the person's eye in their second configurations than in their first configurations; and wherein reflective components reflect more light from the first ring of light emitters toward the person's eye in their second configurations than in their first configurations; and (4) a second concave array of at least ten selectively-movable reflective components located a fourth distance from the person's eye; wherein the fourth distance is greater than the third distance; wherein each reflective component in the second array has a first configuration and a second configuration; wherein reflective components can each be selectively, independently, and reversibly rotated, tilted, or pivoted from their first configurations to their second configurations by the transmission of electromagnetic energy; wherein reflective components allow less light from the person's environment to reach the person's eye in their second configurations than in their first configurations; and wherein reflective components reflect more light from the second ring of light emitters toward the person's eye in their second configurations than in their first configurations.

In an example, an optical structure for augmented reality eyewear can comprise: (1) a first set of light emitters to display virtual objects at a first focal distance from a person; (2) a second set of light emitters to display virtual objects at a second focal distance from the person, wherein the second distance is greater than the first distance; (3) a first array of at least ten selectively-movable reflective components located a third distance from the person's eye; wherein each reflective component in the first array has a first configuration and a second configuration; wherein reflective components can each be selectively, independently, and reversibly rotated, tilted, or pivoted from their first configurations to their second configurations by the transmission of electromagnetic energy; wherein reflective components allow less light from the person's environment to reach the person's eye in their second configurations than in their first configurations; and wherein reflective components reflect more light from the first set of light emitters toward the person's eye in their second configurations than in their first configurations; and (4) a second array of at least ten selectively-movable reflective components located a fourth distance from the person's eye; wherein the fourth distance is greater than the third distance; wherein each reflective component in the second array has a first configuration and a second configuration; wherein reflective components can each be selectively, independently, and reversibly rotated, tilted, or pivoted from their first configurations to their second configurations by the transmission of electromagnetic energy; wherein reflective components allow less light from the person's environment to reach the person's eye in their second configurations than in their first configurations; and wherein reflective components reflect more light from the second set of light emitters toward the person's eye in their second configurations than in their first configurations.

In an example, an optical structure for augmented reality eyewear can comprise: (1) a first virtual object display to display virtual objects at a first focal distance from a person; (2) a second virtual object display to display virtual objects at a second focal distance from the person, wherein the second distance is greater than the first distance; (3) a first array of at least ten selectively-movable reflective components located a third distance from the person's eye; wherein each reflective component in the first array has a first configuration and a second configuration; wherein reflective components can each be selectively, independently, and reversibly rotated, tilted, or pivoted from their first configurations to their second configurations by the transmission of electromagnetic energy; wherein reflective components allow less light from the person's environment to reach the person's eye in their second configurations than in their first configurations; and wherein reflective components reflect more light from the first virtual object display toward the person's eye in their second configurations than in their first configurations; and (4) a second array of at least ten selectively-movable reflective components located a fourth distance from the person's eye; wherein the fourth distance is greater than the third distance; wherein each reflective component in the second array has a first configuration and a second configuration; wherein reflective components can each be selectively, independently, and reversibly rotated, tilted, or pivoted from their first configurations to their second configurations by the transmission of electromagnetic energy; wherein reflective components allow less light from the person's environment to reach the person's eye in their second configurations than in their first configurations; and wherein reflective components reflect more light from the second virtual object display toward the person's eye in their second configurations than in their first configurations.

In an example, an optical structure for augmented reality eyewear can comprise: (1) a light emitter array of at least ten light emitters which is configured to be within 4" of a person's eye and which emits light beams which display virtual objects in the person's field of view; and (2) a reflector array of at least ten reflective components which is configured to be within 4" of a person's eye; wherein each reflective component has a first configuration and a second configuration; wherein selected reflective components can each be selectively and reversibly rotated, tilted, or pivoted from their first configurations to their second configurations by the transmission of electromagnetic energy; wherein reflective components allow less light from the person's environment to reach the person's eye in their second configurations than in their first configurations; and wherein reflective components reflect more light from the light emitter array toward the person's eye in their second configurations than in their first configurations.

In an example, an optical structure for augmented reality eyewear can comprise: (1) a light emitter which is configured to be within 4" of a person's eye and which emits light beams which display virtual objects in a person's field of view; and (2) an array of at least ten pivoting reflective components configured to be within 4" of the person's eye; wherein each pivoting reflective component in the array has a first configuration and a second configuration; wherein a pivoting reflective component is pivoted from its first configuration to its second configuration by the transmission of electromagnetic energy; wherein a pivoting reflective component allows less light from the person's environment to reach the person's eye in the component's second configuration than in the component's first configuration; and wherein the pivoting reflective component reflects more light from the light emitter toward the person's eye in the component's second configuration than in the component's first configuration.

In an example, an optical structure for augmented reality eyewear can comprise: (1) a light emitter which is configured to be within 4" of a person's eye and which emits light beams which display virtual objects in a person's field of view; and (2) an array of at least ten pivoting reflective components configured to be within 4" of the person's eye; wherein the array comprises rows and columns of pivoting reflective components; wherein each pivoting reflective component in the array has a first configuration and a second configuration; wherein a pivoting reflective component is pivoted from its first configuration to its second configuration by the transmission of electromagnetic energy; wherein a pivoting reflective component allows less light from the person's environment to reach the person's eye in the component's second configuration than in the component's first configuration; and wherein the pivoting reflective component reflects more light from the light emitter toward the person's eye in the component's second configuration than in the component's first configuration.

In an example, an optical structure for augmented reality eyewear can comprise: (1) a light emitter which is configured to be within 4" of a person's eye and which emits light beams which display virtual objects in a person's field of view; and (2) an array of at least ten pivoting reflective components configured to be within 4" of the person's eye; wherein the array comprises spokes and rings of pivoting reflective components; wherein each pivoting reflective component in the array has a first configuration and a second configuration; wherein a pivoting reflective component is pivoted from its first configuration to its second configuration by the transmission of electromagnetic energy; wherein a pivoting reflective component allows less light from the person's environment to reach the person's eye in the component's second configuration than in the component's first configuration; and wherein the pivoting reflective component reflects more light from the light emitter toward the person's eye in the component's second configuration than in the component's first configuration.

In an example, an optical structure for augmented reality eyewear can comprise: (1) a plurality of light emitters which are configured to be within 4" of a person's eye and which emit light beams which display virtual objects in a person's field of view; (2) a first ring of selectively-rotatable reflective components configured to be within 4" of the person's eye; wherein each reflective component in the first ring of selectively-rotatable reflective components has a first configuration and a second configuration; wherein each reflective component in the first ring is rotated, tilted, or pivoted from its first configuration to its second configuration by the transmission of electromagnetic energy; wherein reflective components in the first ring allow less light from the person's environment to reach the person's eye in their second configurations than in their first configurations; and wherein reflective components in the first ring reflect more light from the plurality of light emitters toward the person's eye in their second configurations than in their first configurations; and (3) a second ring of selectively-rotatable reflective components configured to be within 4" of the person's eye; wherein the first ring is nested within the second ring; wherein each reflective component in the second ring of selectively-rotatable reflective components has a first configuration and a second configuration; wherein each reflective component in the second ring is rotated, tilted, or pivoted from its first configuration to its second configuration by the transmission of electromagnetic energy; wherein reflective components in the second ring allow less light from the person's environment to reach the person's eye in their second configurations than in their first configurations; and wherein reflective components in the second ring reflect more light from the plurality of light emitters toward the person's eye in their second configurations than in their first configurations.

In an example, an optical structure for augmented reality eyewear can comprise: (1) a plurality of light emitters which are configured to be within 4" of a person's eye and which emit light beams which display virtual objects in a person's field of view; (2) a first ring of selectively-rotatable reflective components configured to be within 4" of the person's eye; wherein each reflective component in the first ring of selectively-rotatable reflective components has a first configuration and a second configuration; wherein each reflective component in the first ring is rotated, tilted, or pivoted from its first configuration to its second configuration by the transmission of electromagnetic energy; wherein reflective components in the first ring allow less light from the person's environment to reach the person's eye in their second configurations than in their first configurations; and wherein reflective components in the first ring reflect more light from the plurality of light emitters toward the person's eye in their second configurations than in their first configurations; and (3) a second ring of selectively-rotatable reflective components configured to be within 4" of the person's eye; wherein the first ring and the second ring are concentric; wherein each reflective component in the second ring of selectively-rotatable reflective components has a first configuration and a second configuration; wherein each reflective component in the second ring is rotated, tilted, or pivoted from its first configuration to its second configuration by the transmission of electromagnetic energy; wherein reflective components in the second ring allow less light from the person's environment to reach the person's eye in their second configurations than in their first configurations; and wherein reflective components in the second ring reflect more light from the plurality of light emitters toward the person's eye in their second configurations than in their first configurations.

In an example, an optical structure for augmented reality eyewear can comprise: (1) a plurality of light emitters which are configured to be within 4" of a person's eye and which emit light beams which display virtual objects in a person's field of view; (2) a first ring of selectively-rotatable reflective components configured to be within 4" of the person's eye; wherein each reflective component in the first ring of selectively-rotatable reflective components has a first configuration and a second configuration; wherein each reflective component in the first ring is rotated, tilted, or pivoted from its first configuration to its second configuration by the transmission of electromagnetic energy; wherein reflective components in the first ring allow less light from the person's environment to reach the person's eye in their second configurations than in their first configurations; and wherein reflective components in the first ring reflect more light from the plurality of light emitters toward the person's eye in their second configurations than in their first configurations; and (3) a second ring of selectively-rotatable reflective components configured to be within 4" of the person's eye; wherein the first ring is nested within the second ring; wherein the average size of reflective components in the first ring is smaller than the average size of reflective components in the second; wherein each reflective component in the second ring of selectively-rotatable reflective components has a first configuration and a second configuration; wherein each reflective component in the second ring is rotated, tilted, or pivoted from its first configuration to its second configuration by the transmission of electromagnetic energy; wherein reflective components in the second ring allow less light from the person's environment to reach the person's eye in their second configurations than in their first configurations; and wherein reflective components in the second ring reflect more light from the plurality of light emitters toward the person's eye in their second configurations than in their first configurations.

In an example, an optical structure for augmented reality eyewear can comprise: (1) a plurality of light emitters which is configured to be within 4" of a person's eye; and (2) a plurality of selectively-movable reflective components which is configured to be within 4" of a person's eye; wherein reflective components in the plurality of selectively-movable reflective components each have a best-fitting virtual plane which minimizes the sum of squared distances from the surfaces of the reflective component to the best-fitting virtual plane; wherein each reflective component has a first configuration and a second configuration; wherein a best-fitting virtual plane intersects a line-of-sight radial vector extending outward from the center of the person's eye at a first intersection angle when a reflective component is its first configuration and intersects the line-of-sight radial vector at a second intersection angle when the reflective component is in its second configuration; wherein reflective components allow less light from the person's environment to reach the person's eye in their second configurations than in their first configurations; wherein reflective components reflect more light from the light emitters toward the person's eye in their second configurations than in their first configurations; wherein light from the light emitters which is reflected by the plurality of selectively-movable reflective components in their second configurations displays virtual objects in the person's field of vision; and wherein selected reflective components can each be selectively and reversibly rotated, tilted, or pivoted from their first configuration to their second configuration by the transmission of electromagnetic energy.

In an example, an optical structure for augmented reality eyewear can comprise: (1) a ring of at least ten light emitters which display virtual objects in a person's field of view; and (2) a concave eye-facing array of at least ten selectively-movable reflective components located inside the ring of at least ten light emitters; wherein each reflective component has a first configuration and a second configuration; wherein selected reflective components can each be selectively and reversibly rotated, tilted, or pivoted from their first configurations to their second configurations by the transmission of electromagnetic energy; wherein reflective components allow less light from the person's environment to reach the person's eye in their second configurations than in their first configurations; and wherein reflective components reflect more light from the ring of at least ten light emitters toward the person's eye in their second configurations than in their first configurations.

In an example, an optical structure for augmented reality eyewear can comprise: (1) a ring of at least ten light emitters which display virtual objects in a person's field of view; and (2) a convex eye-facing array of at least ten selectively-movable reflective components located inside the ring of at least ten light emitters; wherein each reflective component has a first configuration and a second configuration; wherein selected reflective components can each be selectively and reversibly rotated, tilted, or pivoted from their first configurations to their second configurations by the transmission of electromagnetic energy; wherein reflective components allow less light from the person's environment to reach the person's eye in their second configurations than in their first configurations; and wherein reflective components reflect more light from the ring of at least ten light emitters toward the person's eye in their second configurations than in their first configurations.

In an example, an optical structure for augmented reality eyewear can comprise: (1) a ring of at least ten light emitters which display virtual objects in a person's field of view; and (2) a concave eye-facing array of at least ten selectively-movable reflective components located outside the ring of at least ten light emitters; wherein each reflective component has a first configuration and a second configuration; wherein selected reflective components can each be selectively and reversibly rotated, tilted, or pivoted from their first configurations to their second configurations by the transmission of electromagnetic energy; wherein reflective components allow less light from the person's environment to reach the person's eye in their second configurations than in their first configurations; and wherein reflective components reflect more light from the ring of at least ten light emitters toward the person's eye in their second configurations than in their first configurations.

In an example, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of partially-reflective, partially-transmissive surfaces; wherein the surfaces collectively reflect light beams from the LEA toward the person's eye to create virtual images in the person's field of view; wherein the orientation angle of a surface in the QFR is the LEA-facing angle of intersection between the surface and the virtual plane of the QFR; wherein a first subset of surfaces in the QFR has a first orientation angle and is a first distance from the LEA; wherein a second subset of surfaces in the QFR has a second orientation angle and is a second distance from the LEA; wherein a third subset of surfaces in the QFR has a third orientation angle and is a third distance from the LEA; wherein the second distance is greater than the first distance; wherein the third distance is greater than the second distance; wherein the second orientation angle is less than the first orientation angle; and wherein the third orientation angle is less than the second orientation angle.

In an example, surfaces in the array of partially-reflective, partially-transmissive surfaces can be flat. In an example, a Quasi Fresnel Reflector (QFR) can further comprise: an array of linear, partially-reflective, partially-transmissive surfaces; an array of nested, arcuate, partially-reflective, partially-transmissive surfaces; and/or a spoke-and-ring array of partially-reflective, partially-transmissive surfaces.

In an example, a Quasi Fresnel Reflector (QFR) can have a cross-section with a saw-tooth shape. In an example, teeth in the saw-tooth shape which are closer to the center of the QFR can be closer together than teeth in the saw-tooth shape which are farther from the center of the Quasi Fresnel Reflector (QFR). In an example, there can be one Light Emitter Array (LEA) per Quasi Fresnel Reflector (QFR). In an example, a Light Emitter Array (LEA) can be annular and a Quasi Fresnel Reflector (QFR) can further comprise an array of nested, arcuate, partially-reflective, partially-transmissive surfaces. In an example, augmented reality eyewear can further comprise a Digital Micromirror Device (DMD) which receives light beams from a Light Emitter Array (LEA) and reflects those light beams toward a Quasi Fresnel Reflector (QFR).

In an example, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of partially-reflective, partially-transmissive surfaces; wherein the surfaces collectively reflect light beams from the LEA toward the person's eye to create virtual images in the person's field of view; wherein surfaces that are closer to the center of the QFR are closer together than surfaces which are farther from the center of the QFR. In an example, Augmented Reality (AR) eyewear can comprise: a Light Emitter Array (LEA) which creates virtual images in a person's field of view; and a Quasi Fresnel Reflector (QFR) which is configured to be worn in front of the person's eye; wherein the QFR further comprises an array of partially-reflective, partially-transmissive surfaces; wherein the surfaces collectively reflect light beams from the LEA toward the person's eye to create virtual images in the person's field of view; wherein surfaces that are farther from the LEA extend out farther from the virtual plane of the QFR than surfaces which are closer to the LEA.

I claim:

1. Augmented Reality (AR) eyewear comprising: a Light Emitter Array (LEA) which creates virtual images in a person's field of view; and a Quasi Fresnel Reflector (QFR) which is configured to be worn in front of the person's eye; wherein the QFR further comprises an array of partially-reflective, partially-transmissive surfaces; wherein the surfaces collectively reflect light beams from the LEA toward the person's eye to create virtual images in the person's field of view; wherein the orientation angle of a surface in the QFR is the LEA-facing angle of intersection between the surface and a virtual plane of the QFR; wherein a first subset of surfaces in the QFR has a first orientation angle and is a first distance from the LEA; wherein a second subset of surfaces in the QFR has a second orientation angle and is a second distance from the LEA; wherein a third subset of surfaces in the QFR has a third orientation angle and is a third distance from the LEA; wherein the second distance is greater than the first distance; wherein the third distance is greater than the second distance; wherein the second orientation angle is less than the first orientation angle; and wherein the third orientation angle is less than the second orientation angle.

2. The eyewear in claim 1 wherein surfaces in the array of partially-reflective, partially-transmissive surfaces are flat.

3. The eyewear in claim 1 wherein the Quasi Fresnel Reflector (QFR) comprises an array of linear, partially-reflective, partially-transmissive surfaces.

4. The eyewear in claim 1 wherein the Quasi Fresnel Reflector (QFR) comprises an array of nested, arcuate, partially-reflective, partially-transmissive surfaces.

5. The eyewear in claim 1 wherein the Quasi Fresnel Reflector (QFR) comprises a spoke-and-ring array of partially-reflective, partially-transmissive surfaces.

6. The eyewear in claim 1 wherein the Quasi Fresnel Reflector (QFR) has a cross-section with a saw-tooth shape.

7. The eyewear in claim 6 wherein teeth in the saw-tooth shape which are closer to the center of the QFR are closer together than teeth in the saw-tooth shape which are farther from the center of the Quasi Fresnel Reflector (QFR).

8. The eyewear in claim 1 wherein there is one Light Emitter Array (LEA) per Quasi Fresnel Reflector (QFR).

9. The eyewear in claim 1 wherein the Light Emitter Array (LEA) is annular and the Quasi Fresnel Reflector (QFR) comprises an array of nested, arcuate, partially-reflective, partially-transmissive surfaces.

10. The eyewear in claim 1 wherein the eyewear further comprises a Digital Micromirror Device (DMD) which receives light beams from the Light Emitter Array (LEA) and reflects those light beams toward the Quasi Fresnel Reflector (QFR).

11. Augmented Reality (AR) eyewear comprising:
a Light Emitter Array (LEA) which creates virtual images in a person's field of view; and
a Quasi Fresnel Reflector (QFR) which is configured to be worn in front of the person's eye; wherein the QFR further comprises an array of partially-reflective, partially-transmissive surfaces; wherein the surfaces collectively reflect light beams from the LEA toward the person's eye to create virtual images in the person's field of view; wherein surfaces that are closer to the center of the QFR are closer together than surfaces which are farther from the center of the QFR.

12. The eyewear in claim 11 wherein surfaces in the array of partially-reflective, partially-transmissive surfaces are flat.

13. The eyewear in claim 11 wherein the Quasi Fresnel Reflector (QFR) comprises an array of linear, partially-reflective, partially-transmissive surfaces.

14. The eyewear in claim 11 wherein the Quasi Fresnel Reflector (QFR) comprises an array of nested, arcuate, partially-reflective, partially-transmissive surfaces.

15. The eyewear in claim 11 wherein the Quasi Fresnel Reflector (QFR) comprises a spoke-and-ring array of partially-reflective, partially-transmissive surfaces.

16. The eyewear in claim 11 wherein the Quasi Fresnel Reflector (QFR) has a cross-section with a saw-tooth shape.

17. The eyewear in claim 11 wherein there is one Light Emitter Array (LEA) per Quasi Fresnel Reflector (QFR).

18. The eyewear in claim 11 wherein the Light Emitter Array (LEA) is annular and the Quasi Fresnel Reflector (QFR) comprises an array of nested, arcuate, partially-reflective, partially-transmissive surfaces.

19. The eyewear in claim 11 wherein the eyewear further comprises a Digital Micromirror Device (DMD) which receives light beams from the Light Emitter Array (LEA) and reflects those light beams toward the Quasi Fresnel Reflector (QFR).

20. Augmented Reality (AR) eyewear comprising: a Light Emitter Array (LEA) which creates virtual images in a person's field of view; and a Quasi Fresnel Reflector (QFR) which is configured to be worn in front of the person's eye; wherein the QFR further comprises an array of partially-reflective, partially-transmissive surfaces; wherein the surfaces collectively reflect light beams from the LEA toward the person's eye to create virtual images in the person's field of view; wherein surfaces that are farther from the LEA extend out farther from a virtual plane of the QFR than surfaces which are closer to the LEA.

* * * * *